(12) United States Patent
Happel

(10) Patent No.: US 10,907,338 B1
(45) Date of Patent: Feb. 2, 2021

(54) HINGED VARIABLE FLOW SKIMMER AND SHELF SYSTEM

(71) Applicant: Suntree Technologies Holdings, LLC, Cocoa, FL (US)

(72) Inventor: Tom Happel, Cocoa, FL (US)

(73) Assignee: Oldcastle Infrastructure, Inc., Auburn, WA (US)

( * ) Notice: Subject to any disclaimer, the term of this patent is extended or adjusted under 35 U.S.C. 154(b) by 0 days.

(21) Appl. No.: 16/124,885

(22) Filed: Sep. 7, 2018

Related U.S. Application Data

(63) Continuation-in-part of application No. 16/104,737, filed on Aug. 17, 2018, now Pat. No. 10,238,993, (Continued)

(51) Int. Cl.
*E03F 5/14* (2006.01)
*E03F 5/10* (2006.01)
(Continued)

(52) U.S. Cl.
CPC ............. *E03F 5/14* (2013.01); *B01D 21/307* (2013.01); *E03F 5/0403* (2013.01);
(Continued)

(58) Field of Classification Search
CPC ....... E03F 5/0403; E03F 5/0404; E03F 5/101; E03F 5/105; E03F 5/14; E03F 5/16; B01D 21/307
(Continued)

(56) References Cited

U.S. PATENT DOCUMENTS

| 122,209 A | 12/1871 | Ashman |
| 232,948 A | 10/1880 | Dernham |

(Continued)

FOREIGN PATENT DOCUMENTS

| CA | 2455239 | 7/2005 |
| JP | 2004353407 | 12/2004 |

OTHER PUBLICATIONS

Spantek, Expanded Metal, Expanded Metal Patterns, no available date, 4 pages.

(Continued)

*Primary Examiner* — Christopher Upton
(74) *Attorney, Agent, or Firm* — Brian S. Steinberger; Hilary F. Steinberger; Law Offices of Brian S. Steinberger, P.A.

(57) ABSTRACT

Vaults, boxes, systems, and methods of treatment systems to capture pollutants from storm water runoff and prevent the conveyance of these pollutants from entering a receiving water body or landscape area, which is designed to be a part of a local permanent storm water drainage infrastructure. A single treatment box, vault and system combines both drainage conveyance, multi-level treatment techniques, variable hydraulic capabilities, and easy and inexpensive methods for servicing the system, along with a hinged skimmer system with or without a float. The hinged skimmer system can include a rigid vertical panel attached by pivotal support rods that allow the vertical panel to move up and down along a vertical plane in front of an outlet flow line to a vault. The system can also include components selected from a shelf or baffle beneath the hinged skimmer, a dual screened filtration system, media filtration, and hydroslide water pressure lines with spray heads for cleaning debris on a sloped floor, as well as a flow spreader, debris ramp and screened deflector.

19 Claims, 39 Drawing Sheets

Related U.S. Application Data which is a continuation-in-part of application No. 15/639,685, filed on Jun. 30, 2017, now Pat. No. 10,202,285, and a continuation-in-part of application No. 14/288,455, filed on May 28, 2014, now abandoned.

(60) Provisional application No. 62/506,188, filed on May 15, 2017, provisional application No. 61/828,958, filed on May 30, 2013.

(51) Int. Cl.
  *E03F 5/04* (2006.01)
  *B01D 21/30* (2006.01)
  *B01D 21/00* (2006.01)
  *C02F 1/00* (2006.01)
  *C02F 103/00* (2006.01)

(52) U.S. Cl.
  CPC ............ *E03F 5/0404* (2013.01); *E03F 5/101* (2013.01); *E03F 5/105* (2013.01); *B01D 21/003* (2013.01); *B01D 21/0042* (2013.01); *B01D 21/0087* (2013.01); *C02F 1/004* (2013.01); *C02F 2103/001* (2013.01); *C02F 2303/24* (2013.01)

(58) Field of Classification Search
  USPC .... 210/122, 170.03, 242.1, 521, 532.1, 538, 210/540
  See application file for complete search history.

(56) References Cited

U.S. PATENT DOCUMENTS

| | | |
|---|---|---|
| 587,559 A | 8/1897 | Riley |
| 664,945 A | 1/1901 | Guion |
| 783,556 A | 2/1905 | Van Buskirk |
| 809,201 A | 1/1906 | Lutz |
| 920,961 A | 5/1909 | Keil |
| 1,060,338 A | 4/1913 | Gschwind |
| 1,442,348 A | 1/1923 | McDermet |
| 1,935,642 A | 11/1933 | Laughlin |
| 2,010,540 A | 8/1935 | Evans |
| 2,102,310 A | 12/1937 | Egan |
| 2,182,795 A | 12/1939 | Day |
| 2,263,259 A | 11/1941 | Boosey |
| 2,360,961 A | 10/1944 | Mayo |
| 2,436,793 A | 3/1948 | Danel |
| 2,485,755 A | 10/1949 | Loosli |
| 2,559,784 A | 7/1951 | Moore |
| 2,615,526 A | 10/1952 | Lane |
| 2,652,946 A | 9/1953 | Beatty |
| 2,796,988 A | 6/1957 | Loffler |
| 3,091,339 A | 5/1963 | Marra et al. |
| 3,237,915 A | 3/1966 | Palmer et al. |
| 3,282,430 A | 11/1966 | Kinne |
| 3,527,348 A | 9/1970 | Lalonde et al. |
| 3,631,983 A | 1/1972 | Mail |
| 4,024,881 A | 5/1977 | Weiland |
| 4,070,863 A | 1/1978 | Brown |
| 4,189,386 A | 2/1980 | Aman |
| 4,198,717 A | 4/1980 | Kessel |
| 4,278,190 A | 7/1981 | Oory et al. |
| 4,297,219 A | 10/1981 | Kirk et al. |
| 4,308,141 A | 12/1981 | Clendenen |
| 4,326,952 A | 4/1982 | Blake |
| 4,422,931 A | 12/1983 | Wolde-Michael |
| 4,509,717 A | 4/1985 | Wright et al. |
| 4,668,405 A | 5/1987 | Boze |
| 4,689,145 A | 8/1987 | Mathews et al. |
| 4,738,644 A | 4/1988 | Happel |
| 4,765,889 A | 8/1988 | Grujanac |
| 4,785,966 A | 11/1988 | Waltke |
| 4,891,128 A * | 1/1990 | Goronszy .......... B01D 21/2444 210/242.1 |
| 4,895,653 A | 1/1990 | Cherochak |
| 4,913,819 A | 4/1990 | Patterson |
| 5,034,122 A | 7/1991 | Wiesemann |
| 5,037,541 A | 8/1991 | Ruey-Jang et al. |
| 5,069,781 A | 12/1991 | Wilkes |
| 5,114,274 A | 5/1992 | Heiler |
| 5,133,619 A | 7/1992 | Murfae et al. |
| 5,176,838 A | 1/1993 | Chin |
| 5,232,587 A | 8/1993 | Hegemier et al. |
| 5,284,580 A | 2/1994 | Shyh |
| 5,372,714 A | 12/1994 | Logue, Jr. |
| 5,378,376 A | 1/1995 | Zenner |
| 5,397,464 A | 3/1995 | Hannon |
| 5,403,474 A | 4/1995 | Emery |
| 5,405,539 A | 4/1995 | Schneider |
| 5,480,254 A | 1/1996 | Autry et al. |
| 5,486,287 A | 1/1996 | Murphy et al. |
| 5,498,331 A | 3/1996 | Monteith |
| 5,518,024 A | 5/1996 | Weeks et al. |
| 5,535,554 A | 7/1996 | Harris, Jr. |
| 5,562,819 A | 10/1996 | Turner, Jr. et al. |
| 5,575,925 A | 11/1996 | Logue, Jr. |
| 5,632,889 A | 5/1997 | Tharp |
| 5,643,445 A | 7/1997 | Billias et al. |
| 5,670,039 A | 9/1997 | Harris |
| 5,779,888 A | 7/1998 | Bennett |
| 5,810,510 A | 9/1998 | Urriola |
| 5,820,762 A | 10/1998 | Bamer et al. |
| 5,855,774 A | 1/1999 | Boelter |
| 5,904,842 A | 5/1999 | Billias et al. |
| 5,980,740 A | 11/1999 | Harms et al. |
| 5,985,157 A | 11/1999 | Leckner et al. |
| 6,032,421 A | 3/2000 | Yamada |
| 6,077,448 A | 6/2000 | Tran-Quoc-Nam et al. |
| 6,086,756 A | 7/2000 | Roy |
| 6,086,758 A | 7/2000 | Schilling et al. |
| 6,099,743 A | 8/2000 | Pedersen |
| 6,106,706 A | 8/2000 | Roy et al. |
| 6,106,707 A | 8/2000 | Morris et al. |
| 6,125,865 A | 10/2000 | Bacon Cochrane |
| 6,149,803 A | 11/2000 | Diloreto, Jr. et al. |
| 6,178,565 B1 | 1/2001 | Franco |
| 6,190,545 B1 | 2/2001 | Williamson |
| 6,200,484 B1 | 3/2001 | McInnis |
| 6,231,758 B1 | 5/2001 | Morris et al. |
| 6,270,663 B1 | 8/2001 | Happel |
| 6,287,459 B1 | 9/2001 | Williamson |
| 6,294,095 B1 | 9/2001 | Lewis |
| 6,315,897 B1 | 11/2001 | Maxwell |
| 6,334,953 B1 | 1/2002 | Singleton |
| 6,379,541 B1 | 4/2002 | Nicholas |
| 6,428,692 B2 | 8/2002 | Happel |
| 6,478,954 B1 | 11/2002 | Turner, Jr. et al. |
| 6,517,709 B1 | 2/2003 | Cardwell et al. |
| 6,531,059 B1 | 3/2003 | Morris et al. |
| 6,537,446 B2 | 3/2003 | Sanguinetti |
| 6,551,023 B2 | 4/2003 | Allard |
| 6,562,233 B1 | 5/2003 | Schilling et al. |
| 6,638,424 B2 | 10/2003 | Stever et al. |
| 6,651,825 B2 | 11/2003 | Turner, Jr. et al. |
| 6,666,974 B2 | 12/2003 | Page |
| 6,668,390 B1 | 12/2003 | Gonzalez |
| 6,733,665 B1 | 5/2004 | Khalil |
| 6,797,161 B2 | 9/2004 | Use et al. |
| 6,797,162 B2 | 9/2004 | Happel |
| 6,800,195 B1 | 10/2004 | Batten et al. |
| 6,824,677 B2 | 11/2004 | Martinez |
| 6,866,153 B2 | 3/2005 | Turner, Jr. et al. |
| 6,869,525 B1 | 3/2005 | Happel |
| 6,872,029 B2 | 3/2005 | Allard et al. |
| 6,884,343 B2 | 4/2005 | Harris et al. |
| 6,936,163 B2 | 8/2005 | Use et al. |
| 6,939,461 B2 | 9/2005 | Use et al. |
| 6,951,607 B2 | 10/2005 | Use et al. |
| 6,974,540 B1 | 12/2005 | Fleischmann |
| 6,976,808 B2 | 12/2005 | Allard |
| 6,979,148 B2 | 12/2005 | Happel et al. |

(56) References Cited

U.S. PATENT DOCUMENTS

| | | |
|---|---|---|
| 6,986,621 B2 | 1/2006 | Allard |
| 6,994,783 B2 | 2/2006 | Use et al. |
| 6,998,039 B2 | 2/2006 | Harris et al. |
| 7,005,060 B2 | 2/2006 | Pitt |
| 7,011,743 B2 | 3/2006 | Use et al. |
| 7,083,721 B2 | 8/2006 | McClure et al. |
| 7,094,337 B2 | 8/2006 | Williams et al. |
| 7,094,338 B2 | 8/2006 | Morris et al. |
| 7,112,274 B1 | 9/2006 | Sanguinetti |
| 7,128,341 B1 | 10/2006 | Dahl et al. |
| 7,128,832 B2 | 10/2006 | Wade |
| 7,132,045 B1 | 11/2006 | Trangsrud |
| 7,153,417 B2 | 12/2006 | Happel |
| 7,156,987 B1 | 1/2007 | Sanguinetti |
| 7,270,747 B2 | 9/2007 | Happel et al. |
| 7,282,142 B2 | 10/2007 | Kraft |
| 7,288,188 B2 | 10/2007 | Al-Assfour |
| 7,294,256 B2 | 11/2007 | Happel et al. |
| 7,309,420 B1 | 12/2007 | Trangsrud |
| 7,328,809 B2 | 2/2008 | Gigas et al. |
| 7,396,471 B2 | 7/2008 | Wimberger |
| 7,488,414 B2 | 2/2009 | Wimberger |
| 7,494,585 B2 | 2/2009 | Nino |
| 7,524,414 B1 | 4/2009 | Barragan |
| 7,549,820 B1 | 6/2009 | Happel |
| 7,658,857 B2 | 2/2010 | Wacome |
| 7,662,280 B1 | 2/2010 | Cooney |
| 7,771,591 B2 | 8/2010 | Lucas |
| 7,785,464 B2 | 8/2010 | Happel |
| 7,815,800 B2 | 10/2010 | Komatsu |
| 7,824,551 B2 | 11/2010 | Wanielista et al. |
| 7,846,327 B2 | 12/2010 | Happel et al. |
| 7,883,620 B2 | 2/2011 | Owen |
| 7,897,047 B2 | 3/2011 | Wanielista et al. |
| 7,927,484 B2 | 4/2011 | Wanielista et al. |
| 7,955,507 B2 | 6/2011 | Wanielista et al. |
| 7,959,799 B2 | 6/2011 | Happel et al. |
| 7,981,283 B2 | 7/2011 | Happel |
| 7,981,300 B2 | 7/2011 | Wacome |
| 8,002,984 B1 | 8/2011 | Wanielista et al. |
| 8,002,985 B1 | 8/2011 | Wanielista et al. |
| 8,017,006 B2 | 9/2011 | Lopez |
| 8,034,234 B2 | 10/2011 | Happel |
| 8,034,236 B1 | 10/2011 | Happel |
| 8,034,237 B2 | 10/2011 | Happel et al. |
| 8,038,879 B2 | 10/2011 | Kraft |
| 8,051,568 B2 | 11/2011 | Moody et al. |
| 8,083,937 B2 | 12/2011 | Happel |
| 8,101,079 B1 | 1/2012 | Wanielista et al. |
| 8,142,666 B1 | 3/2012 | Happel |
| 8,153,005 B1 | 4/2012 | Wanielista et al. |
| 8,216,453 B2 | 7/2012 | Moody et al. |
| 8,221,632 B2 | 7/2012 | McInnis et al. |
| 8,231,780 B2 | 7/2012 | Happel |
| 8,252,182 B1 | 8/2012 | Chang et al. |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,658,044 B2 | 2/2014 | Cobb |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 10,155,670 B1 | 12/2018 | Happel |
| 10,183,240 B1 | 1/2019 | Happel |
| 10,202,285 B1 * | 2/2019 | Happel ............... E03F 5/0404 |
| 10,238,993 B1 * | 3/2019 | Happel ............... E03F 5/0404 |
| 10,384,956 B1 * | 8/2019 | Happel .................. E03F 5/14 |
| 10,472,815 B1 * | 11/2019 | Happel .................. E03F 5/14 |
| 2001/0047954 A1 | 12/2001 | Happel |
| 2002/0157996 A1 * | 10/2002 | Glasgow ............ B01D 17/0214 210/122 |
| 2003/0026659 A1 | 2/2003 | Wu |
| 2003/0089652 A1 | 5/2003 | Matsui |
| 2003/0121846 A1 | 7/2003 | Use et al. |
| 2003/0132150 A1 | 7/2003 | Happel |
| 2003/0136717 A1 | 7/2003 | Tseng |
| 2003/0172487 A1 | 9/2003 | Thompson et al. |
| 2003/0175079 A1 | 9/2003 | Happel et al. |
| 2004/0065601 A1 | 4/2004 | Martinez |
| 2004/0222159 A1 | 11/2004 | Peters, Jr. et al. |
| 2004/0222170 A1 | 11/2004 | Hauge |
| 2004/0226869 A1 | 11/2004 | McClure et al. |
| 2005/0051499 A1 | 3/2005 | Nino |
| 2005/0069386 A1 | 3/2005 | Happel et al. |
| 2005/0183997 A1 | 8/2005 | Happel et al. |
| 2005/0218049 A1 | 10/2005 | Happel |
| 2006/0016767 A1 | 1/2006 | Olson |
| 2006/0086676 A1 | 4/2006 | Smith |
| 2006/0096935 A1 | 5/2006 | Harding |
| 2006/0163130 A1 | 7/2006 | Happel et al. |
| 2006/0201860 A1 | 9/2006 | Happel et al. |
| 2006/0207922 A1 | 9/2006 | Dussich |
| 2008/0006304 A1 | 1/2008 | Treherne |
| 2009/0045135 A1 | 2/2009 | Khudenko et al. |
| 2009/0114579 A1 | 5/2009 | Dyer |
| 2009/0134081 A1 | 5/2009 | Happel |
| 2009/0166279 A1 | 7/2009 | Happel et al. |
| 2010/0032363 A1 | 2/2010 | Happel |
| 2010/0078370 A1 | 4/2010 | Happel |
| 2011/0168612 A1 | 7/2011 | Happel |
| 2011/0278237 A1 | 11/2011 | McInnis |
| 2012/0073675 A1 | 3/2012 | Dupuis |
| 2014/0102479 A1 | 4/2014 | Steffen |
| 2014/0352729 A1 | 12/2014 | Happel |
| 2015/0114893 A1 | 4/2015 | Moll |
| 2015/0129473 A1 | 5/2015 | Kent |
| 2015/0183659 A1 | 7/2015 | Kent |
| 2015/0258472 A1 | 9/2015 | Kent |
| 2017/0342698 A1 | 11/2017 | Fink |

OTHER PUBLICATIONS

Bioclean, Debris Separating Baffle Box, Dual Stage Hydrodynamic Separator, no date available, 2 pages.

Rising and Non-Rising Stem, Telescoping Valves, Halliday Products, retrieved on Jun. 15, 2009, retrieved from www.hallidayproducts.com/ssg.html, 4 pages.

Aluminum Slide and Weir Glass, Water and Waste Water Valves and Gates, retrieved on Jun. 15, 2009, retrieved from http://ncvg.net/products/alumslideweir.html, 10 pages.

Happel, U.S. Appl. No. 14/151,284, filed Jan. 9, 2014, Office Action Summary dated Dec. 24, 2014, 12 pages.

Applied Polymer Systems, Inc., Polymer Enhanced Best Management Practice (PEBMP) Application Guide, Revised 2016, 83 pages.

Technical Guidance for the Use of Polyacrylamides (PAM) and PAM Blends for Soil Erosion Control and Storm Water Clarification, Applied Polymer Systems, Inc., Nov. 2002, 8 pages.

Applied Polymer Systems, Inc., APS 800 Series Pond Long, retrieved from http://siltstop.com/p.php?go=pinfo&PID=333-aps_800_series_pond_log, retrieved Aug. 28, 2017, 3 pages.

Applied Polymer Systems, Inc., Water Treatment, retrieved from http://siltstop.com/p.php?go=pinfo&PID=15-water_treatment, retrieved on Aug. 28, 2017, 8 pages.

Stormwater Best Management Practice, Polymer Flocculation, United States Environmental Protection Agency, Oct. 2013, http://www.siltstop.com/pictures/US_EPA_Polymer_Flocculant_Handout_3-14.pdf, 7 pages.

Happel, T., U.S. Appl. No. 15/639,685, filed Jun. 30, 2017, Office Action Summary dated Aug. 10, 2018, 7 pages.

Happel, T., U.S. Appl. No. 15/248,202, filed Aug. 26, 2016, Office Action Summary dated Jun. 1, 2018, 10 pages.

Bio-Clean, Submittal Drawings to Lake County, Florida from Bio-Clean, a Forterra Company, regarding Magnolia Lane Drainage, submitted Mar. 7, 2017, 8 pages.

(56) References Cited

OTHER PUBLICATIONS

Bio-Clean, Final Project Drawings approved by Lake County, Florida from Bio-Clean, a Forterra Company, regarding Magnolia Lane Drainage, Mar. 23, 2017, 1 page.

* cited by examiner

HINGED VARIABLE FLOW SKIMMER AND SHELF SYSTEM

CROSS REFERENCE TO RELATED APPLICATIONS

This application is a Continuation-In-Part of U.S. patent application Ser. No. 16/104,737 filed Aug. 17, 2018, which is a Continuation-In-Part of U.S. patent application Ser. No. 15/639,685 filed Jun. 30, 2017, which claims the benefit of priority to U.S. Provisional Patent Application Ser. No. 62/506,188 filed May 15, 2017, and U.S. patent application Ser. No. 15/639,685 is a Continuation In Part of U.S. patent application Ser. No. 14/288,455 filed May 28, 2014, now abandoned, which claims the benefit of priority to U.S. Provisional Application Ser. No. 61/828,958 filed May 30, 2013. The entire disclosure of each of the applications listed in this paragraph are incorporated herein by specific reference thereto.

FIELD OF INVENTION

This invention relates to water detention and treatment, and in particular to vaults, boxes, systems, and methods of treatment systems to capture pollutants from storm water runoff and prevent the conveyance of these pollutants from entering a receiving water body or landscape area, which is designed to be a part of a local permanent storm water drainage infrastructure, where a single treatment system combines both drainage conveyance, multi-level treatment techniques, variable hydraulic capabilities, and easy and inexpensive methods for servicing the system.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment.

Advanced filtration techniques especially include chemical and biological processes and generally include, but are not limited to processes that bring storm water in contact with plants including both macrophytes and microphytes. And the plants are both visible and invisible to the naked eye.

The reduction of nutrients that are conveyed via storm water runoff are in the forefront of the various pollutants of concern. For example; the EPA (Environmental Protection Agency) has mandated that the state of Florida reduce the overall pollutant discharge of the state by approximately ⅓. To this end the EPA has established a numeric nutrient criterion for all water bodies of the state for total phosphorus (TP) and total nitrogen (TN). These nutrient numeric values cannot be exceeded within these water bodies of the state. The result of exceeding these numeric values will result with the state of Florida being fined by the EPA.

Common pollutants typically found in storm water flow can include sediment, foliage, litter, nutrients, metals, hydrocarbons, and bacteria. Because pollutants vary significantly in their respective physical characteristics, a variety of techniques are applied to better address difficulties with capturing the pollutants. For example; capturing hydrocarbons, which are typically in a liquid state, require a different technique than capturing litter which are in a solid state.

Storm water treatment systems that make use of filtration media can vary significantly just by making use of different types of filtration media. Understanding that effectiveness will vary for different types of filtration media, has filtration media functions by combining the processes of physical filtration, sorbent or reactive surfaces, and biological activity.

Physical filtration will physically prevent the conveyance of solids, sorbent or reactive surfaces will chemically bond to the pollutants, and the biological activity will consume pollutants.

Physical filtration whether by use of a filtration media or a screen can be an effective technique for capturing solids. Contained within and attached to the solids are a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

Filtration media will have sorbent or reactive surfaces that vary in effectiveness depending on the type of media. For storm water treatment applications, the media is granular in shape. However, the reactivity of the media surfaces is limited by the number of receptors on the surface of the media.

Making use of media that has a lot of surface area will increase the number of available receptors. A common method to increasing the surface area of the media is using media that is small in granular size. However, the smaller the granular size of the media the more likely the media will be to bind due to the collection of solids within the media. In addition, the receptors can be binded by solids which prevent the water flow from reaching the surface of the media granules.

An underlying problem with stormwater treatment is that retention of stormwater to achieve a greater pollutant removal efficiency reduces the hydraulic conveyance which may compromise the hydrology of the water shed. Historically, stormwater management has been primarily about flood prevention. Because of both governmental mandates and environmental necessity, today stormwater management includes the prevention of the conveyance of pollutants. There is a necessity to of prevent both flooding and the conveyance of pollutants.

Since there is not a single stormwater treatment technique that is the best for removing all pollutants of concern, a treatment system that combines multiple techniques in a treatment train arrangement will likely yield a wide spectrum of stormwater treatment success. In addition, there is an economic consideration for applying stormwater treatment. For example; the costs and frequency for servicing a stormwater treatment system will be an indicator as to the sustainability of the system . . . all stormwater treatment systems require servicing.

A traditional or common skimmer will have vertical sides with a lower open bottom. The vertical sides make use of a hydraulic pressure differential between the front side and back side of the skimmer to direct the water flow down and pass it through the open bottom. Once the flow passes through the open bottom flow will be conveyed downstream. The intention is that debris or liquids that float due to buoyancy will not be able to move downward into the water column to pass through the open bottom of the skimmer.

A problem with traditional skimmers is the balance between the level of treatment provided, the headloss that they create, and the need to pass high volumes of water flow to prevent flooding. When the opening under a skimmer is relatively large it will have less headloss and greater potential water conveyance, but less treatment potential. When the opening is relatively small under a skimmer it will have greater headloss, less potential water conveyance, but greater treatment.

A problem with traditional skimmers is the balance between the level of treatment provided, the headloss that they create, and the need to pass high volumes of water flow to prevent flooding. When the opening under a skimmer is relatively large it will have less headloss and greater potential water conveyance, but less treatment potential. When the opening is relatively small under a skimmer it will have greater headloss, less potential water conveyance, but greater treatment.

Thus, the need exists for solutions to the above problems with the prior art.

SUMMARY OF THE INVENTION

An objective of the invention is to provide systems, devices, and methods to treat a storm drain pipe or stormwater conveyance by capturing contaminates such as foliage, litter, and sediments, and lighter than water liquids such as petroleum products.

In short, to treat the storm water flow to prevent pollutants from being conveyed downstream to a receiving body of water and be quick and easy to service. This process of treating the water flow can create headloss which could impede the flow and reduce the rate of flow. If the treatment results in a significant reduction in the rate of flow, it is possible for flooding to occur upstream from the stormwater treatment structure. Minimizing the headloss caused by a treatment system is important, especially when a treatment system is retrofitted to an pre-existing drain pipe or ditchline.

Another objective if the invention is to provide systems, devices and methods to create greater detention time in the treatment vault on the upstream side of the skimmer for low to medium flows, and reduce the detention time on the upstream side of the skimmer during high flows.

Greater treatment of the stormwater flow can be achieved by increasing the detention time within the treatment vault. Most rain events do not produce high stormwater flow rates and creating greater detention time for these low to medium flows within a treatment vault will not pose a flooding risk. For high stormwater flow rates it is important to convey the stormwater through the storm pipes quickly and with minimal headloss to prevent flooding. However, for all rain events that produce stormwater flows in storm drain pipes, the early part of each rain event produces the highest concentration of pollutants. Having a system like the Hinged Variable Flow Skimmer and Shelf System that automatically adjusts the hydraulics of a treatment system will significantly increase the removal efficiency of the treatment system without compromising the hydrology of the watershed.

The invention can comprise a variable hydraulic skimmer system that has all or most of the potential water flow significantly constricted during low to medium flows. During high flows, which is the only time that flooding is a concern, the flow constriction is automatically reduced to allow for greater conveyance of water. Essentially, during low to medium flows the invention maximizes treatment. During high flows the hydraulics of the invention automatically adjusts to allow for maximum conveyance which will prevent the possibility of flooding.

The primary components of the invention can comprise a rigid skimmer panel that spans the width of a stormwater treatment vault, a shelf system upon which the skimmer panel rests when water is not flowing, and a hinge system that is arraigned so that the skimmer remains vertical as it moves upward with a rising hydraulic grade line (hgl).

Further objects and advantages of this invention will be apparent from the following detailed description of the presently preferred embodiments which are illustrated schematically in the accompanying drawings.

BRIEF DESCRIPTION OF THE FIGURES

First Embodiment Single Chamber Vault and Skimmer

Second Embodiment Single Chamber Vault, Skimmer and Float

Figure 3:
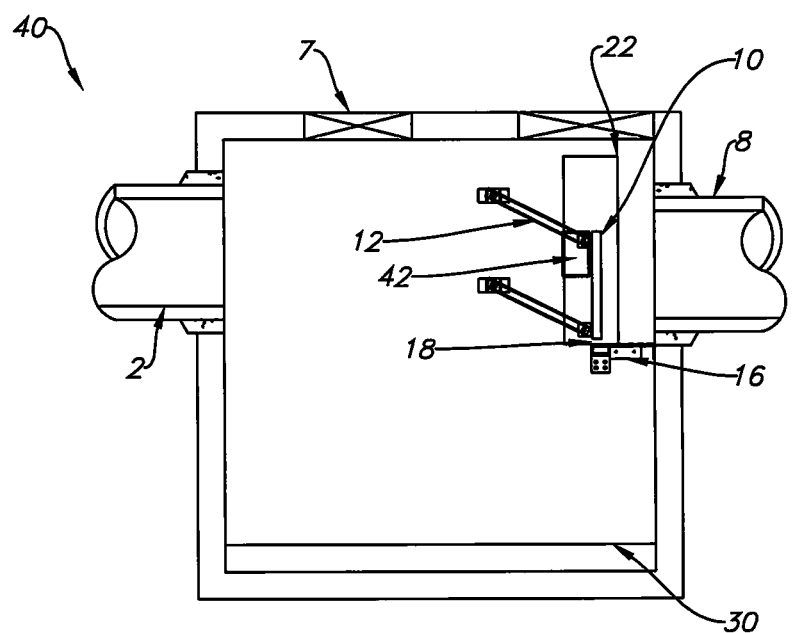

FIG. 3 is another right side cross-sectional view of a single chamber vault and skimmer system with float in a down position relative to the shelf.

Figure 3A:
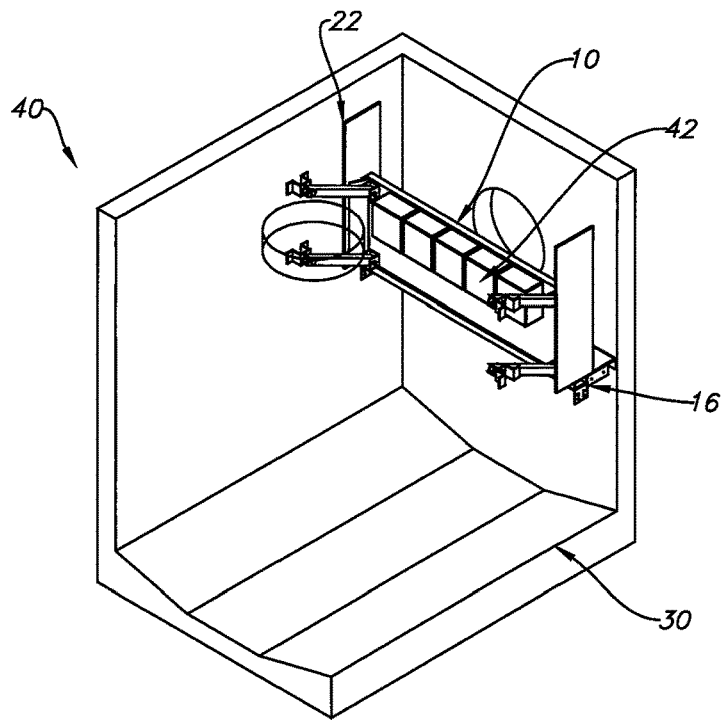

FIG. 3A is an upper front right side perspective view of FIG. 3.

Figure 3B:
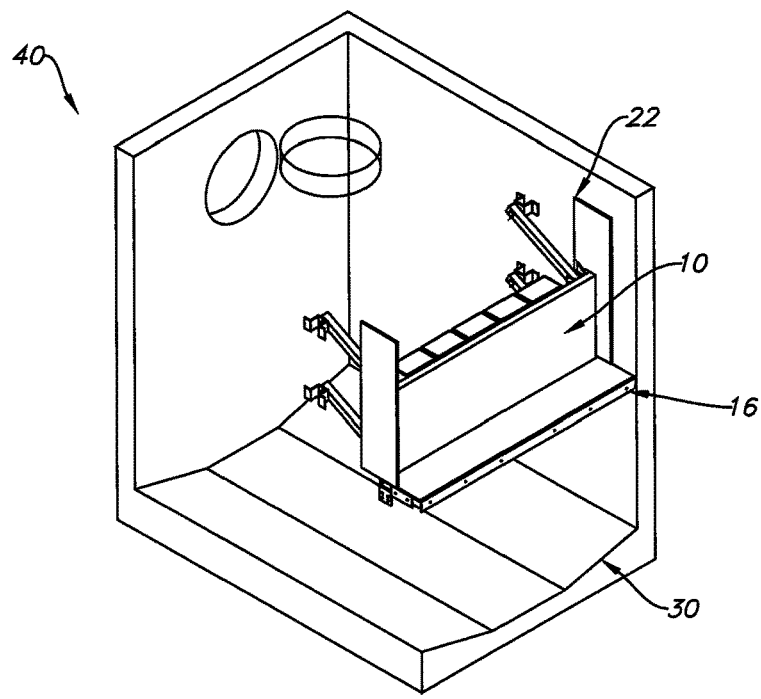

FIG. 3B is an upper rear right side perspective view of FIG. 3.

Figure 3C:
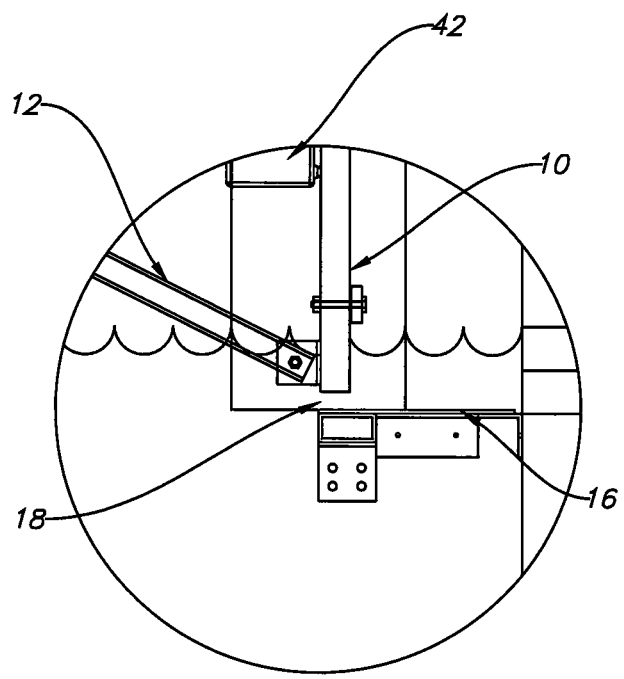

FIG. 3C is an enlarged view of a portion of the skimmer panel and shelf of FIG. 3 showing a gap therebetween.

Figure 3D:
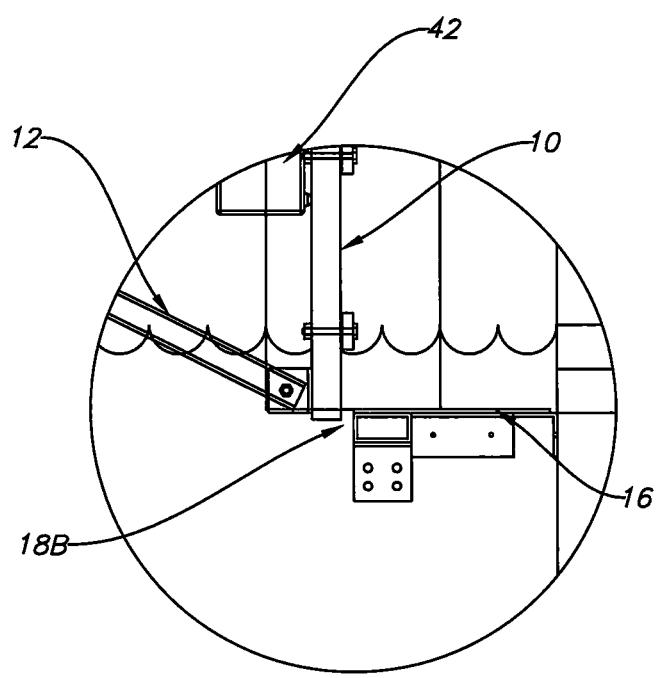

FIG. 3D is another enlarged portion of the skimmer panel and shelf of FIG. 3 showing another gap therebetween.

Figure 3E:
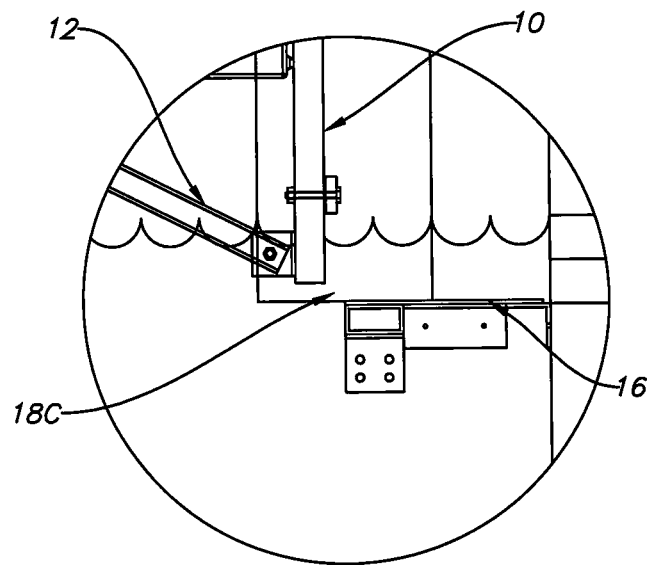

FIG. 3E is still another enlarged portion of the skimmer panel and shelf of FIG. 3 showing another gap therebetween.

Figure 3F:
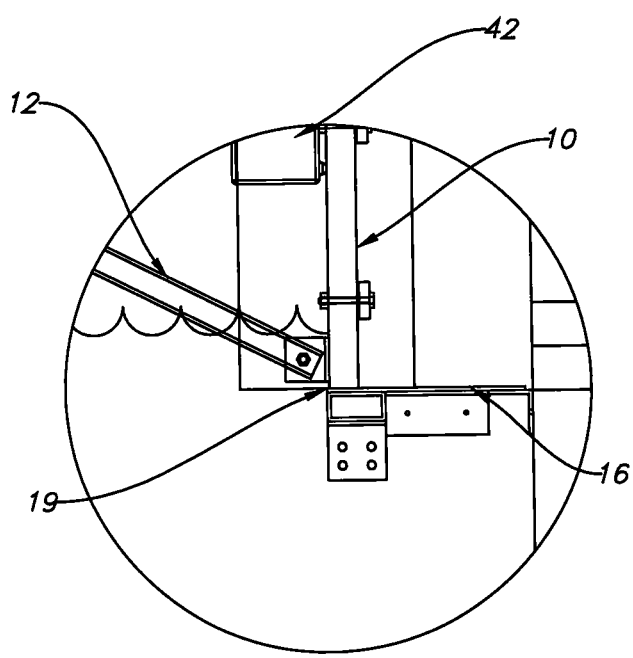

FIG. 3F is an enlarged portion of the skimmer panel and shelf of FIG. 3 with no gap therebetween.

Figure 4:
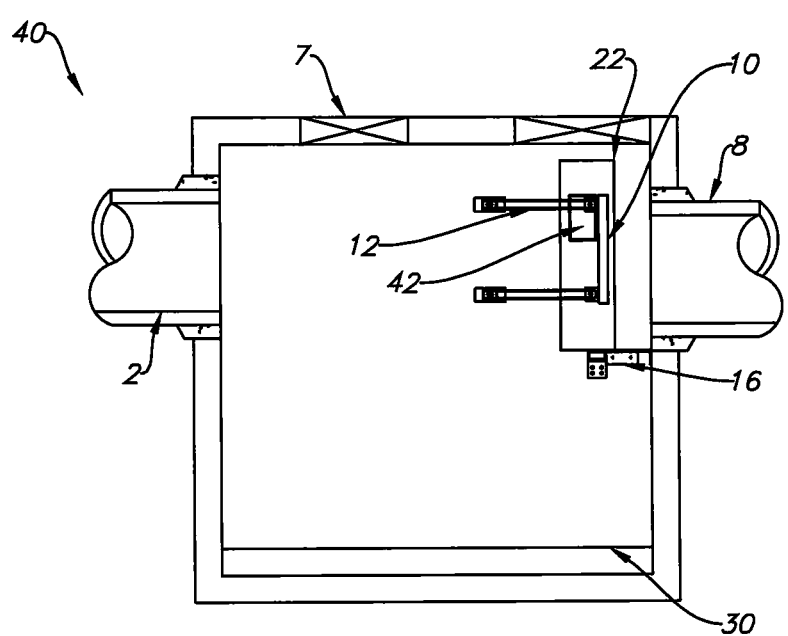

FIG. 4 is another view of the vault, skimmer system and float of FIG. 3 in an up position relative to the shelf.

Figure 4A:
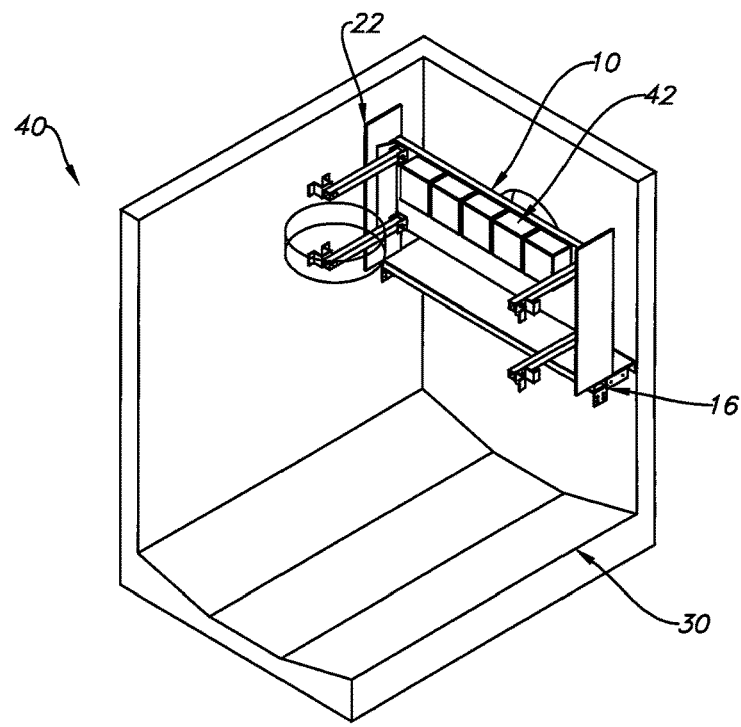

FIG. 4A is an upper front right side perspective view of FIG. 4.

Figure 4B:
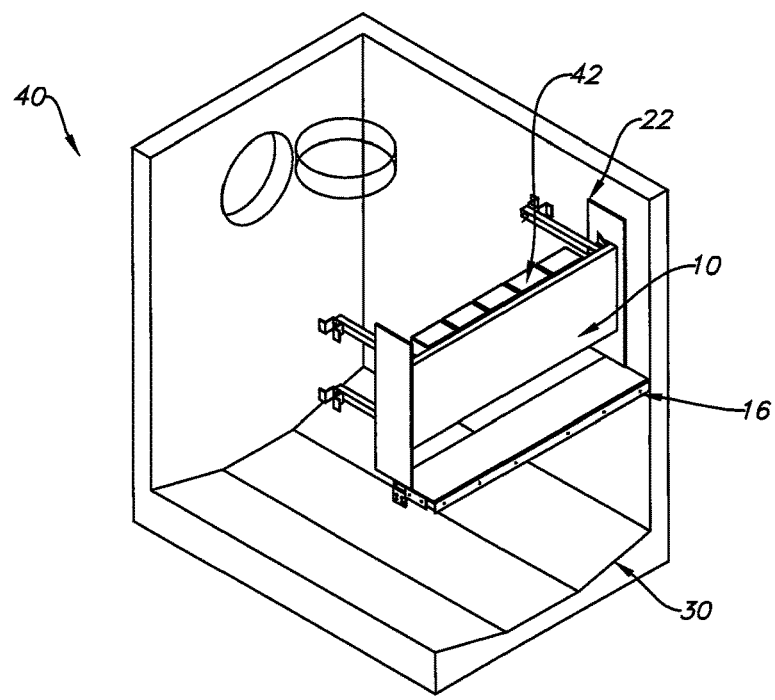

FIG. 4B is an upper rear right side perspective view of FIG. 4.

Third Embodiment Single Chamber Vault, Skimmer, Float & Wheels

Figure 5C:
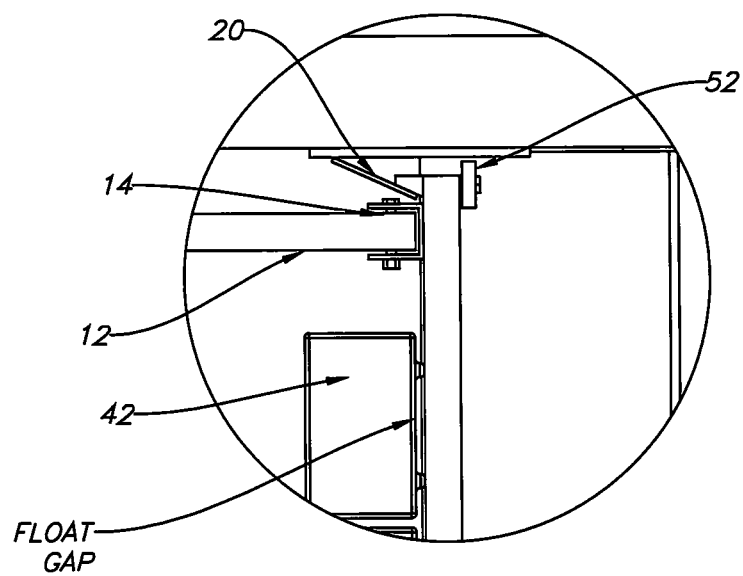
Figure 5:
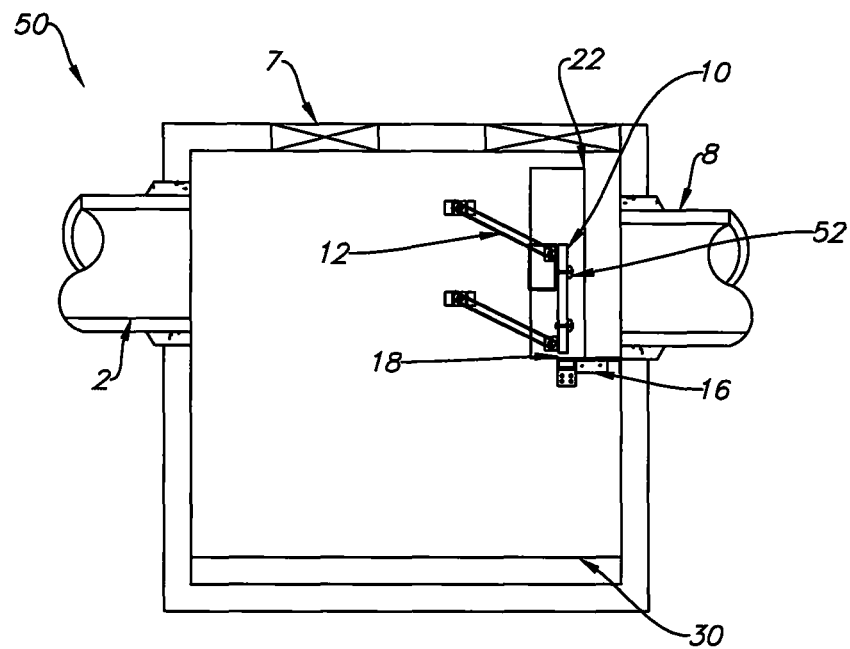

FIG. 5 is another right side cross-sectional view of a single chamber vault, skimmer system with float and wheels in a down position relative to the shelf.

Figure 5A:
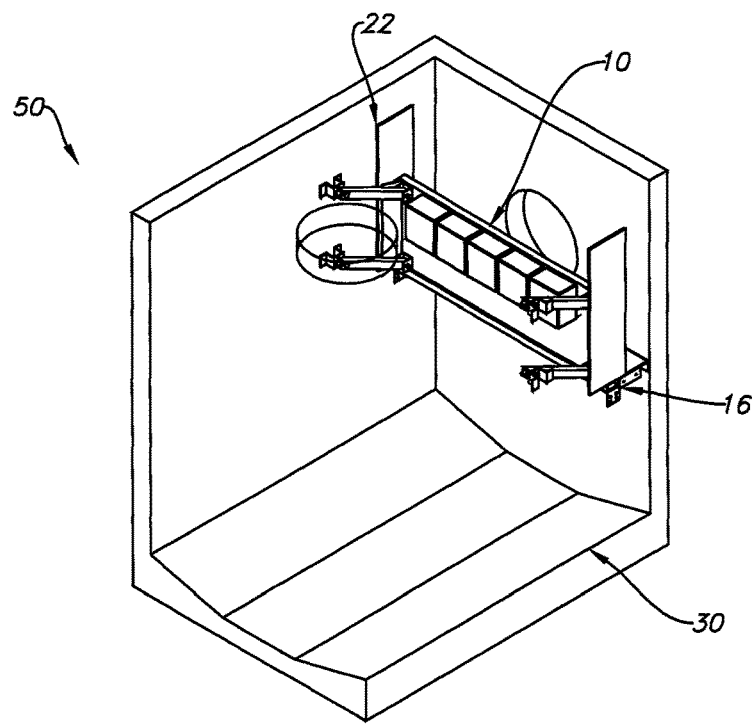

FIG. 5A is an upper front right side perspective view of FIG. 5.

Figure 5B:
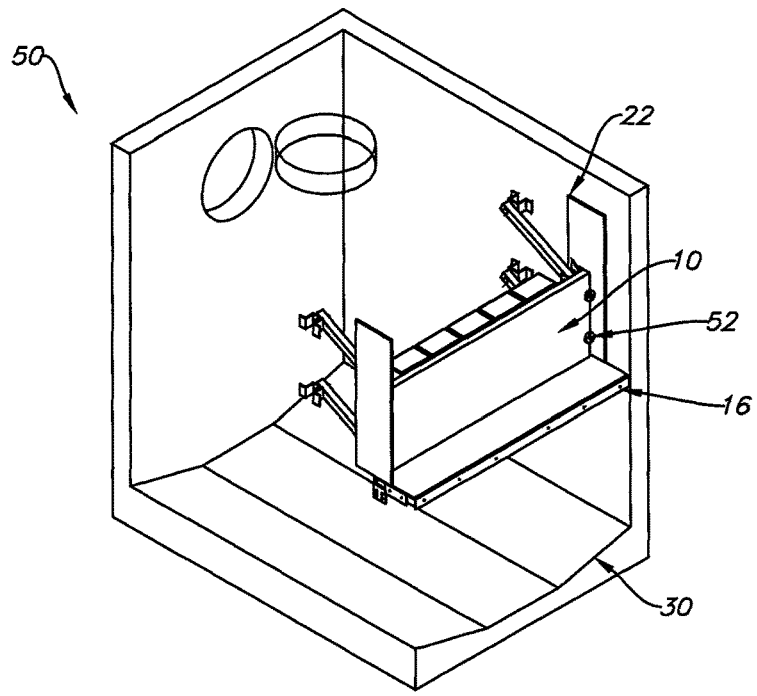

FIG. 5B is an upper rear right side perspective view of FIG. 5.

FIG. 5C is an enlarged top view of the skimmer panel with wheel(s) of FIG. 5.

Figure 6:
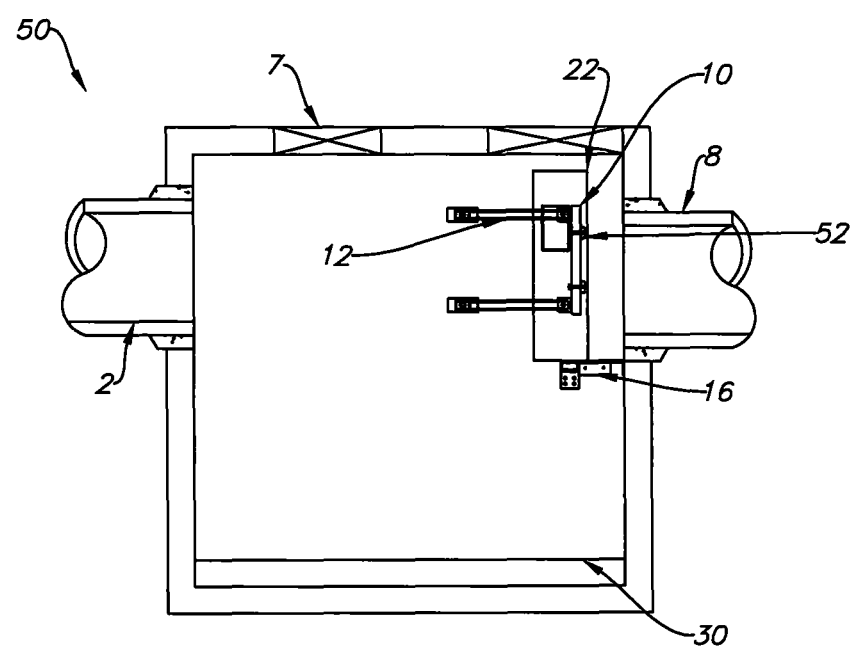

FIG. 6 is another view of FIG. 5 with a single chamber vault, skimmer system with float and wheels in an up position relative to the shelf.

Figure 6A:
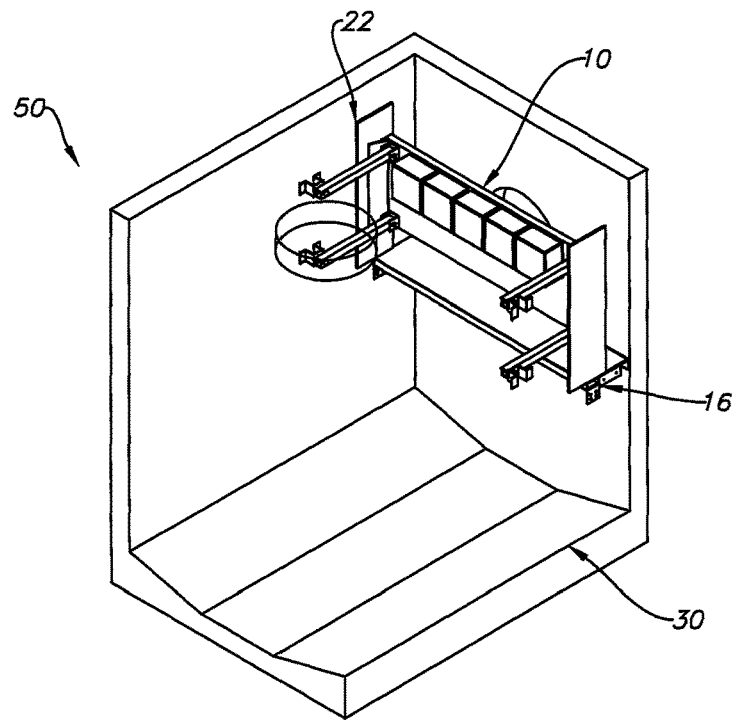

FIG. 6A is an upper front right side perspective view of FIG. 6.

Figure 6B:
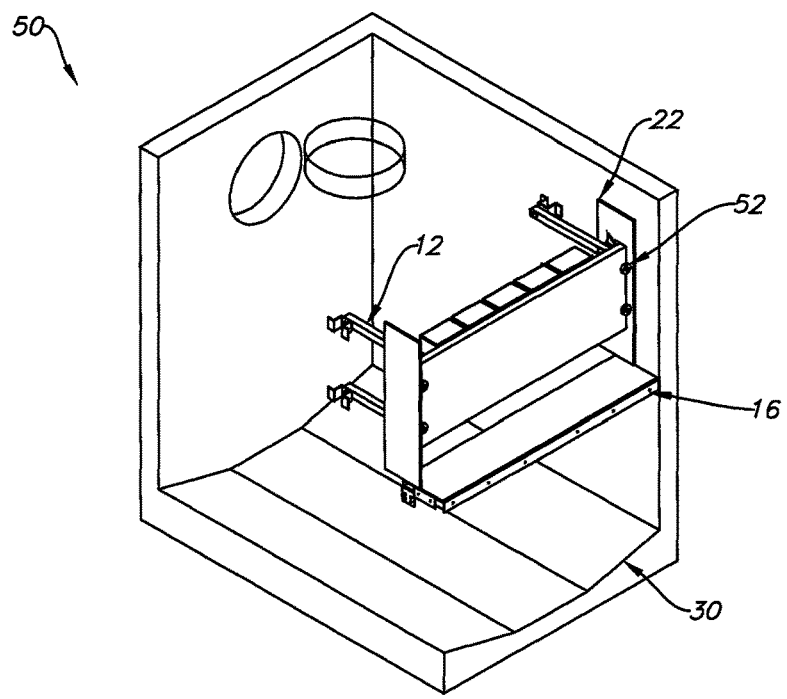

FIG. 6B is an upper rear right side perspective view of FIG. 6.

Figure 7:
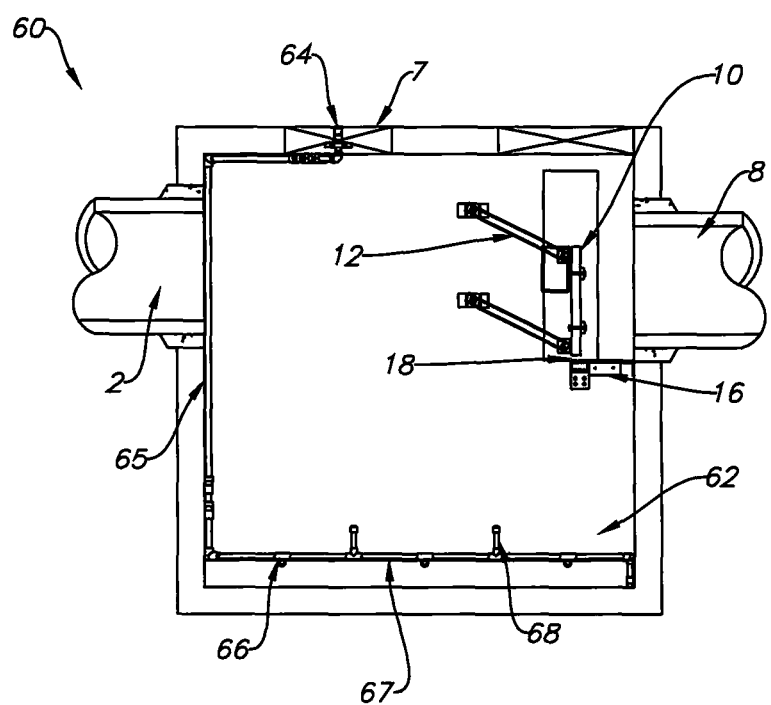

Fourth Embodiment Single Chamber Vault, Skimmer System, Float and Hydroslide System FIG. 7 is a right side cross-sectional view of another embodiment which includes a single chamber vault, skimmer system with float and hydroslide system in a down position relative to the shelf.

Figure 7A:
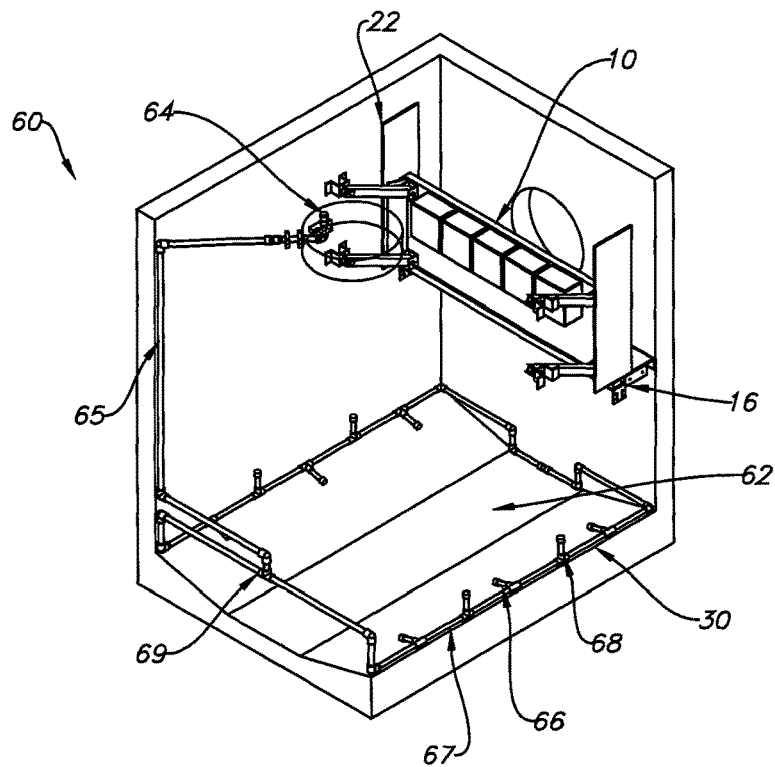

FIG. 7A is an upper front right side perspective view of FIG. 7.

Figure 7B:
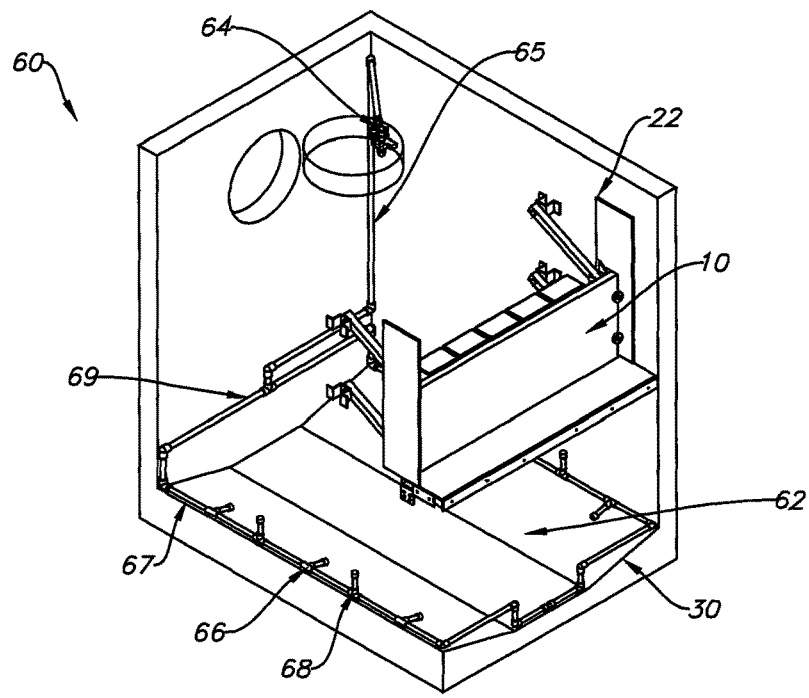

FIG. 7B is an upper rear right side perspective view of FIG. 7.

Figure 8:
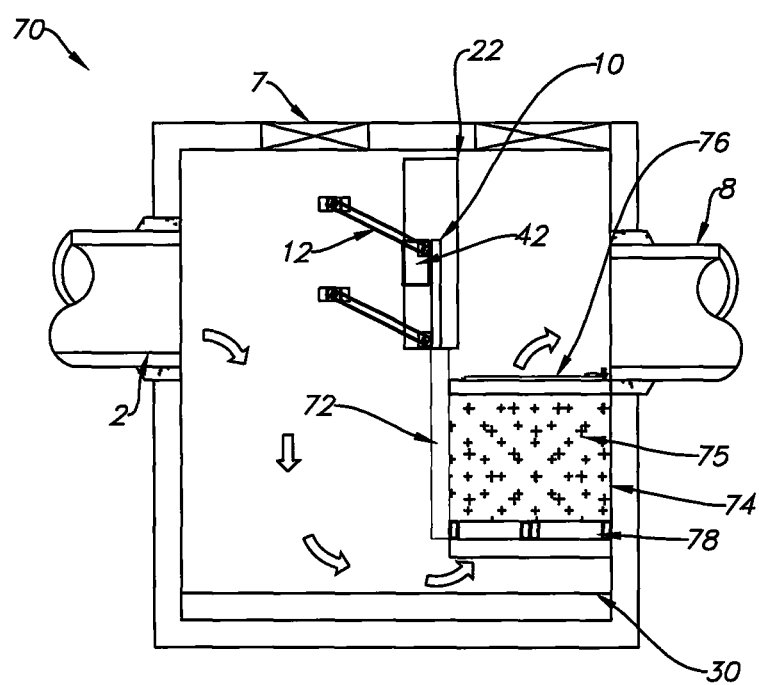
Figure 8A:
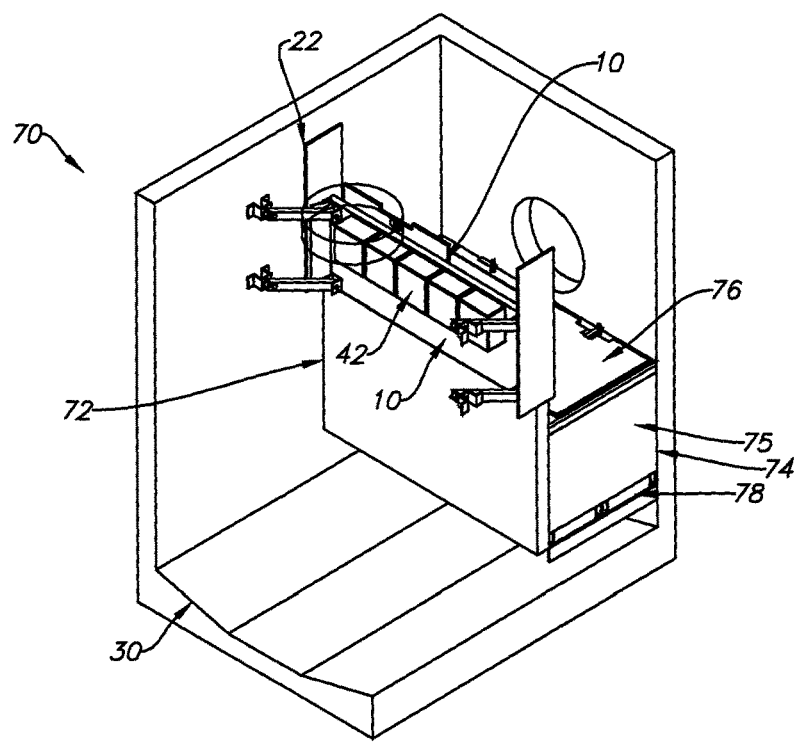

Fifth Embodiment Single Chamber Vault, Skimmer System with or without Float, and Upflow Media System FIG. 8 is a right cross-sectional view of another embodiment of a single chamber vault, skimmer system with or without float, and upflow media system FIG. 8A is an upper front right side perspective view of FIG. 8.

Figure 8B:
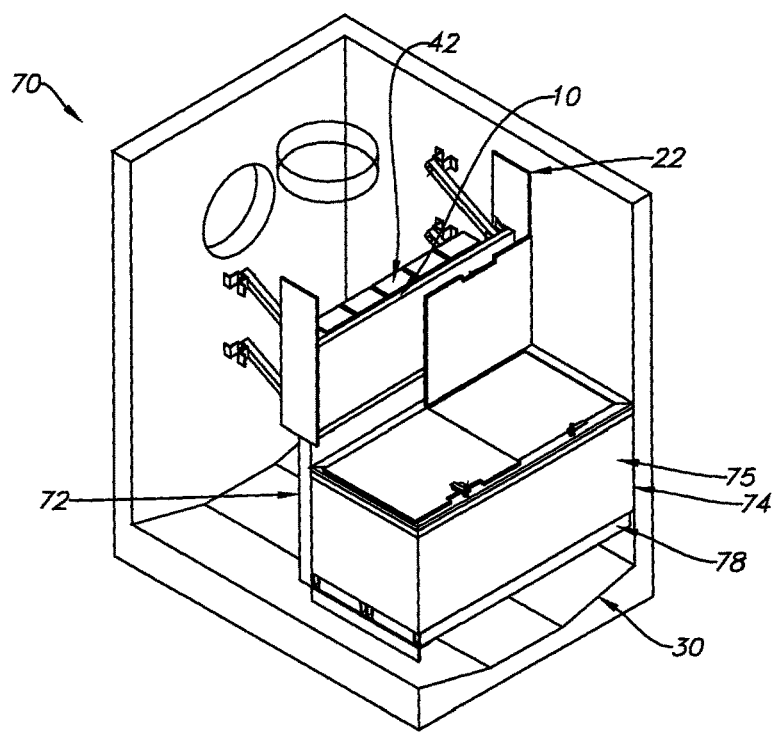

FIG. 8B is an upper rear right side perspective view of FIG. 8.

Figure 9:
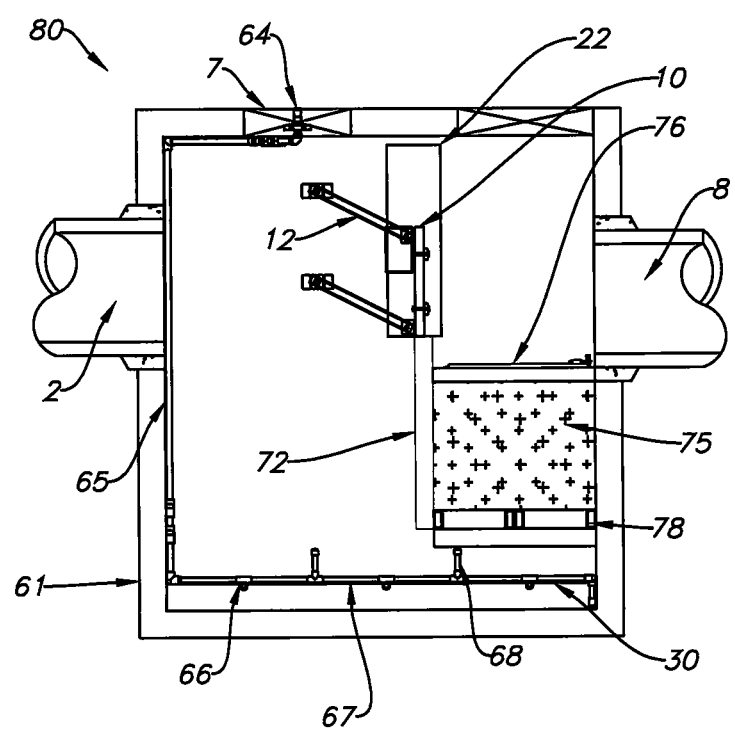
Figure 9A:
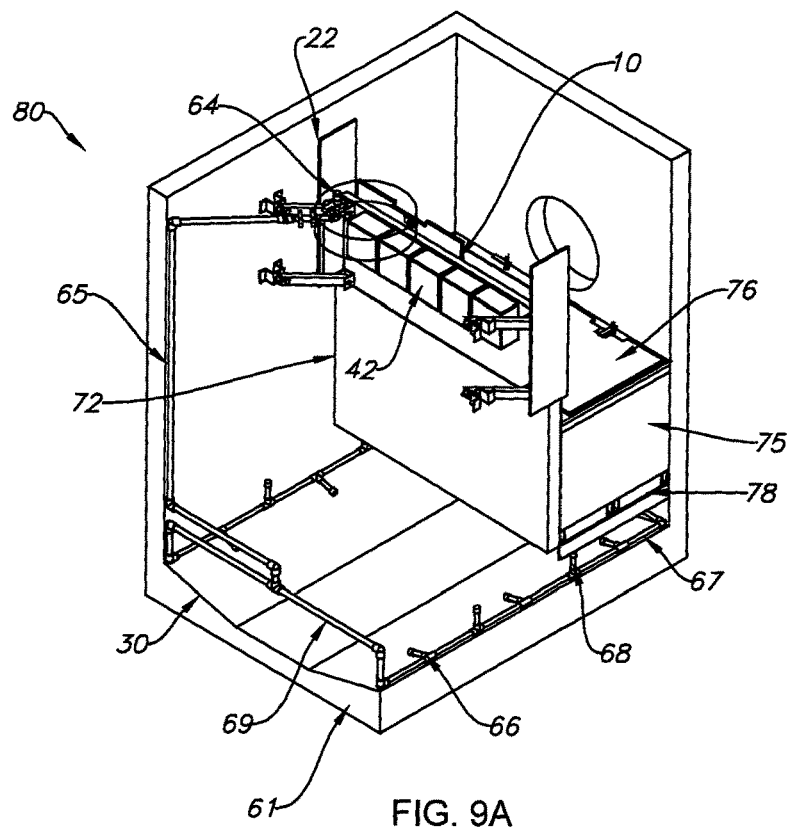

Sixth Embodiment Single Chamber Vault, Skimmer System, Float and Wheels and Upflow Media System FIG. 9 is a right cross-sectional view of another embodiment of a single chamber vault, skimmer system with or without float, with or without wheels, upflow media system with or without hydroslide system FIG. 9A is an upper front right side perspective view of FIG. 9.

Figure 9B:
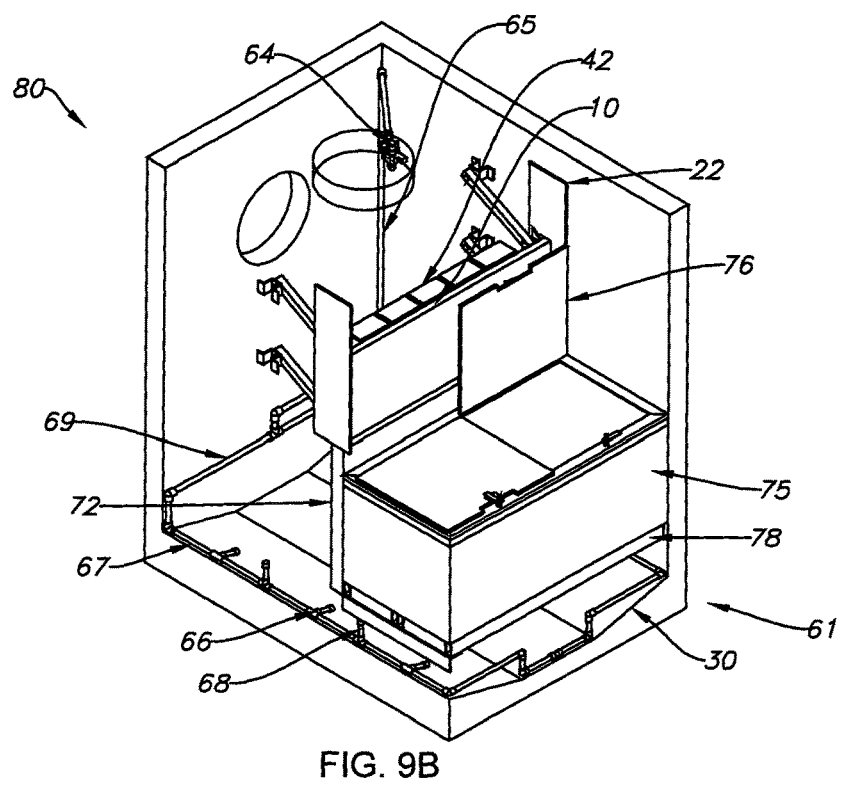

FIG. 9B is an upper rear right side perspective view of FIG. 9.

Seventh Embodiment Three Chamber Vault, Skimmer System, Float and Wheels

Figure 10:
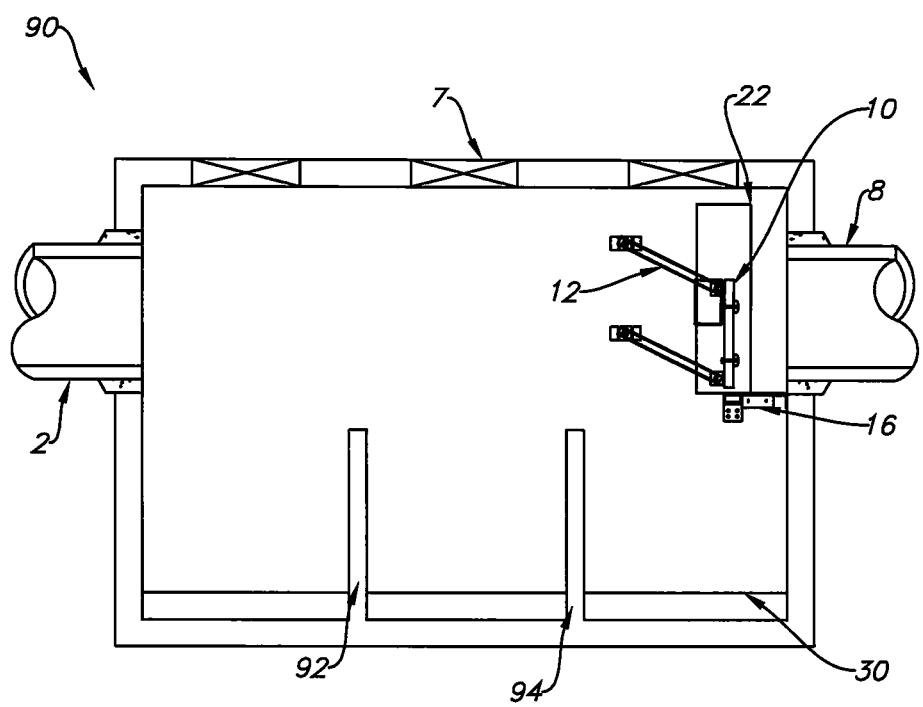

FIG. 10 is a right cross-sectional view of another embodiment of a three chamber vault with skimmer system with or without float, and with or without wheels.

Figure 10A:
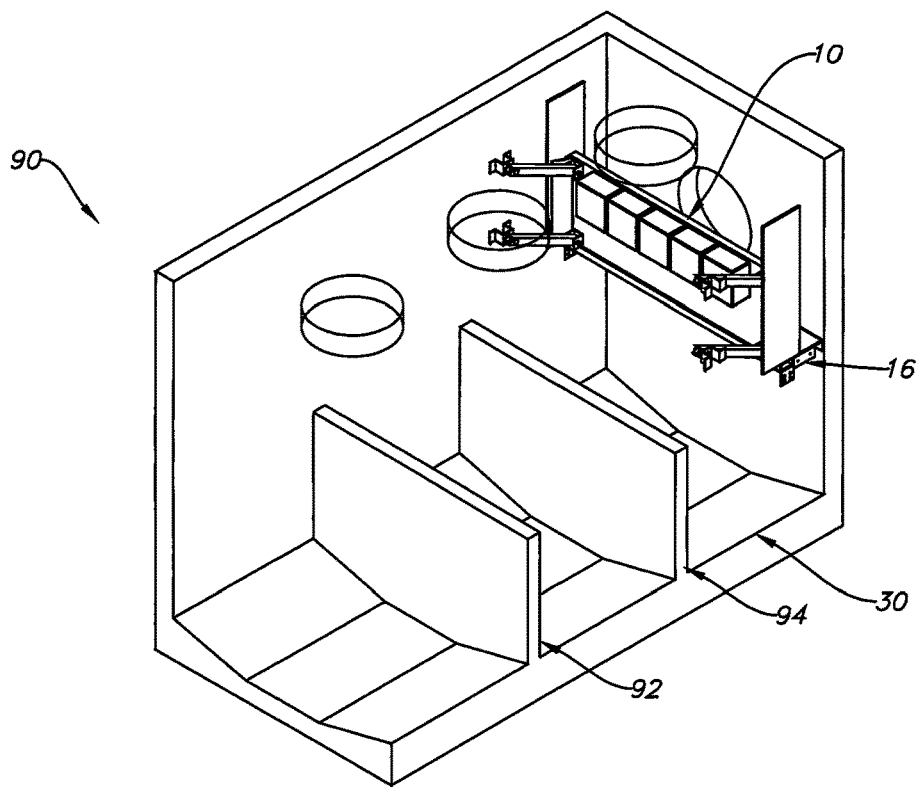

FIG. 10A is an upper front right side perspective view of FIG. 10.

Figure 10B:
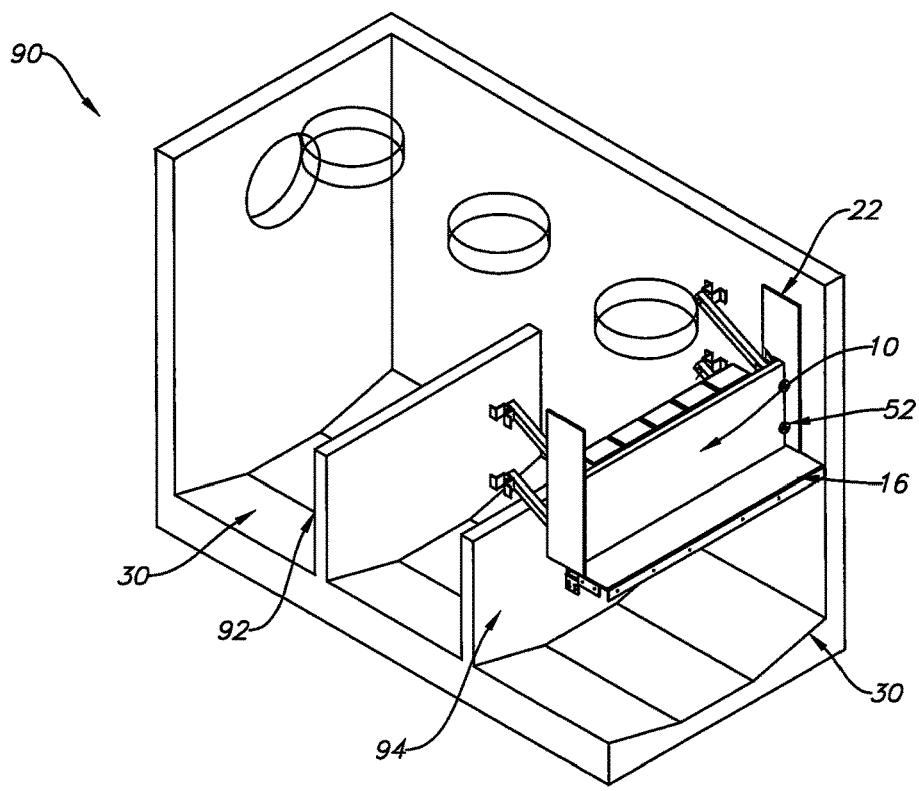

FIG. 10B is an upper rear right side perspective view of FIG. 10.

Figure 11:
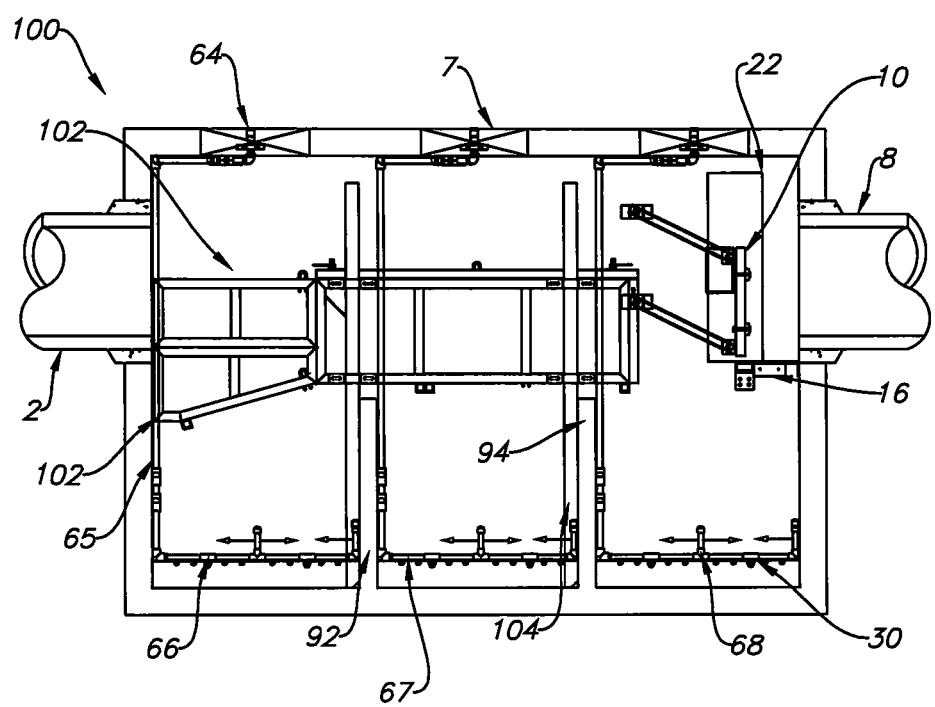
Figure 11A:
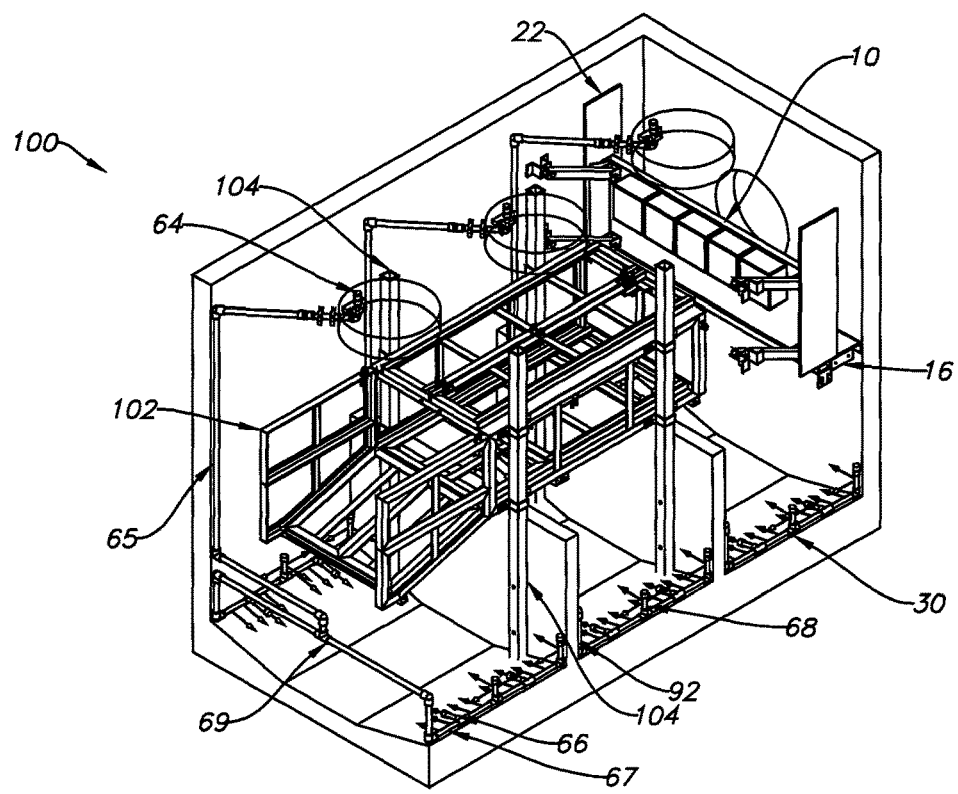

Eighth Embodiment Three Chamber Vault, Dual Screen System, Skimmer Panel with or without Float, with or without Wheels and with or without the Hydroslide System FIG. 11 is a right cross-sectional view of another embodiment of a three chamber vault, dual screen system skimmer, panel with or without float, with or without wheels, and with or without the hydroslide system FIG. 11A is an upper front right side perspective view of FIG. 11.

Figure 11B:
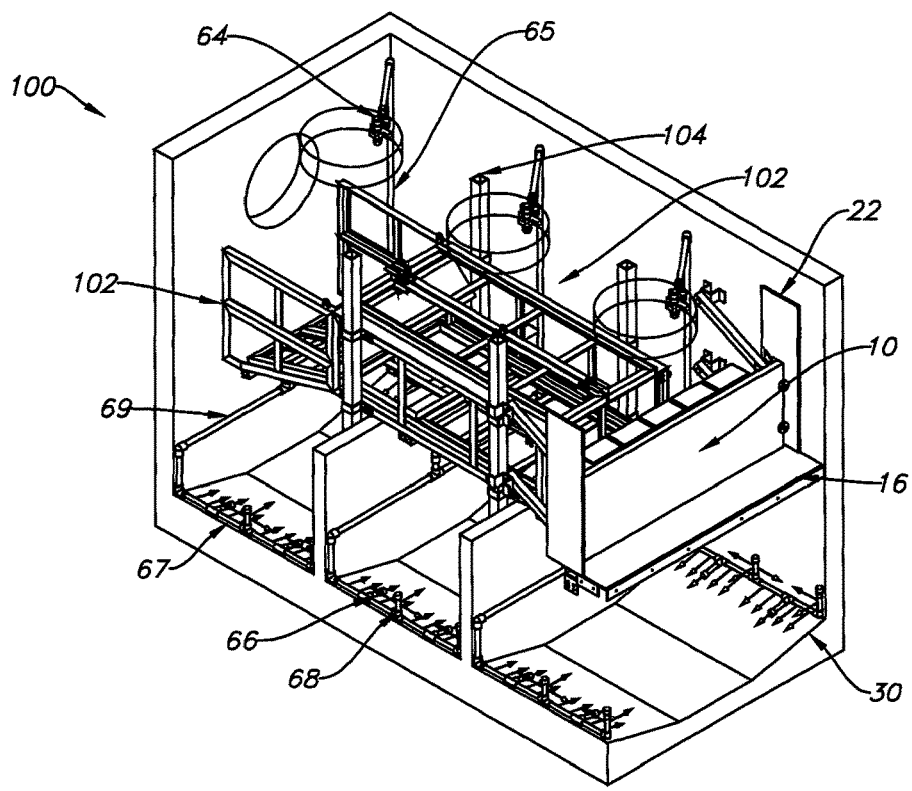

FIG. 11B is an upper rear right side perspective view of FIG. 11.

Figure 12:
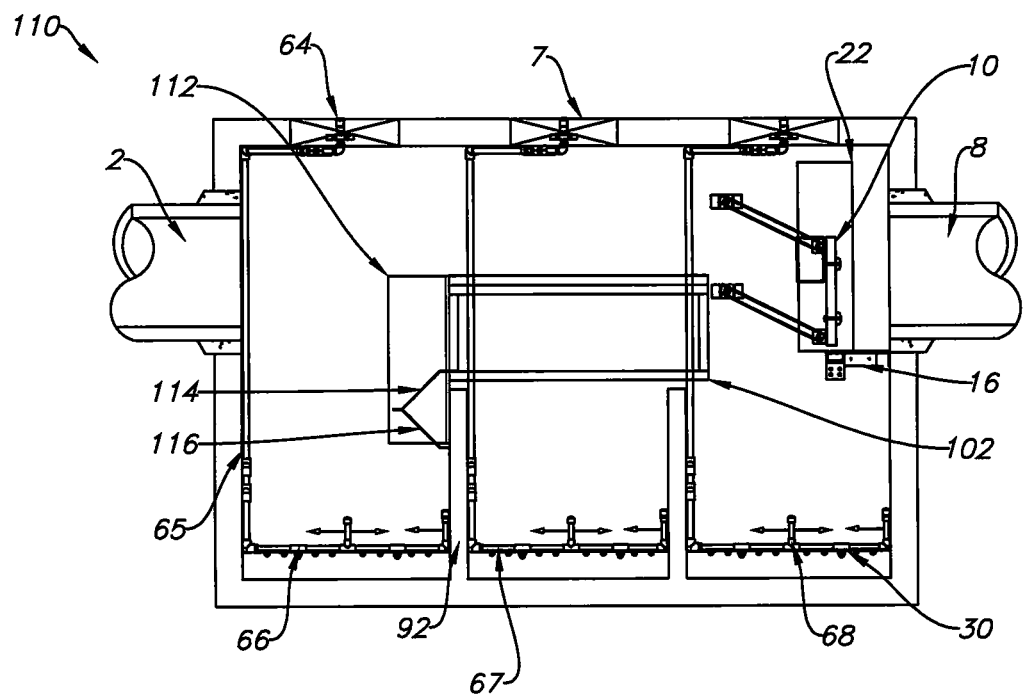
Figure 12A:
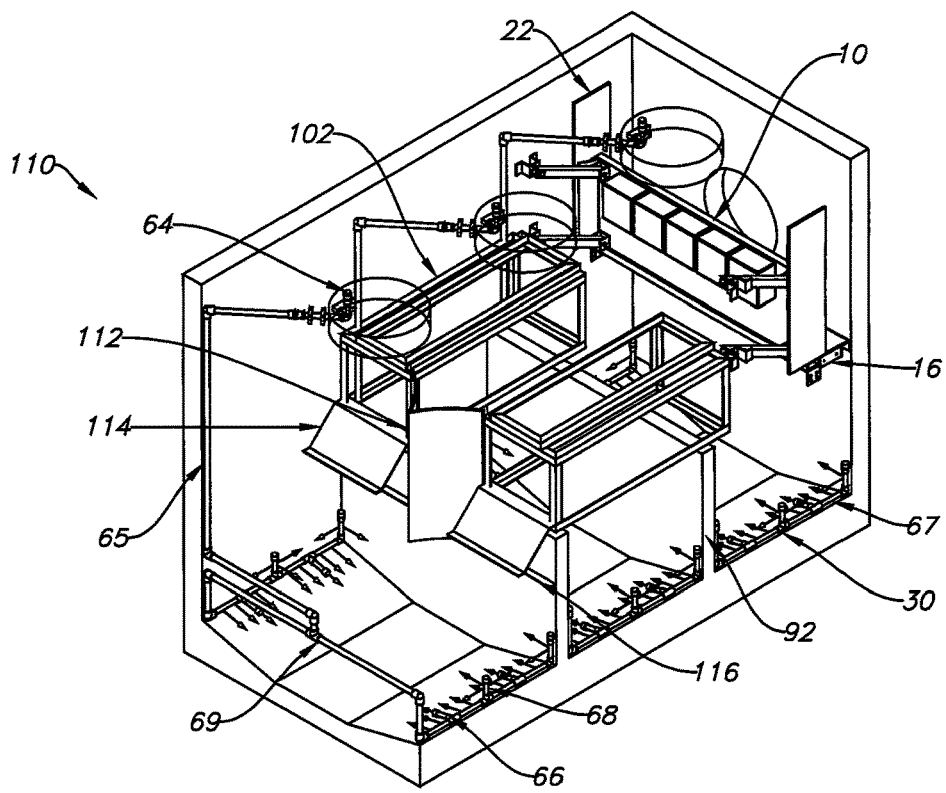

Ninth Embodiment Three Chamber Vault, Flow Spreader, Dual Screen System, Skimmer with or without Float, with or without Wheels with or without Hydroslide FIG. 12 is a right cross-sectional view of another embodiment of a three chamber vault, with flow spreader, dual screen system, skimmer panel with or without float, with or without wheels, and with or without the hydroslide system FIG. 12A is an upper front right side perspective view of FIG. 12.

Figure 12B:
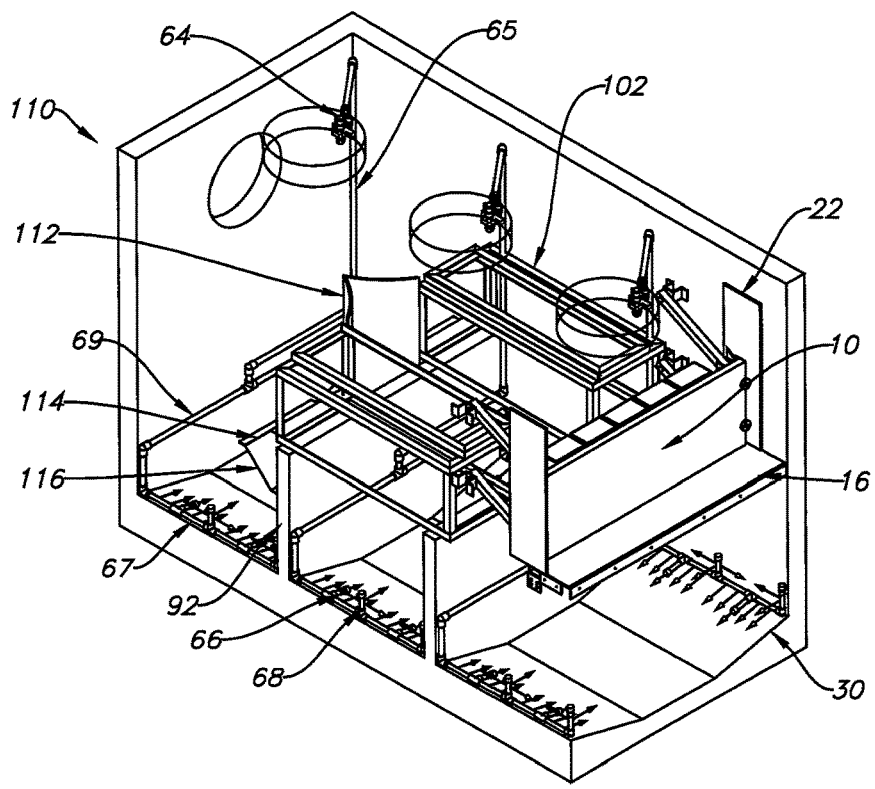

FIG. 12B is an upper rear right side perspective view of FIG. 12.

Figure 13:
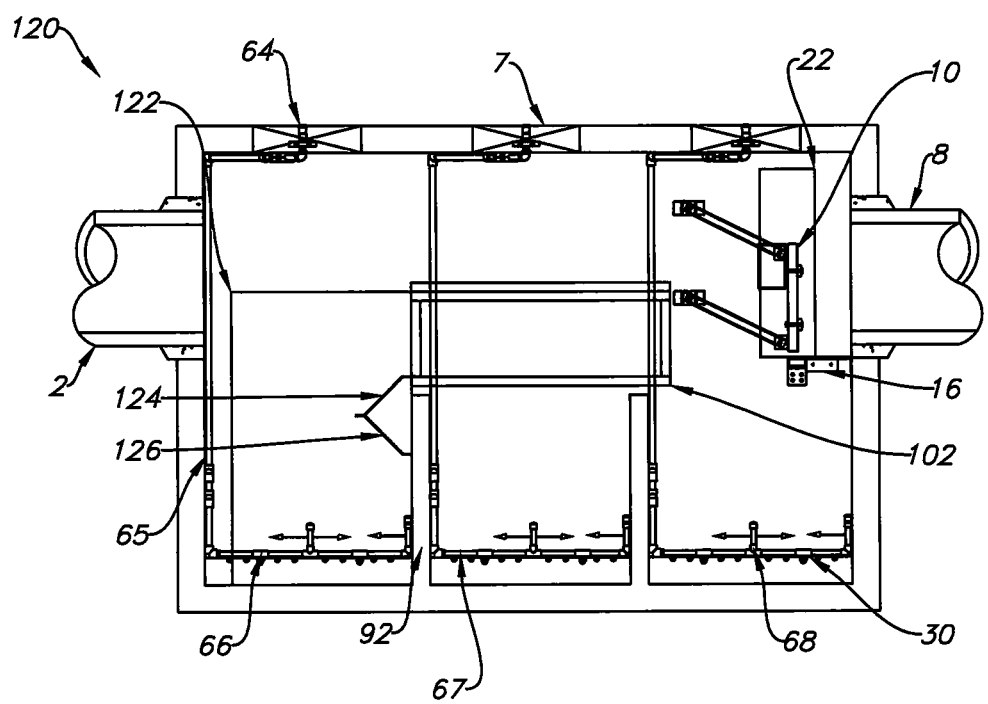

Tenth Embodiment Three Chamber Vault with Large Flow Spreader, Dual Screen System, Skimmer with or without Float, with or without Wheels with or without Hydroslide FIG. 13 is a right cross-sectional view of another embodiment of a three chamber vault, with flow spreader, dual screen system, skimmer panel with or without float, with or without wheels, and with or without the hydroslide system.

Figure 13A:
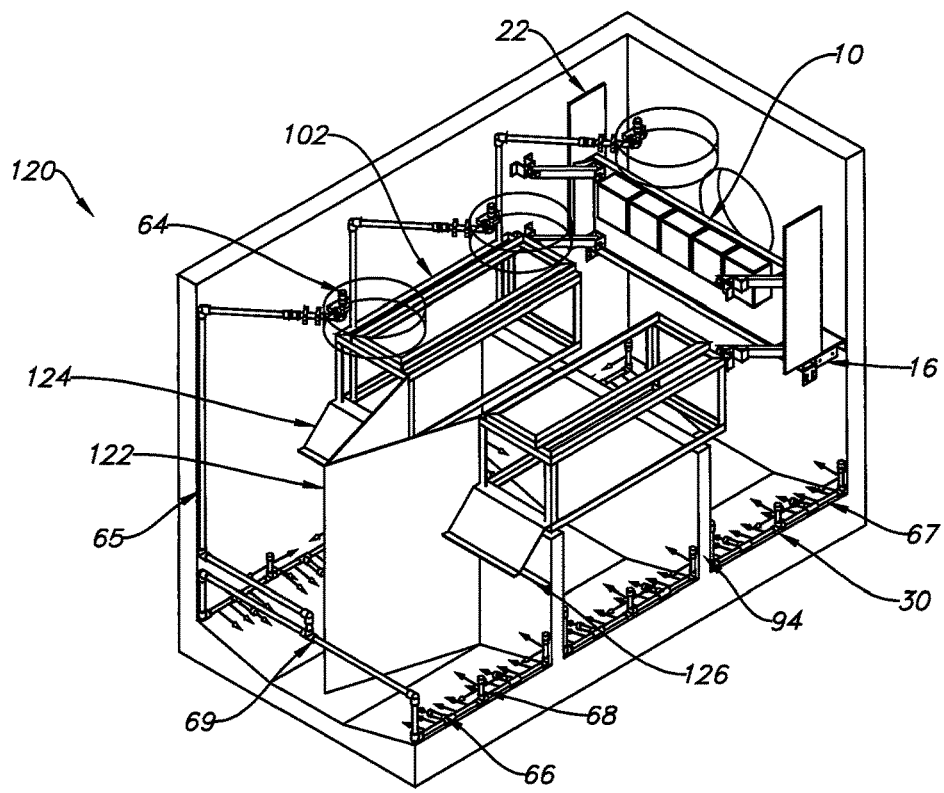

FIG. 13A is an upper front right side perspective view of FIG. 13.

Figure 13B:
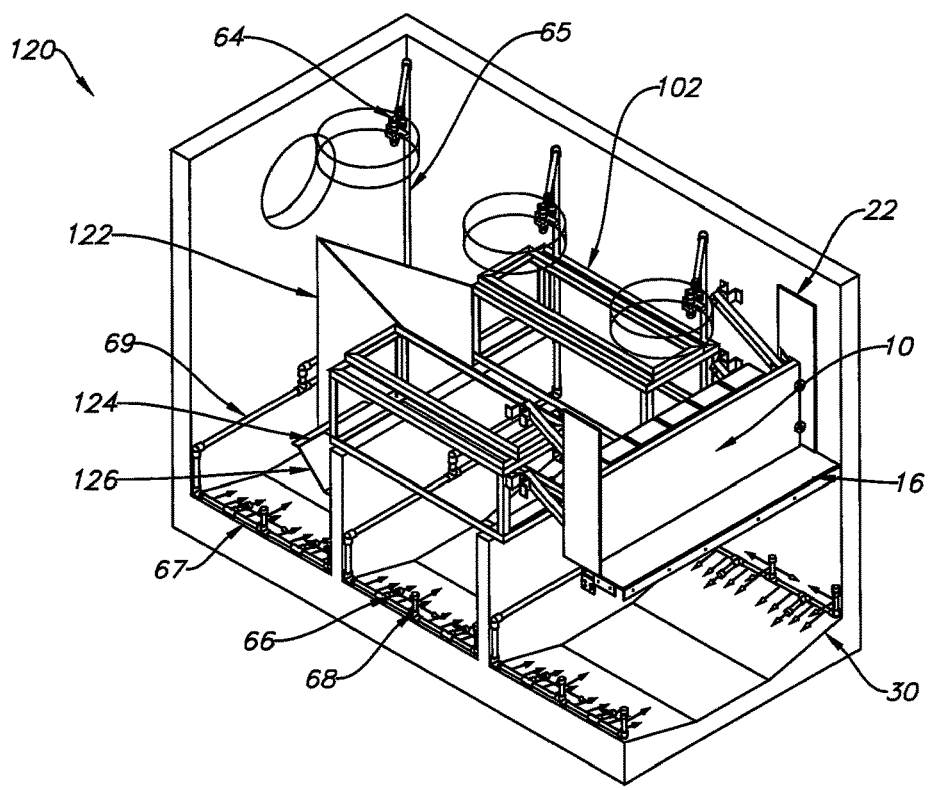

FIG. 13B is an upper rear right side perspective view of FIG. 13.

Eleventh Embodiment Vault with Skimmer System and Parallel Support Rods

Figure 14:
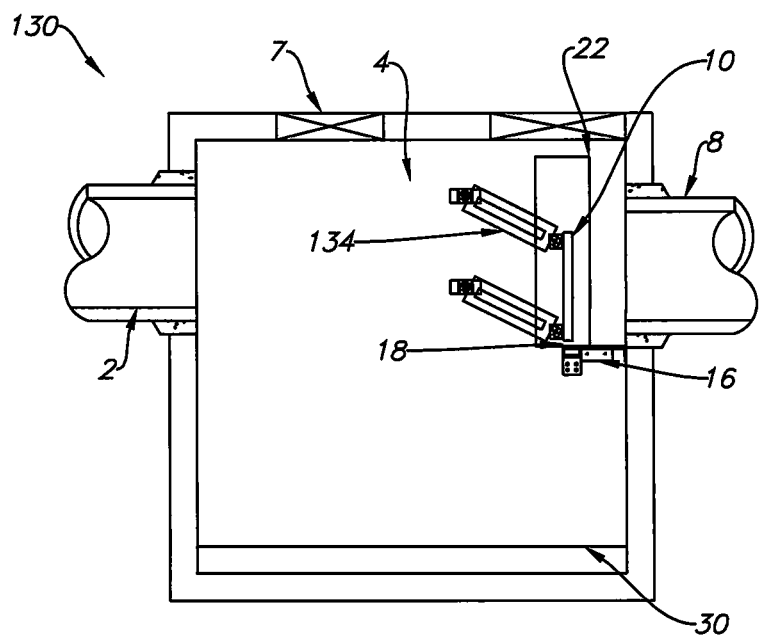

FIG. 14 is a right cross-sectional view of another embodiment of a vault with skimmer panel being pivotally attached by four sets of dual parallel support rods.

Twelth Embodiment Vault with Skimmer System and Concave Curved Support Rods

Figure 15:
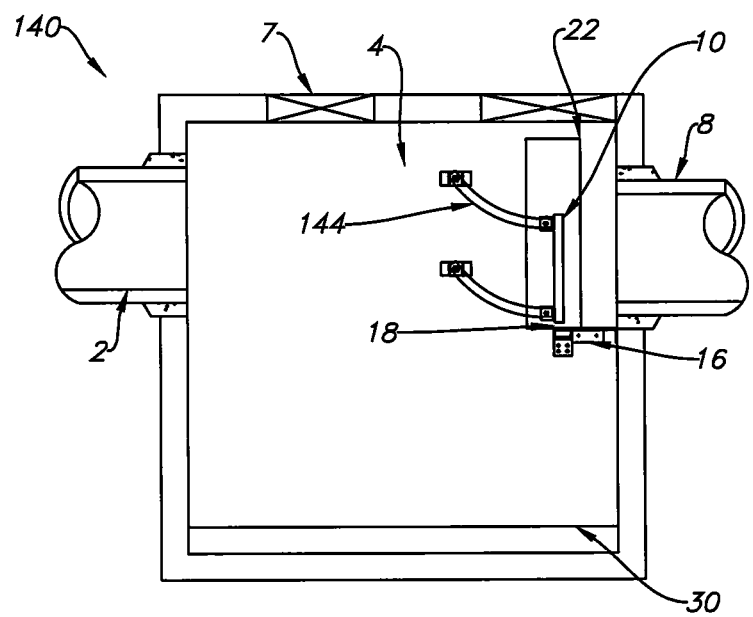

FIG. 15 is a right cross-sectional view of another embodiment of a vault with skimmer panel being pivotally attached by four concave support rods.

Thirteenth Embodiment Vault with Skimmer System and Convex Curved Support Rods

Figure 16:
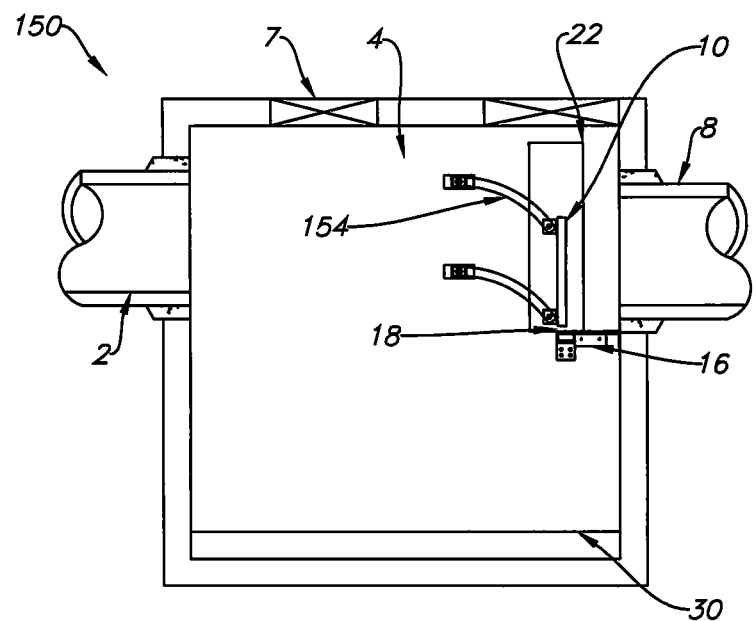

FIG. 16 is a right cross-sectional view of another embodiment of a vault with skimmer panel being pivotally attached by four convex support rods.

Fourteenth Embodiment Vault with Skimmer System and Dual Curved Support Rods

Figure 17:
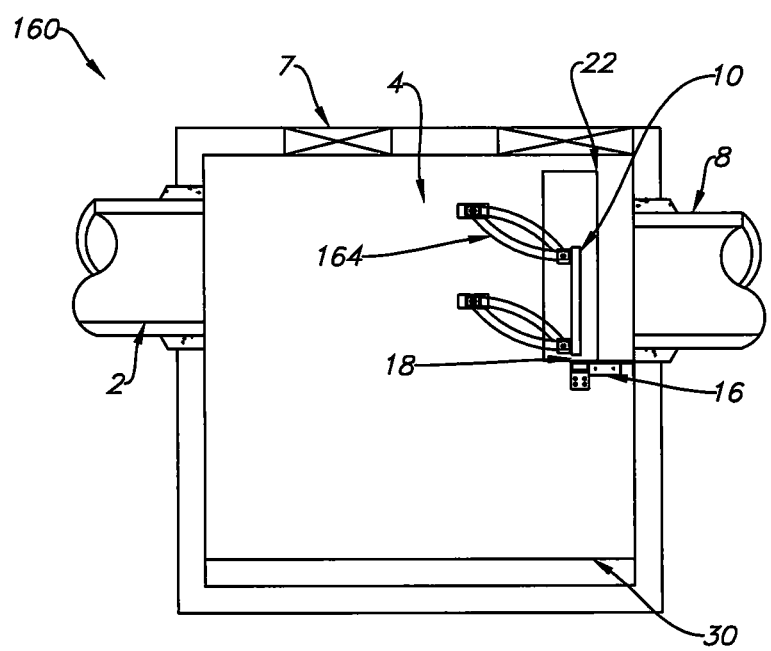

FIG. 17 is a right cross-sectional view of another embodiment of a vault with skimmer panel being pivotally attached by four sets of dual convex and concave support rods.

Figure 18:
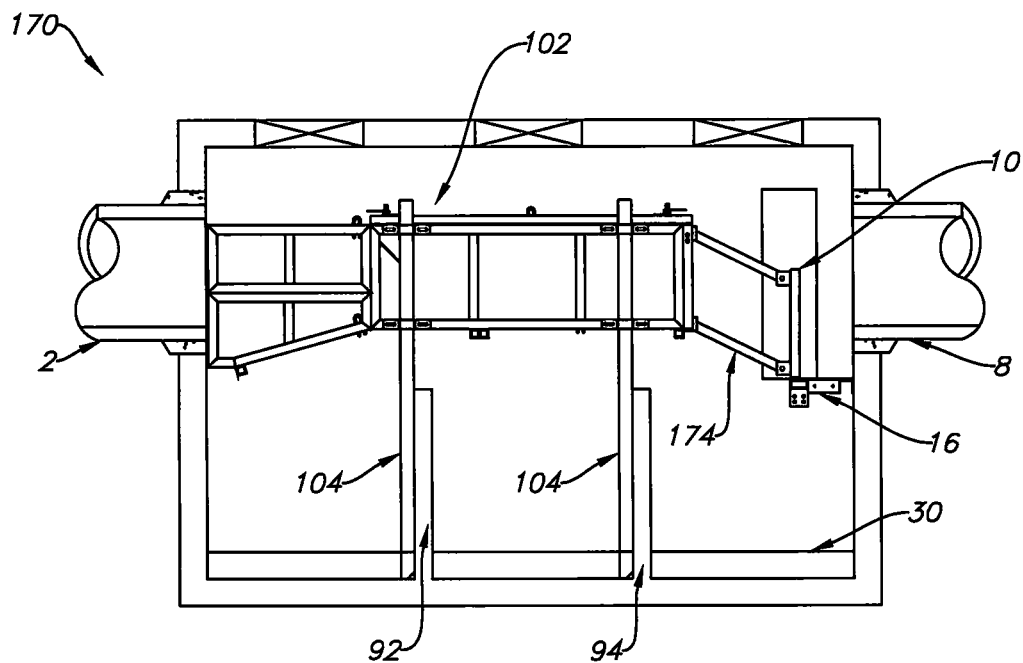

Fifteenth Embodiment Vault with Skimmer System with Pivot Points Attached to Screen System FIG. 18 is a right cross-sectional view of another embodiment of a vault with a skimmer panel being pivotally attached to a dual screen system by pivotal support rods.

Figure 18A:
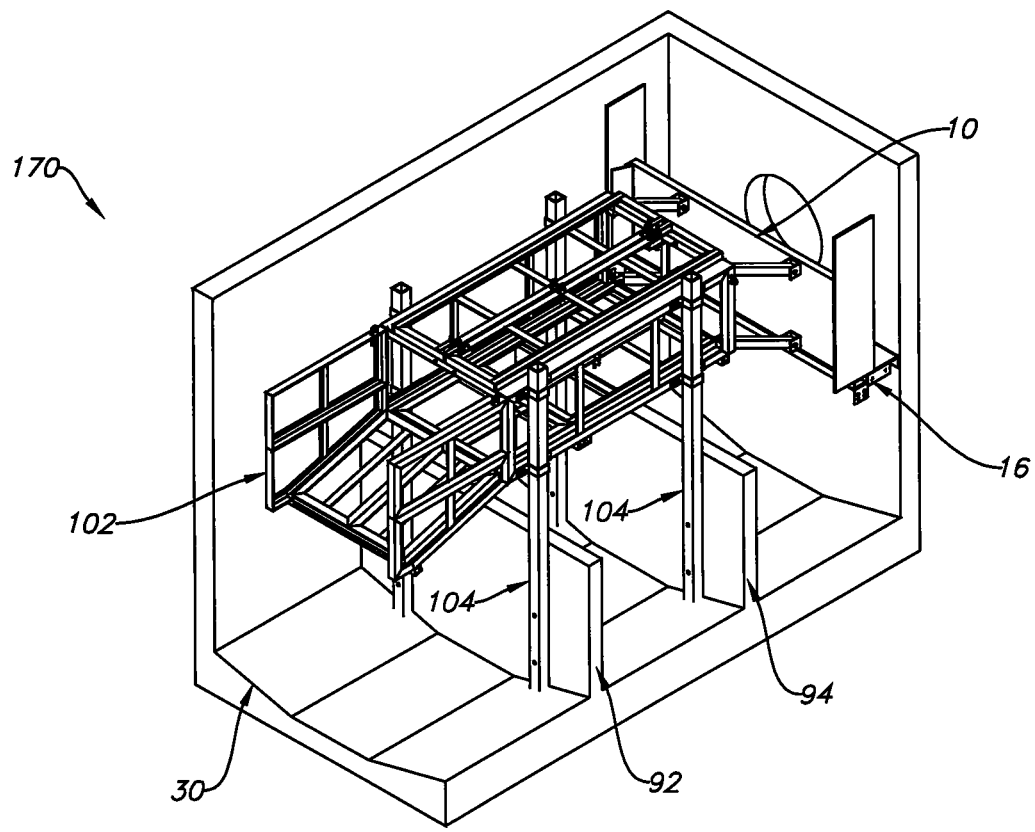

FIG. 18A is an upper right perspective view of FIG. 18.

Figure 19:
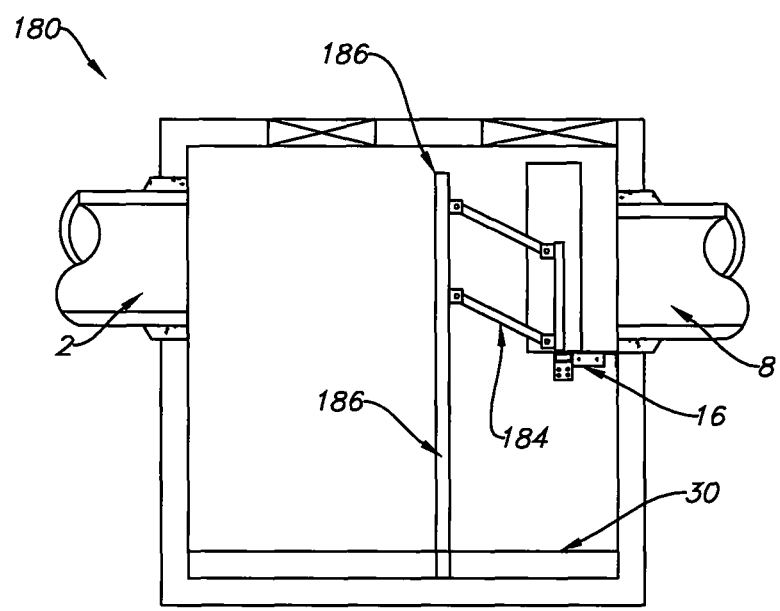

Sixteenth Embodiment Vault with Skimmer System with Pivot Points Attached to Vertical Beams FIG. 19 is a right cross-sectional view of another vault with a skimmer panel being pivotally attached by support rods to two vertical beams.

Figure 19A:
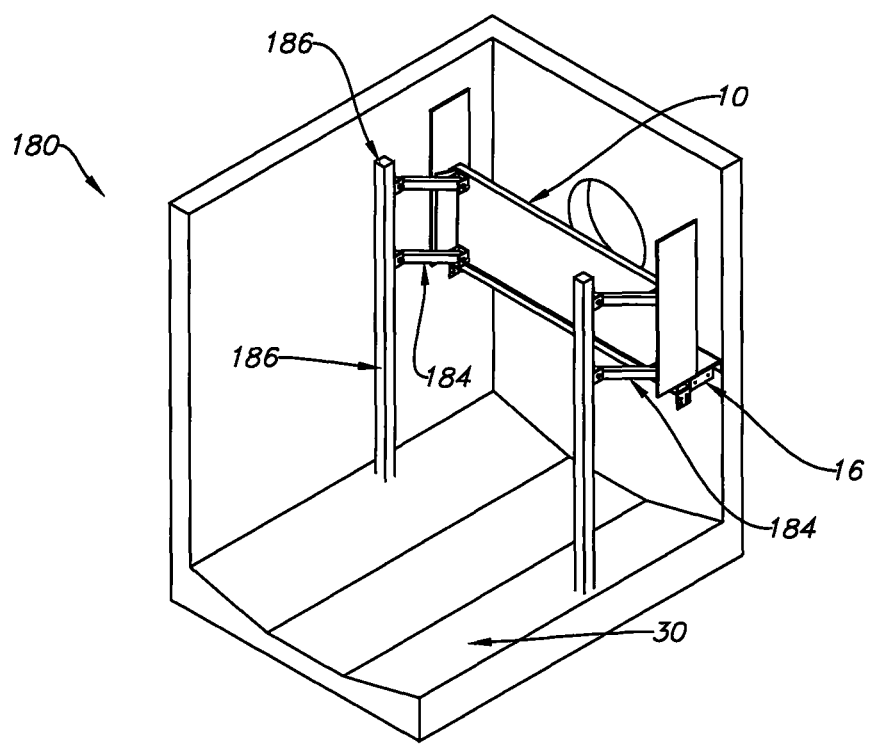

FIG. 19A is an upper right perspective view of FIG. 19.

Figure 20:
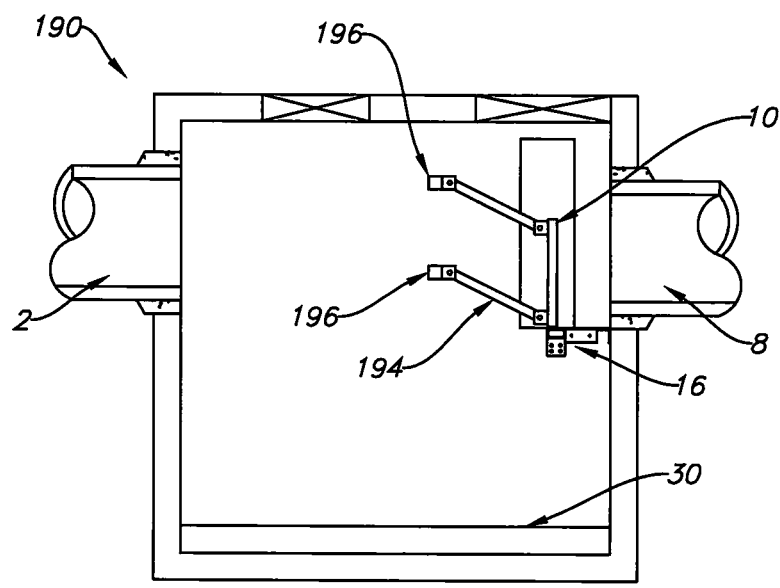

Seventeenth Embodiment Vault with Skimmer System with Pivot Points Attached to Horizontal Beams FIG. 20 is a right cross-sectional view of another vault with a skimmer panel being pivotally attached by support rods to two horizontal beams.

Figure 20A:
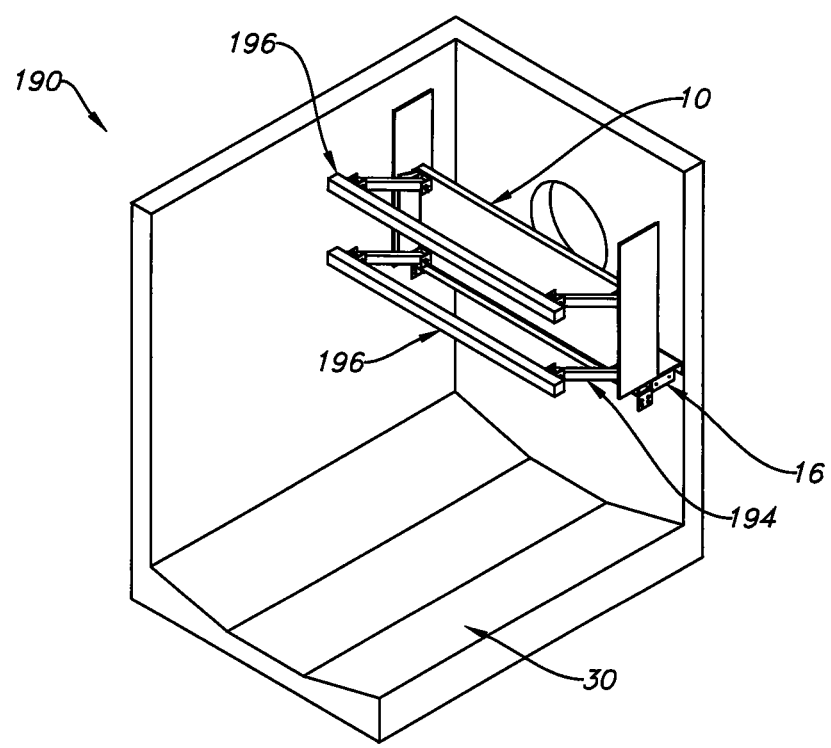

FIG. 20A is an upper right perspective view of FIG. 20.

Figure 21:
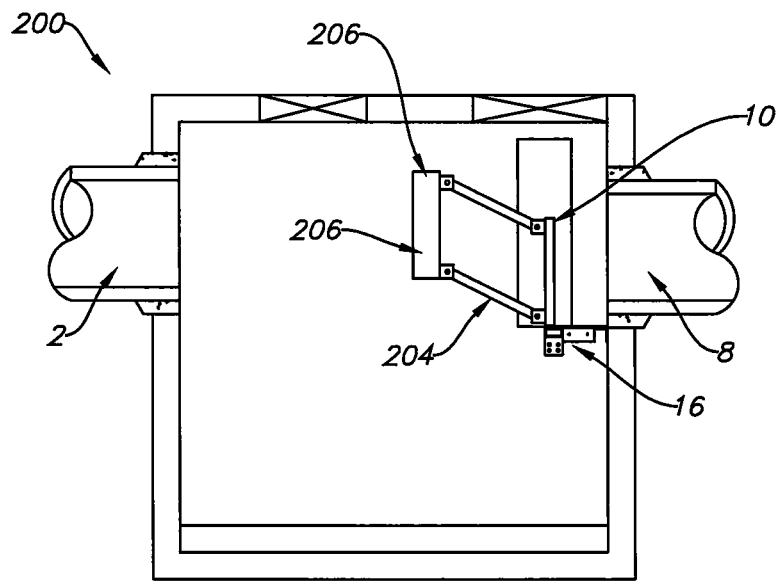

Eighteenth Embodiment Vault with Skimmer System and Pivot Points Attached to Stem Walls FIG. 21 is a right cross-sectional view of another vault with a skimmer panel being pivotally attached to stem walls by pivotal support rods.

Figure 21A:
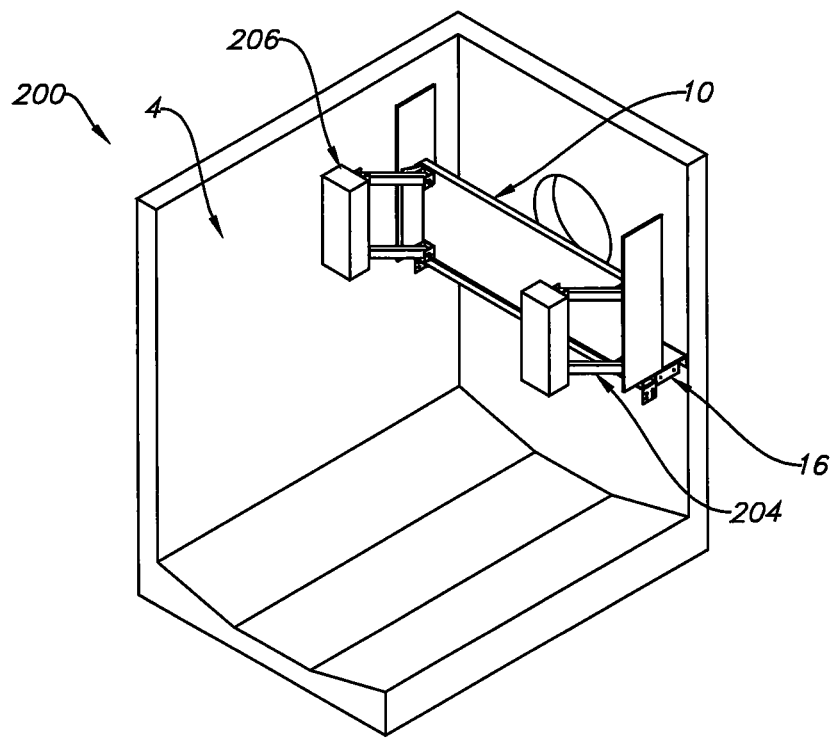

FIG. 21A is an upper right perspective view of FIG. 21.

Figure 22:
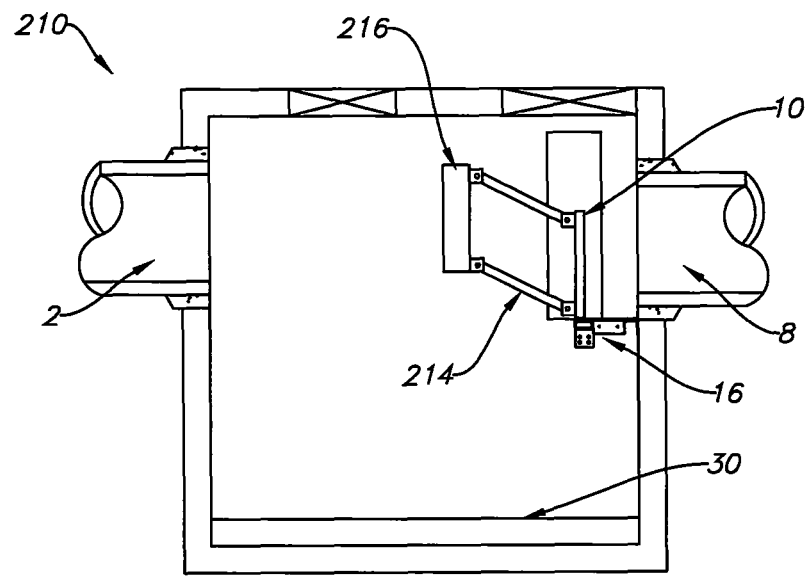

Nineteenth Embodiment Vault with Skimmer System and Pivot Points Attached to Baffle FIG. 22 is a right cross-sectional view of another vault with skimmer panel being pivotally attached to a baffle by pivotal support rods.

Figure 22A:
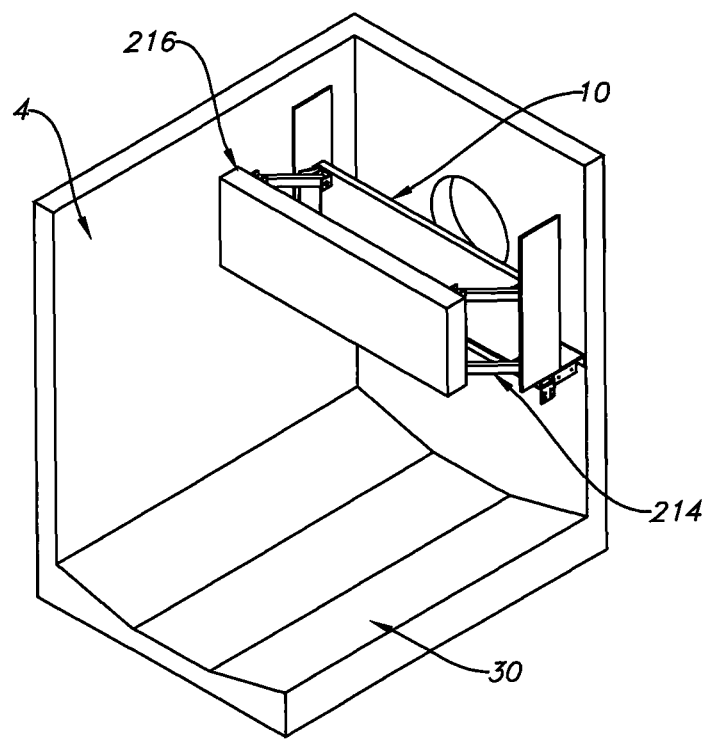

FIG. 22A is an upper right perspective view of FIG. 22.

Figure 1:
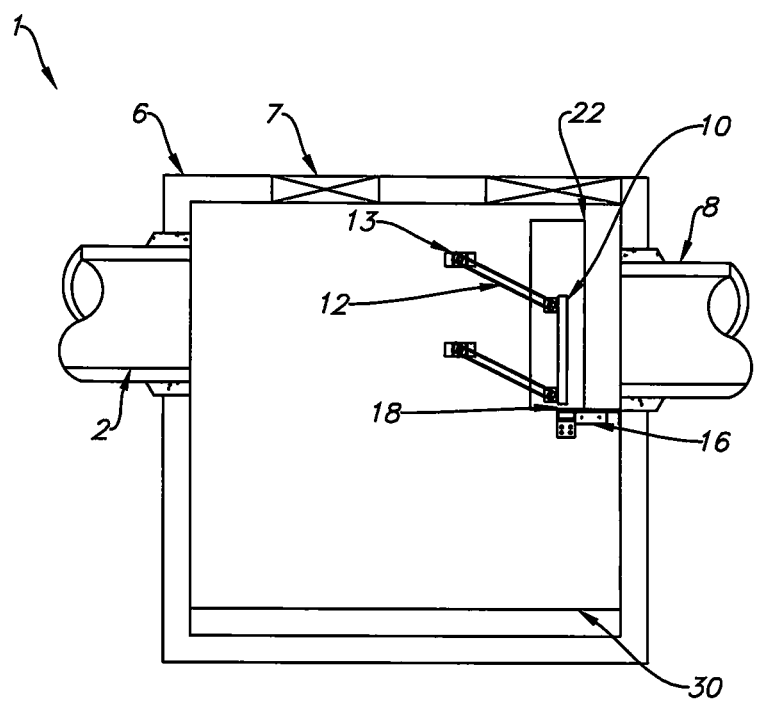
FIG. 1 is a right side cross sectional view of a single chamber vault and skimmer system in a down position relative to a shelf.
Figure 2:
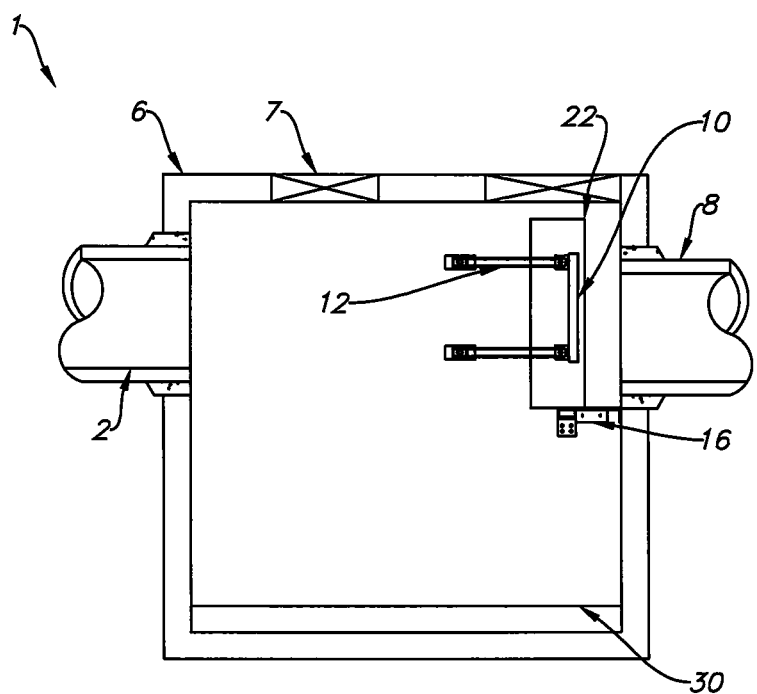
FIG. 2 another view of the single chamber vault and skimmer system of FIG. 1 in an up position relative to the shelf.
Figure 23A:
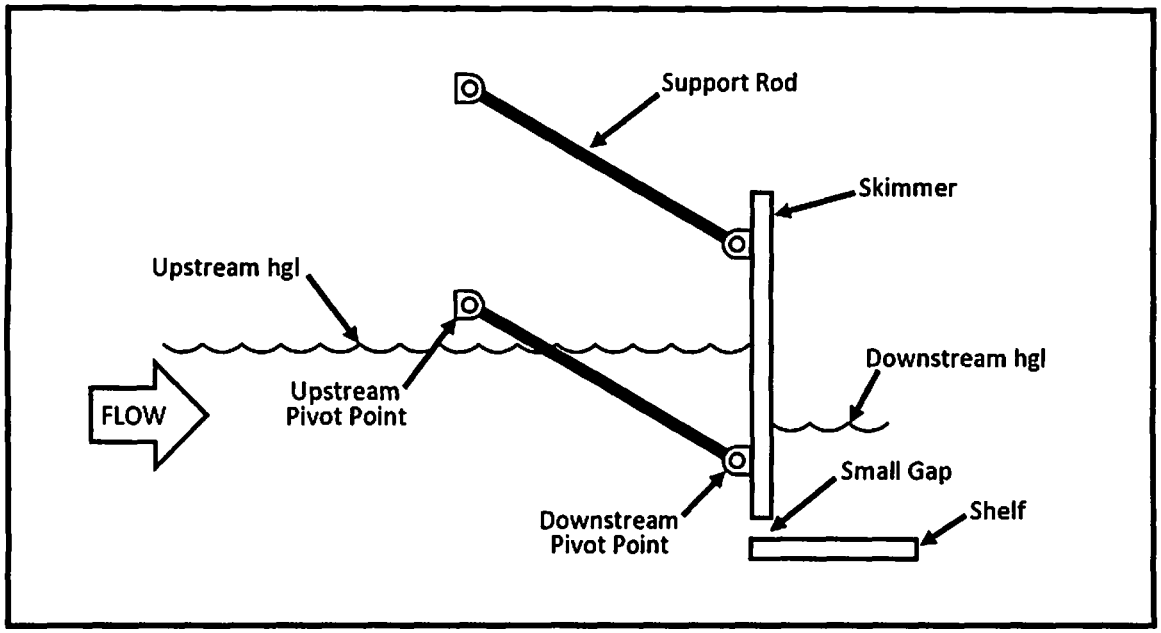

FIG. 23A is a schematic showing the skimmer panel of FIGS. 1-2 in the down and resting position with small gap between the bottom of the skimmer panel and the shelf enables water to pass through.

Figure 23B:
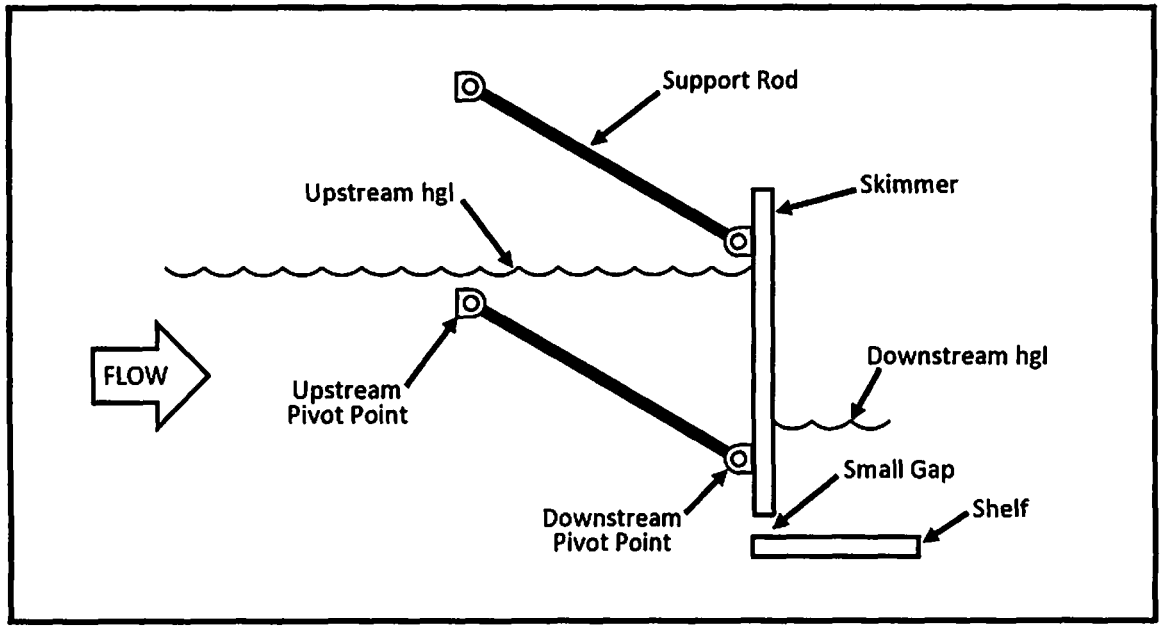

FIG. 23B is a schematic showing hydraulic pressure of flowing water is adequately elevated and greater on the upstream side of the skimmer panel compared to the hydraulic pressure on the downstream side.

Figure 23C:
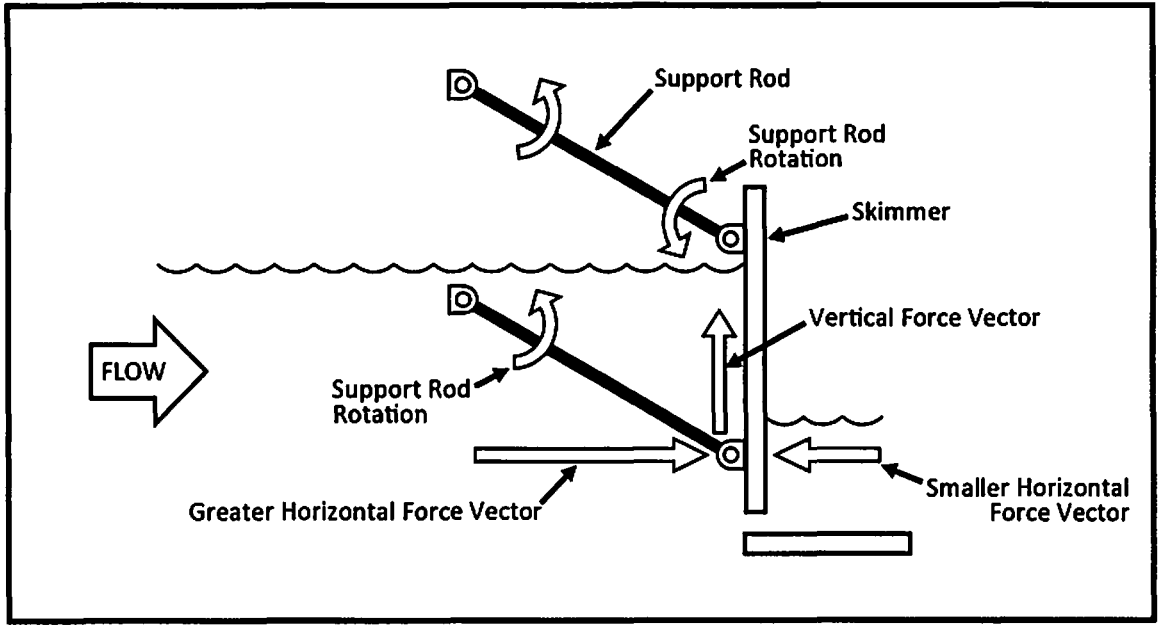

FIG. 23C is a schematic showing horizontal force vector on the upstream side of the skimmer panel is adequately greater that of the horizontal force vector on the downstream side of the skimmer panel.

Figure 23D:
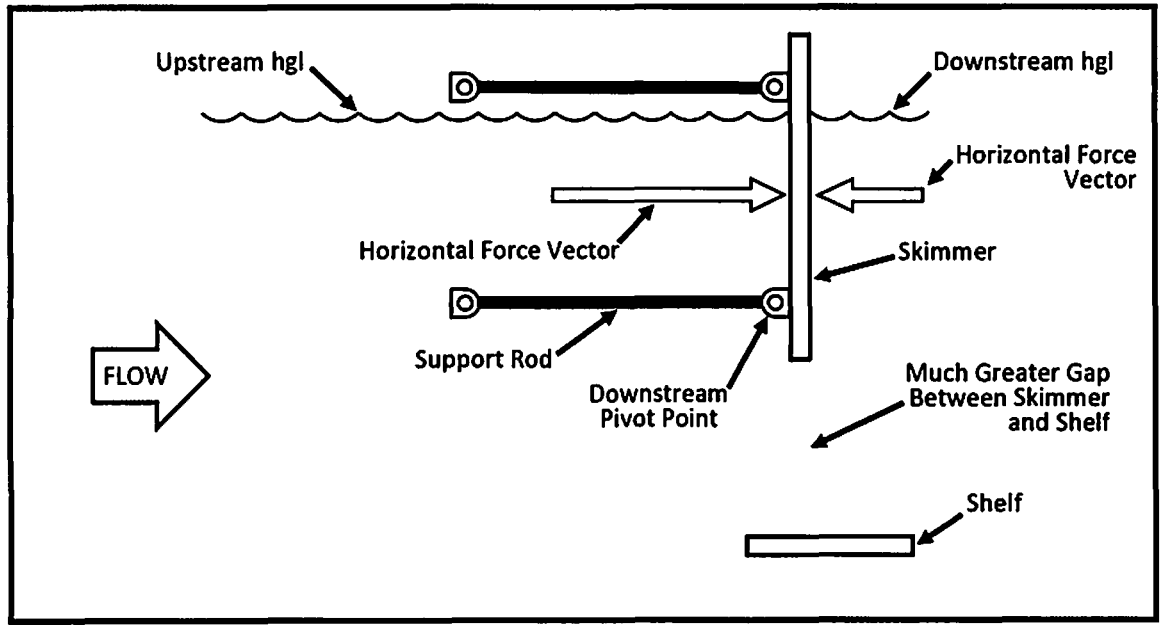

FIG. 23D shows as the flow rate through the treatment system increases the hgl on the upstream side of the skimmer panel 10 can also increase.

Figure 23E:
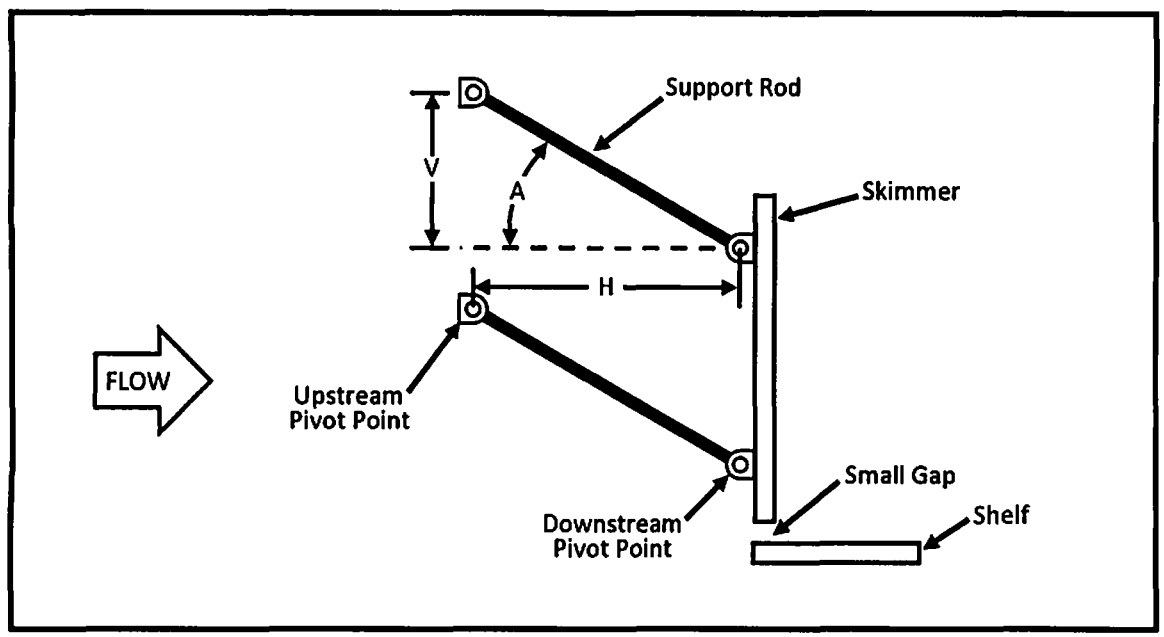

FIG. 23E shows as the skimmer panel raises and the hgl on the downstream side of the skimmer panel 12 comes closer in elevation to that of the hgl on the upstream side of the skimmer panel, the buoyancy of the skimmer panel increases which will add to the geometric force vector.

Figure 24:
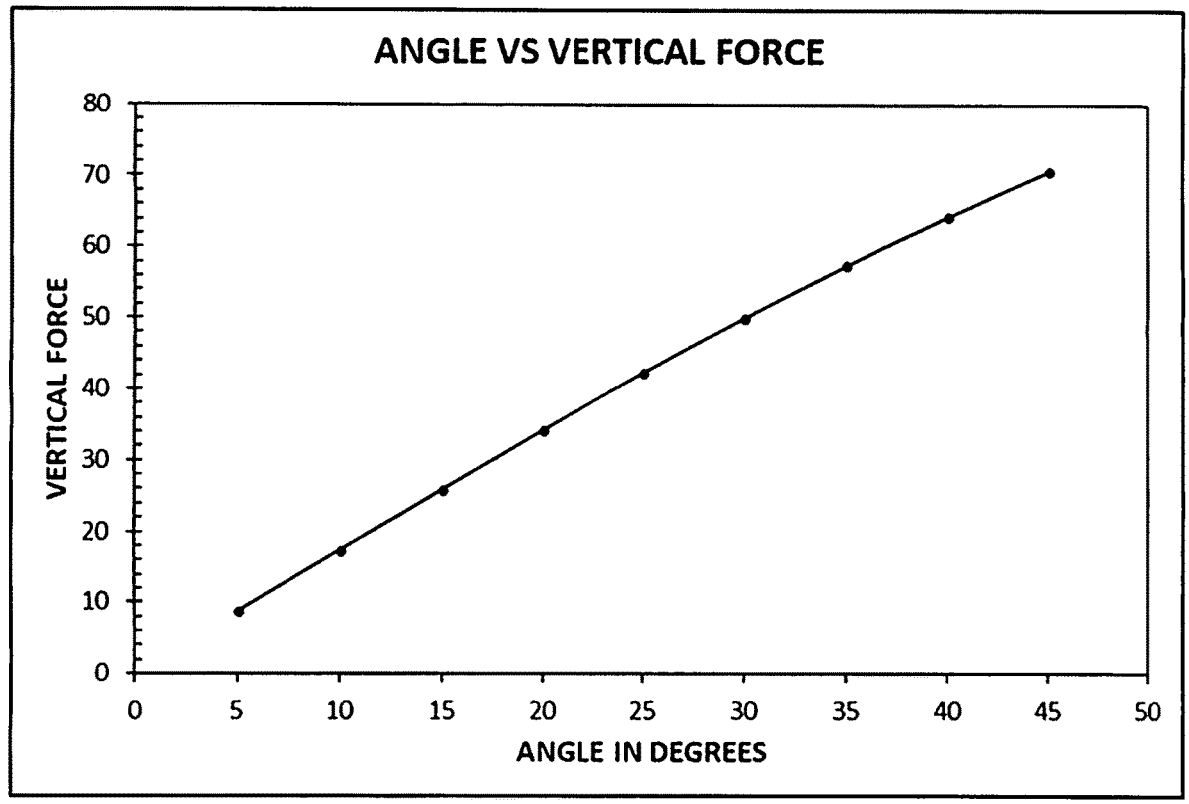

FIG. 24 is a graph of angle in degrees verses vertical force.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1A:
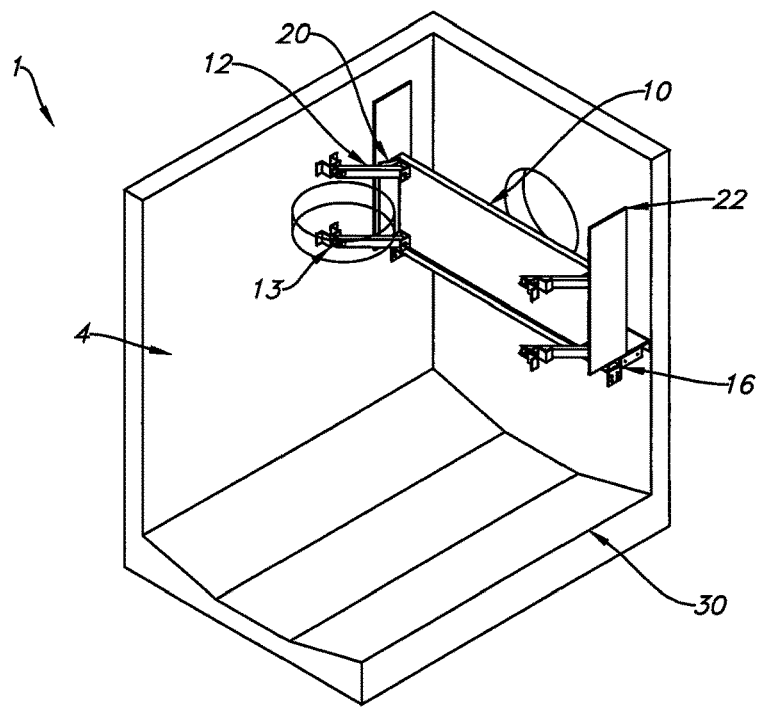
FIG. 1A is an upper front right side perspective view of FIG. 1.
Figure 1B:
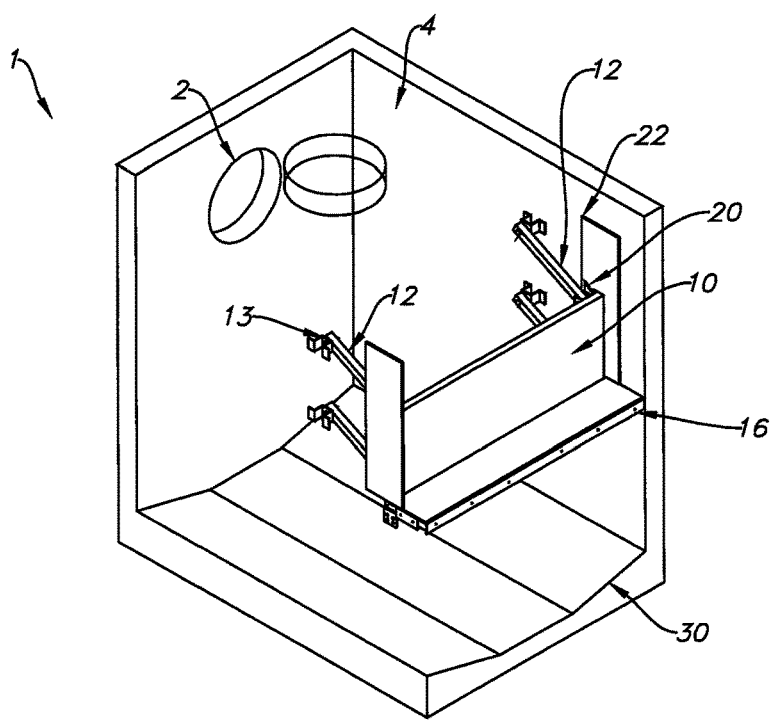
FIG. 1B is an upper rear right side perspective view of FIG. 1.
Figure 1C:
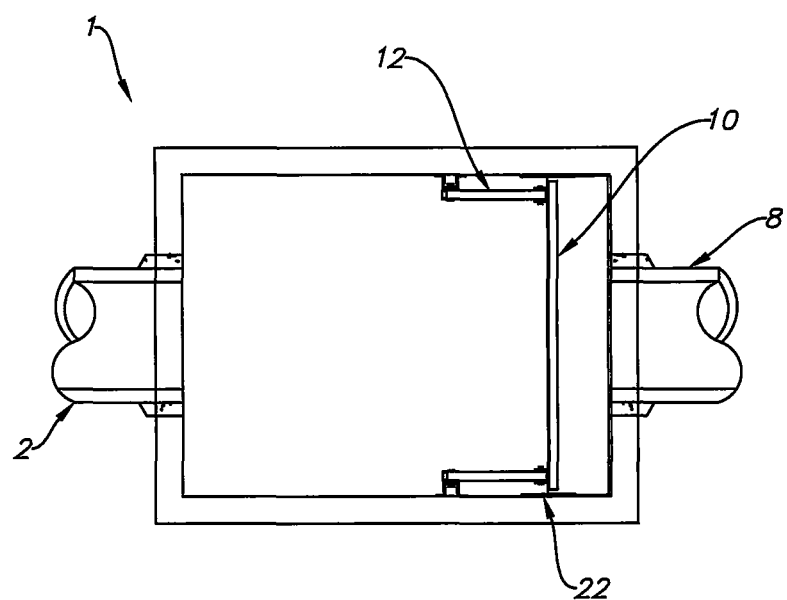
FIG. 1C is a top view of FIG. 1.
Figure 1D:
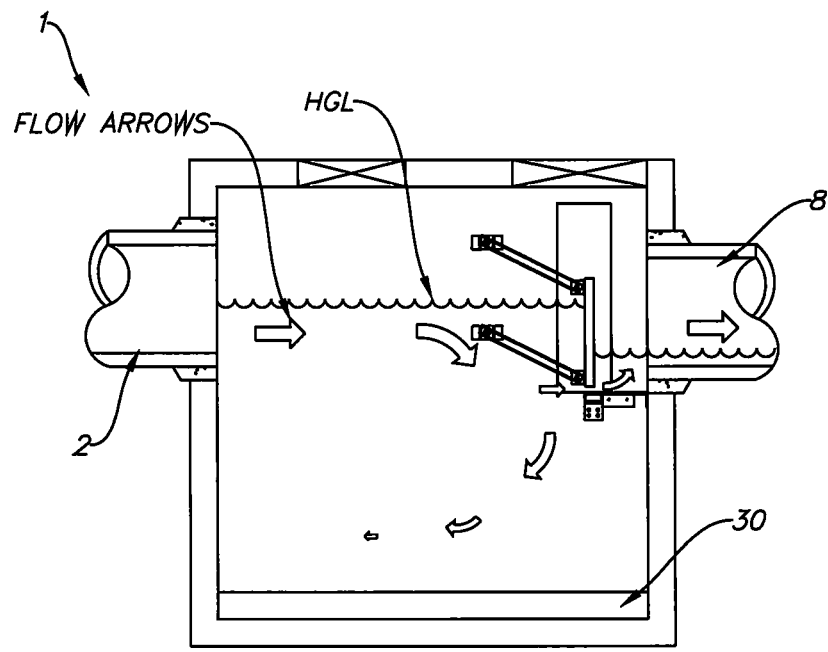
FIG. 1D is another side view of FIG. 1 showing HGL and flow arrows.
Figure 1E:
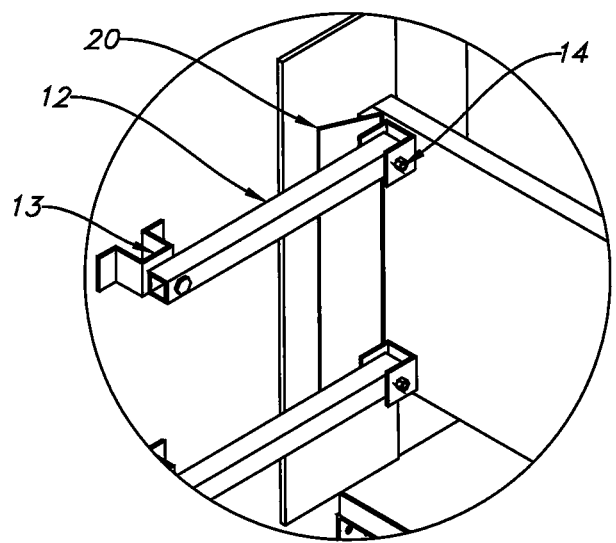
FIG. 1E is an enlarged view of a pivotable support rod and seal portion of FIG. 1.

A LIST OF COMPONENTS WILL NOW BE DESCRIBED 1 single chamber vault/box/system with skimmer system
2 inflow pipe/line
4 side walls of vault/box
6 top of vault/box
7 access point
8 outflow pipe/line
10 skimmer panel
12 support rod
13 wall pivot end
14 panel pivot end
16 shelf
18 gap on top of shelf to panel
18B gap in front of shelf and panel
18C gap in front of and above shelf relative to panel
19 no gap between bottom of panel and shelf
20 seal/flange (flexible seals)
22 sliding surface (slick surface)
30 sloped floor
40 single chamber vault/box/system with skimmer system and float
42 float for skimmer panel
43 gap between float and skimmer panel
50 single chamber vault/box/system with skimmer system, float and wheels
52 wheels
60 single chamber vault/box/system with skimmer system, float and
60 hydroslide system hydroslide system
62 water connection line
64 water line
66 spray lever
67 spray bar along corner of floor
68 spray knife
69 split flow tee 70 single chamber vault/box/system with skimmer system with or without float, baffle, media inside media container with lower screens, and screened lids.
72 baffle
74 container with media
75 media
76 screened lids
78 lower screens
80 single chamber vault, skimmer with or without float, with or without wheels, baffle, media container, screens, with or without hydroslide system.
90 three chamber vault, skimmer with or without float.
92 first baffle
94 second baffle
100 three chamber vault, dual screen system, skimmer panel with or without float, seal/flange(s) or wheels, and with or without the hydroslide system
102 dual screen system
104 legs
110 three chamber vault, flow spreader, dual screen system, skimmer panel with or without float, seal/flange(s) or wheels, with or without hydroslide system
112 flow spreader
114 trash ramp
116 screened deflector
120 three chamber vault, large flow spreader, dual screen system, skimmer panel with or without float, seal/flange(s) or wheels, with or without hydroslide
122 large flow spreader
124 trash ramp
126 screened deflector
130 vault with skimmer panel having four sets of pivotable parallel support rods.
134 set of parallel support rods
140 vault with skimmer panel having pivotal concave support rods
144 concave support rods
150 vault with skimmer panel having pivotal convex support rods
154 convex support rods
160 vault with skimmer panel attached to screen system with dual convex and concave pivotal support rods
164 dual convex and concave pivotal support rods
170 vault with skimmer panel attached to dual screen system with pivotal support rods
174 pivotal support rods
180 vault with skimmer panel attached to vertical beams with pivotal support rods
184 pivotal support rods
186 vertical beams
190 vault with skimmer panel attached to stem walls with pivotal support rods
194 pivotal support rods
196 horizontal beams
200 vault with skimmer panel attached to stem walls with pivotal support rods
204 pivotal support rods
206 stem wall(s)
210 vault with skimmer panel attached to baffle with pivotal support rods
214 pivotal support rods
216 baffle First Embodiment Single Chamber Vault and Skimmer FIG. 1 is a right side cross sectional view of a single chamber vault and skimmer system 1 in a down position relative to a shelf. FIG. 1A is an upper front right side perspective view of FIG. 1. FIG. 1B is an upper rear right side perspective view of FIG. 1. FIG. 1C is a top view of FIG. 1. FIG. 1D is another side view of FIG. 1 showing HGL and flow arrows. FIG. 1E is an enlarged view of a pivotable support rod 12 and seal portion 20 of FIG. 1.

Figure 2C:
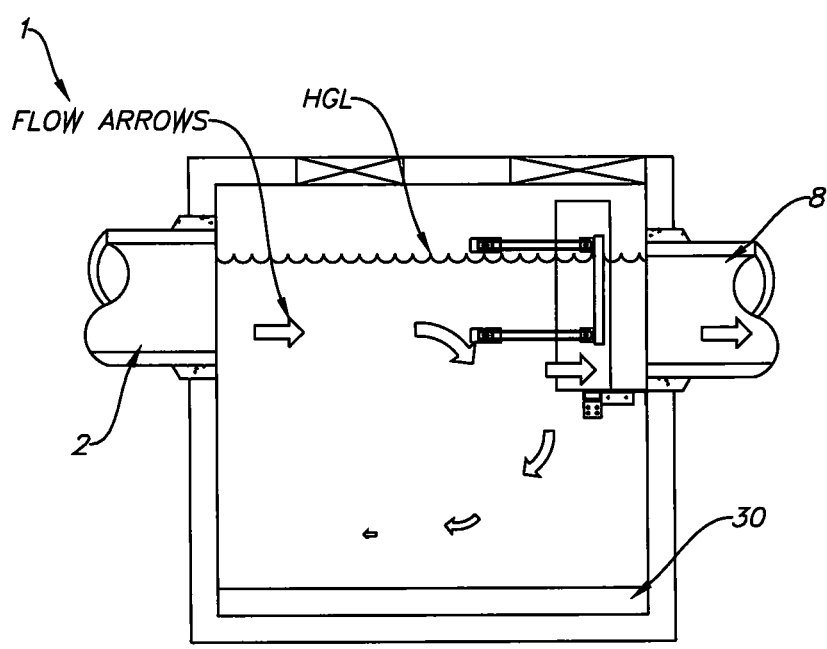
FIG. 2C is another side view of FIG. 2 showing HGL and flow arrows.
Figure 2A:
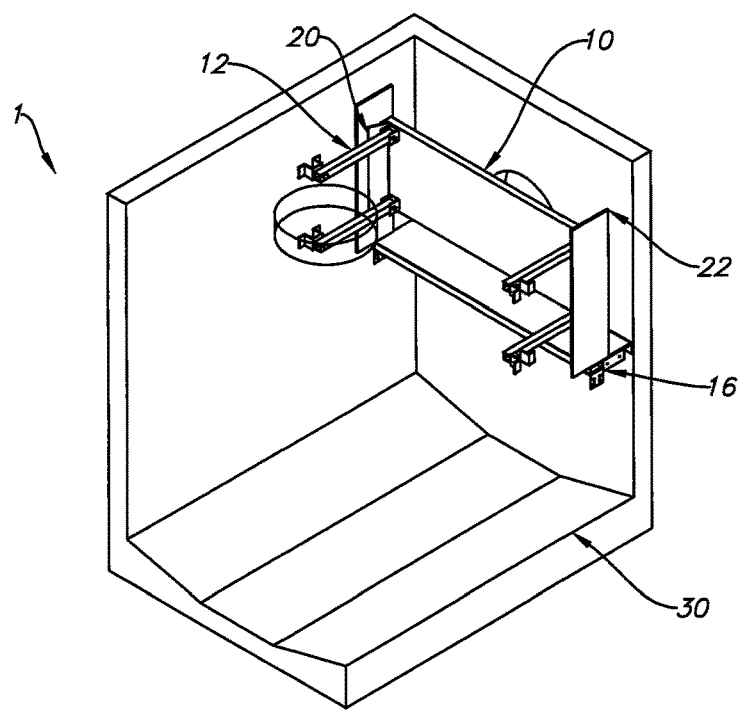
FIG. 2A is an upper front right side perspective view of FIG. 2.
Figure 2B:
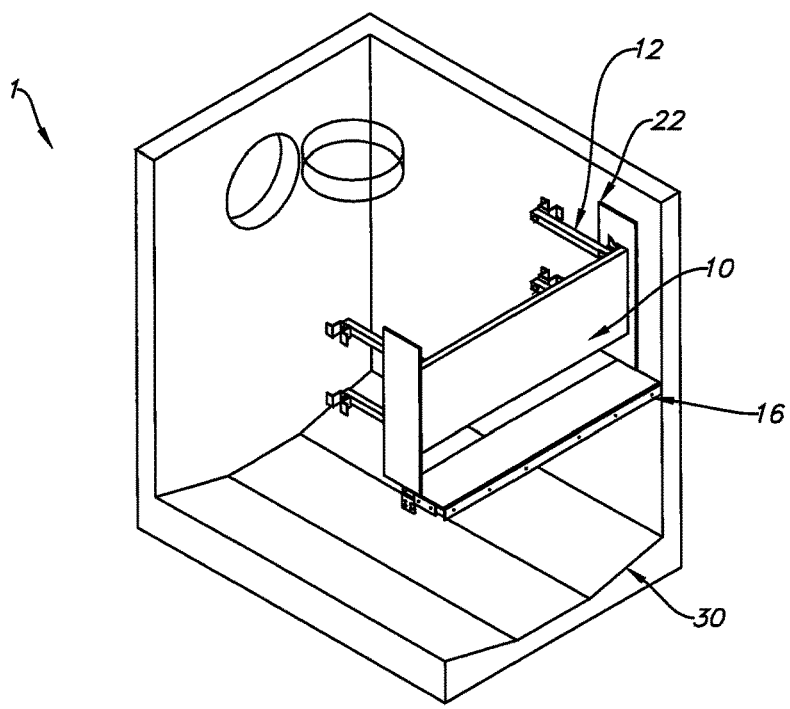
FIG. 2B is an upper rear right side perspective view of FIG. 2.

FIG. 2 another view of the single chamber vault and skimmer system 1 of FIG. 1 in an up position relative to the shelf 16. FIG. 2A is an upper front right side perspective view of FIG. 2. FIG. 2B is an upper rear right side perspective view of FIG. 2. FIG. 2C is another side view of FIG. 2 showing HGL and flow arrows.

Referring to FIGS. 1-2C, the single chamber vault with skimmer system 1 can be installed in a vault/box having an inflow pipe/line 2 in an inlet wall and an outflow pipe/line 8, above a sloped floor 30, with closed side walls 4 and a top 6 having access point(s) 7. The sloped floor 30 can such as but not limited to those shown and described in U.S. patent application Ser. No. 15/639,685 filed Jun. 30, 2017; Ser. No. 15/658,864 filed Jul. 25, 2017; and Ser. No. 16/104,737 filed Aug. 17, 2018, all to the same applicant as the subject application which is incorporated by reference in its' entirety.

The skimmer panel 10 can be positioned in front of the outflow pipe/line 8 and be raisable and lowerable by left and right pairs of pivotable support rod(s) 12. Each support rod(s) 12 can be pivotally attached to the side walls 4 by pivotable mounts which include a wall pivot end 13 and a panel pivot end 14. The panel 10 can move from a down position adjacent to and separated by a gap 18 above a shelf 16 to an up position raised above the shelf 16. Flexible seal/flange(s) 20 can extend outward from the sides of the skimmer panel 10 to move up and down against a sliding surface 22 on the inner sides of the side walls 4 of the vault/box.

Skimmer and Shelf System with No Front Side Floats on Skimmer

A shelf 16 that is relatively impermeable to water flow is attached to the outflow end 8 of a stormwater treatment vault adjacent to the outflow. This shelf 16 can span approximately the width of the vault. A skimmer panel 10 can be positioned so that it rests on top of the shelf 16. The skimmer panel 10 can be attached to a hinge system that can include support rods 12 having one end of the support rod attached to the front side of the skimmer panel 10, and the other end of the support rod 12 attached to a support structure upstream from the skimmer panel 10. There can be at least 2 support rods 12 adjacent each end of the skimmer panel 10 for a total of at least 4 support rods 12.

The attachment of the support rod 12 to the support structure can be such that the end of the support rod 12 is hinged so that the support rod 12 can articulate. This upstream support structure can be of any inside surface within the treatment vault. This inside surface can include but not limited to the sidewalls 4 of the treatment vault, a crossmember (which will be described later) that spans vertically or horizontally, the ceiling of the treatment vault, or a screen system within the vault (which will be described later). The support rods 12 can also be attached to the face of the skimmer panel 10 such that the end of the support rod 12 can be hinged so that the support rod 12 can articulate.

Support Rods:

The upstream end of the support rod 12 and hinged pivot point can be arranged vertically such that the pivot point on the upstream end of the support rod 12 can be higher in elevation than the pivot point on the end of the downstream end of the support rod which is attached to the face of the skimmer panel 10. The support rods 12 can be approximately parallel to each other. This arrangement of support rods 12 and pivot points, and the skimmer panel 19 can provide a geometric arrangement that will enable the skimmer panel 10 to remain approximately vertical as the skimmer moves upward.

Skimmer Seals:

Referring to FIGS. 1-1E, the skimmer panel 10 can have flexible seals (seal/flanges) 20 attached to each end of the skimmer panel 10 such that the flexible seals 20 can touch the sides of the treatment vault so that almost no water flow will pass between the ends of the skimmer panel 10 and the sidewall 4 of the vault. The added seals 20 on the ends of the skimmer panel 10 can ensure that almost all the flow will have to pass under the skimmer panel 10. Another advantage gained with seals on the ends of the skimmer panel 10 is that if the distance between the side walls 4 of the treatment vault were to vary due to inevitable workmanship fluctuations, the seals 20 can be flexible enough and capable to bridge the gap between the ends of rigid skimmer panel 10 and the side walls 4 of the treatment vault, which will increase the tolerance for deviations from initial specifications.

If it is desired or necessary to reduce the friction between the seals 20 on the ends of the skimmers panel 10 and the side walls 4 of the vault, a slick surface (sliding surface) 22 can be added to the side walls. This slick surface 22 can be achieved numerous ways. Examples of how this slick surface 22 can be accomplished are as follows;
1. The side wall of the treatment system can be coated with a material that is slick. For example, epoxy paint is relatively slick and could be painted onto the side walls of the treatment system within the region of where the seal 20 touch the side walls 4.
2. A slick material can be added to the side walls 4 of the treatment system within the region of where the seal can touch the side walls. For example, fiberglass, metal, and plastic are all relatively slick and common materials. A piece of any slick material can be attached to the side wall 4 with the region of where the seal 20 touch the side walls.

Skimmer Panel:

The skimmer panel 10 can be sized so that the skimmer panel 10 spans approximately the width of the treatment vault. The ends of the skimmer panel 10 can be in close proximity of the side walls 4 of the treatment vault. The space between the ends of the skimmer panel 10 can be minimal such that water flow between the skimmer panel 10 and the side walls 4 can be adequately restricted to increase greater detention time to flowing water on the upstream side of the skimmer panel 10.

During no water flow through the treatment system conditions, the skimmer panel 10 can be at rest adjacent to the relatively impermeable shelf 16. With the skimmer panel 10 at rest, the gap 18 between the shelf 16 and the skimmer panel 10 can be minimal and hydraulically adequate flow potential to create greater water detention on the upstream side of the skimmer panel 10 during flowing water conditions. The gap 18 can be between the bottom of the skimmer panel 10 and the shelf 16 can be adequately small enough to restrict the water flow. As the hgl on the upstream side of the skimmer increases, eventually the hgl will reach an elevation that will begin to cause the skimmer panel to rise, which in turn will increase the gap 18 between the bottom of the skimmer panel 10 and the top of the shelf 16.

As the skimmer panel 10 rises and the gap 18 between the bottom of the skimmer panel 10 and shelf 16 increases, the volume of water flow passing under the skimmer panel 10 also increase. As the flow rate passing between the bottom of the skimmer panel 10 and the shelf 16 increases, the detention time of the water on the upstream side of the skimmer is reduced. Once flow rate passing through the treatment system is great enough, the skimmer panel 10 can be adequately elevated such that the cross-sectional area between the skimmer panel 10 and the shelf 16 is great enough to convey water flow under the skimmer panel 10 such that the water flow is no longer restricted by the skimmer panel 10 and shelf 16.

Skimmer Force Vectors and Movement:

The potential vertical movement of the skimmer panel 10 can primarily dependent relationship between the geometry of the support rods 12 and hinged pivot points relative to the upstream side of the skimmer panel 10, the force of the water pressing onto the upstream side of the skimmer panel 10 compared to the force of water pressing onto the downstream side of the skimmer panel 10, and weight and buoyancy specifications of the skimmer panel 10.

Referring to FIGS. 1-2 and 23A, the pivot point of the upstream end of the support rod(s) 12 can be at a higher elevation than the pivot point at the downstream end of the support rod 12 which is attached to the skimmer panel 10. Each of the support rods 12 can be approximately parallel to each other. With the skimmer panel 10 in the down and resting position a small gap 18 between the bottom of the skimmer panel 10 and the shelf 16 enables water to pass through the pass and exit the treatment vault. The weight of the skimmer panel 10 aids with keeping the skimmer panel 10 at rest. With the skimmer panel 10 at rest the water detention on the upstream side of the skimmer is increased and maximized.

Referring to FIGS. 1-2 and 23B, when hydraulic pressure of flowing water is adequately elevated and greater on the upstream side of the skimmer panel 10 compared to the hydraulic pressure on the downstream side of the skimmer panel 10, the weight of the skimmer panel 10 that keeps the skimmer panel 10 at rest begins to be overcome. The hydraulic pressure on the upstream side of the skimmer panel 10 interacts with the pivot points and support rods to create a vertical force vector that begins to overcome the weight of the skimmer.

Referring to FIGS. 1-2 and 23C, when horizontal force vector on the upstream side of the skimmer panel 10 is adequately greater that of the horizontal force vector on the downstream side of the skimmer panel 10, force is applied to the support rods 12 such that torque acts on the support rods 12 causing the support rods 12 to rotate about the pivot points.

Referring to FIGS. 1-2 and 23D, as the flow rate through the treatment system increases the hgl on the upstream side of the skimmer panel 10 can also increase. When the vertical force vector and torque acting on the support rods 12 is adequate the skimmer panel 10 can begin to rise vertically. The skimmer panel 10 can be able to automatically adjust vertically depending on the magnitude of the vertical force vector combined with the buoyance of the skimmer panel 10.

As the skimmer panel 10 rises the gap between the bottom of the skimmer panel 10 and the shelf 16 increases, and the difference in elevation between hgl on the front side of the skimmer panel 10 compared to the hgl on the back side of the skimmer panel 10 is reduced. The buoyancy of the skimmer panel 10 can also increase as the difference in hgls becomes less. Eventually, the difference in elevation of the hgl on the front side of the skimmer panel 10 compared to the hgl on the back side of the skimmer panel 10 can be equal or almost equal. However, because of the direction of water flow, the hydraulic horizontal force vector acting on the upstream side of the skimmer panel 10 can always be significantly greater than the hydraulic force vector acting on the downstream side of the skimmer panel 10.

Referring to FIGS. 1-2, 23E, 24 and Table 1 below, the geometric relationship between the vertical distance between upstream and downstream pivot points and angle of the support rod 12 are the primary parameters for calculating the magnitude of the vertical force vectors that will act on the making the skimmer panel 12 raise vertically. As the skimmer panel 12 raises and the hgl on the downstream side of the skimmer panel 12 comes closer in elevation to that of the hgl on the upstream side of the skimmer panel 12, the buoyancy of the skimmer panel 12 increases which will add to the geometric force vector. The length of the support rods 12 can determine height of the gap 18 between the skimmer panel 10 and the shelf 16, the longer the support rod 12 the greater the potential gap 18.

TABLE 1

Resulting Vertical Force - Angle vs 100 units of Horizontal Force

| Angle (A) Degrees | Distance (H) Meters | Horizontal Force (units) | Vertical Force (units) |
|---|---|---|---|
| 5 | 1 | 100 | 8.7 |
| 10 | 1 | 100 | 17.4 |
| 15 | 1 | 100 | 25.9 |
| 20 | 1 | 100 | 34.2 |
| 25 | 1 | 100 | 42.3 |
| 30 | 1 | 100 | 50 |
| 35 | 1 | 100 | 57.4 |
| 40 | 1 | 100 | 64.3 |
| 45 | 1 | 100 | 70.7 |

Mounting the Upstream Pivot Points:

Referring to FIGS. 1-2, 23A-24, there are many ways to mount the upstream pivot points of the support rods 12. What is most important is that the mounting location be solid and strong so that the skimmer panel 10 can be supported so that its position is maintained against the force and weight of flowing stormwater. Below is a list of possible locations and method in which an upstream support rod pivot point can be adequately supported.

1. The upstream pivot point of the support rod 12 can be attached to a sidewall 4 of the treatment system or a bracket that is attached to the side walls.
2. The upstream pivot point of the support rod 12 can be attached to a beam or beams (as shown in FIGS. 20-20A) that spans the width of the treatment system vault.
3. The upstream pivot point of the support rod 12 can be attached to a wall or baffle (see FIGS. 22-22A) in the treatment system that spans the width of the treatment system.
4. The upstream pivot point of the support rod 12 can be attached to a short stem wall or walls (see FIGS. 21-21A) that protrudes from each of the sidewalls.
5. The upstream pivot point of the support rod 12 can be attached can be attached to a vertical support pole/beam or poles/beams (see FIGS. 19-19A) within the treatment system.
6. The upstream pivot point of the support rod can be attached to an upstream screen system (see FIGS. 18-18A) in the treatment vault.

In addition, the shape of the support rod(s) 12 do not have to be generally straight in shape. For example, a support rod can be curved or rounded (see FIGS. 15, 16 and 17. The objective is to support rod to be able to hold the skimmer panel 10 in position in position, be strong enough to handle the force of flowing water, and allow the skimmer panel 10 to hinge upward.

Second Embodiment Single Chamber Vault, Skimmer and Float

FIG. 3 is another right side cross-sectional view of another embodiment 40 of a single chamber vault and skimmer system with float 42 in a down position relative to the shelf 16. FIG. 3A is an upper front right side perspective view of FIG. 3. FIG. 3B is an upper rear right side perspective view of FIG. 3. FIG. 3C is an enlarged view of a portion of the skimmer panel 10 and shelf 16 of FIG. 3 showing a gap 18 therebetween. FIG. 3D is another enlarged portion of the skimmer panel 10 and shelf 16 of FIG. 3 showing another gap 18B therebetween.

FIG. 3E is still another enlarged portion of the skimmer panel and shelf of FIG. 3 showing another gap 18C therebetween.

FIG. 3F is an enlarged portion of the skimmer panel and shelf of FIG. 3 with no gap 19 therebetween.

FIG. 4 is another view of the embodiment 40 of the vault, skimmer system and float 42 of FIG. 3 in an up position relative to the shelf 16. FIG. 4A is an upper front right side perspective view of FIG. 4. FIG. 4B is an upper rear right side perspective view of FIG. 4.

Referring to FIGS. 3-3C, 4-4B, the second embodiment 40 is similar to the previous embodiment with the exception of including a float 42 on the skimmer panel 10. The type of skimmer panel 10 with float 42 that can be used, can include the skimmer panels, shown and described in U.S. Pat. No. 9,534,368 to Happel, which is assigned to the same assignee as the subject application, and which is incorporated by reference in its' entirety.

Referring to FIG. 3D, the skimmer panel 10 with float 42 can be arranged with a gap 18B that can be in front of the shelf 16.

Referring to FIG. 3E, the skimmer panel 10 with float 42 can be arranged with a gap 18C in front of and above the shelf 16.

Referring to FIG. 3F, the skimmer panel 10 with float 42 can be arranged with no gap 19 between the bottom of the panel 10 and the shelf 16.

The arrangements of the skimmer panel 10 with float 42 in relation to a shelf 16 is further discussed and shown in U.S. patent application Ser. No. 15/948,011 filed Apr. 9, 2018 and U.S. Pat. No. 9,534,368 to Happel, which are both by the same assignee as the subject patent application, and which is incorporated by reference in its' entirety. The use of a float(s) enhances the buoyancy of the skimmer panel 10. With a float(s), the skimmer panel rises faster in the water than without a float(s).

Skimmer and Shelf System with Front Side Buoyancy Floats on Skimmer

Referring to FIGS. 3-4B and 5C, floats 42 can be added to the front side of the hinged skimmer panel 10 to increase buoyancy of the skimmer panel 10, and create a skimmer panel 10 that is not dependent for any water to be present on the downstream side of the skimmer panel 10 to enable the skimmer panel 10 to be buoyant and float upward. Such a skimmer with floats 42 on the front side of the skimmer can have buoyancy determined by only the elevation of the hgl on the upstream side of the skimmer panel 10.

To enable front side buoyancy for the hinged skimmer system, the floats 42 can be added to the front upstream side of the skimmer panel 10 should be mounted such that they are attached with a space between the float 42 and the skimmer panel 10. The space 43 (FIG. 5C) between the float 42 and skimmer panel 10 can enable water to be present on all sides of the float, encapsulating the float with water to create buoyancy or lift. The size and number of floats 42 attached to the upstream side of the skimmer will determine the amount of front side buoyancy for the skimmer panel 10. Positioning at least the majority of the floats 42 along the upper edge of the skimmer panel 10 can ensure that the buoyancy from the floats 42 do not engage until the hgl on the upstream side of the skimmer panel 10 is sufficiently elevated. Maximum detention and treatment will continue until the hgl engages the floats 42.

Floats Added for Front Side Buoyancy:

To increase the buoyancy of the skimmer panel 10 of the Hinged Variable Flow Skimmer and Filtration System, floats can be added to upstream side of the skimmer. To enable front side buoyancy for the hinged skimmer system, the floats added to the front upstream side of the skimmer should be mounted such that they are attached with a space between the float and the skimmer panel. The space between the float and skimmer will enable water to be present on all sides of the float, encapsulating the float with water to create buoyancy or lift.

The size and number of floats attached to the upstream side of the skimmer will determine the amount of front side buoyancy for the skimmer. Positioning at least the majority of the floats along the upper edge of the skimmer will ensure that the buoyancy from the floats do not engage until the hgl on the upstream side of the skimmer is sufficiently elevated. Adequate front side buoyancy ensures that even if there is no hgl against the downstream side of the skimmer panel, the skimmer cannot be topped and will float upward as designed.

When using the floats as part of the invention, specifications will be such that maximum detention and treatment will continue until the hgl engages the floats. The buoyancy of the floats combined with the geometric force vectors of the hinged skimmer system will enable the skimmer panel to rise vertically, resulting in the hydraulics of the treatment system automatically adjust. The hydraulic adjustment will be such that treatment will remain maximized and the hydrology of the water shed will not be compromised. Eventually, if the hgl in the treatment vault and skimmer panel are adequately raised vertically, the filtration media will be offline with little to no flow passing through the media.

Third Embodiment Single Chamber Vault, Skimmer, Float & Wheels

FIG. 5 is another right side cross-sectional view of another embodiment of a single chamber vault, skimmer system with float 42 and wheels 52 in a down position relative to the shelf 16. FIG. 5A is an upper front right side perspective view of FIG. 5. FIG. 5B is an upper rear right side perspective view of FIG. 5. FIG. 5C is an enlarged top view of the skimmer panel embodiment 50 with wheel(s) 52 of FIG. 5. FIG. 6 is another view of FIG. 5 with the embodiment 50 of a single chamber vault, skimmer system with float 42 and wheels 52 in an up position relative to the shelf 16.

FIG. 6A is an upper front right side perspective view of FIG. 6. FIG. 6B is an upper rear right side perspective view of FIG. 6.

Referring to FIGS. 5-6B, this embodiment 50 is similar to the previous embodiment with the addition of wheels 52 for use in allowing the skimmer panel 10 to move up and down.

The skimmer panel 10 with wheels 52 is shown and described in U.S. Pat. No. 9,534,368 to Happel, which is the same assignee as the subject patent application, and which is incorporated by reference in its' entirety.

Skimmer Wheels:

The pivot points that connect to the ends of the support rods 12 can likely require a degree of looseness to allow for a degree of workmanship tolerances. The placement of both the upstream and downstream pivot points can vary slightly due to human error, and the treatment vaults will also likely vary for the same reason. As a result, the skimmer panel 10 can shift slightly from side to side. If the skimmer panel 10 were to touch a side wall in the treatment vault it is possible that the skimmer panel 10 can become racked and stuck against the side walls 4. To aid with preventing any complications that can result with a skimmer panel 10 becoming rack between the side walls 4 of the treatment system, centering wheels 52 can be added to the ends of the skimmer panel 10. If the skimmer panel 10 shifts toward one of the sidewalls 4 of the treatment system and touches the sidewall, the centering wheel will simply roll up the sidewall with minimal friction. At least one wheel 52 along each end of the skimmer would be required to eliminate friction between the skimmer panel 10 and sidewalls 4. Typically, a centering wheel 52 positioned adjacent to each corner of the skimmer panel 10 can completely avoid any potential racking of the skimmer panel 10.

Fourth Embodiment Single Chamber Vault, Skimmer System, Float and Hydroslide System FIG. 7 is another right side cross-sectional view of another embodiment 60 which includes a single chamber vault, skimmer system with float 42 and hydroslide system 62 in a down position relative to the shelf. FIG. 7A is an upper front right side perspective view of FIG. 7. FIG. 7B is an upper rear right side perspective view of FIG. 7.

Referring to FIGS. 7-7B, this embodiment 60 is similar to previous embodiments with the addition of a hydroslide system 62 that can include a water connection 64 in an access point 7, that provides pressurized water to a vertical water line 65, a split flow tee 69, and spray bar 67 along the perimeter of the sloped floor 30 which can include a spray lever 66 and spray knife 68. The hydroslide system 62 can function similar to those shown and described in U.S. patent application Ser. No. 15/639,685 filed Jun. 30, 2017; Ser. No. 15/658,864 filed Jul. 25, 2017; Ser. No. 15/686,931 filed Aug. 25, 2017; Ser. No. 15/948,011 filed Apr. 9, 2018; and Ser. No. 16/104,737 filed Aug. 17, 2018, by the same applicant as the subject application, which are all incorporated by reference in its' entirety.

Servicing System for the Lower Settling Chamber or Chambers:

Stormwater treatment systems typically have settling zone or chamber so that solids have a place to settle below the line of flow between the inflow and the outflow pipes. These solids are retained within the settling zone until such time that a service crew arrive to empty the contents of the treatment system. The primary type of equipment used to service the settling zone of a treatment system is a vacuum truck which accompanied by a service crew of at least two technicians.

A vacuum truck and its associated service crew have an operating expense that is significant. In addition, the number of stormwater treatment systems that can be serviced by a vacuum truck and its crew is limited and dependent on the length of time spent doing each servicing. The greater the time it takes to perform the service work of the treatment system, the fewer treatment systems can be serviced in a day. Time translates into money if both the capitalization of the vacuum truck and the labor costs of the service crew. A vacuum truck and service crew that can service a greater number stormwater treatment systems in a day will have a lower cost per servicing which can produce significant savings.

Referring to FIGS. 7-7B, for the purpose of reducing servicing time, the invention can have a high-pressure spray system 62 added to the settling zone of the treatment system. This spray system 61 can include of high-pressure pipe(s) 64, 65 that conveys clean servicing water into the settling zone of treatment system. The conveyance of the servicing water is such that water is inserted at high-pressure from a source outside the vault of the treatment system, is conveyed to the bottom of the settling zone, where the servicing water flows into spray bars 67 located along the perimeter of the settling zone. These spray bars 67 have nozzles aimed toward the center of the settling and are approximately parallel with the floor of the settling zone.

Over time, solids will settle into the settling zone of the treatment system and form a layer across the bottom of the settling zone. When servicing using the spray system 62, the nozzles along the spray bars will jet servicing water at high velocity into the solids that have settled in the settling zone. These water jets will drill into the solids and liquefy the solids layer from the underside. The kinetic energy of the water jets will eventually drive the solids toward the center of the settling zone where the vacuum nozzle of the vacuum service truck can easily reach and extract the solids from the treatment system. To aid with driving the sediments toward the center of the settling zone, the floor of the settling zone can be angled such that the floor is sloped downward from the perimeter of the settling zone toward the center of the settling zone.

The before described method of using a high-pressure spray system 63 to aid with the removal of solids that have settled into the settling zone of a treatment system will achieve the following results:

1. Much less servicing water will be required to perform the servicing of the treatment system.
2. The time spent removing debris from the settling zone of the treatment system will be dramatically reduced. Saving time will save money.
3. Because the servicing time of the treatment system is reduced, the vacuum truck and crew can service more treatment systems in a day. Each vacuum truck can accomplish more tasks which reduces the need to capitalize more equipment which save money.
4. The servicing spray system is especially effective with quickly removing all the debris in the settling zone. There is no need to send a person inside the confined space of the treatment vault to do service work. This avoids a service crew having to deal with OSHA confined space protocols which will slow the servicing process and require additional personnel to do the service work.
5. All the debris can easily be removed from the settling zone of the treatment system. Without the servicing spray system certain areas in the settling zone may be difficult a vacuum service truck to access. It is common that when a service technician has difficulties doing the work, the technician may not do a complete job, resulting in debris being left behind in the treatment vault.

Fifth Embodiment Single Chamber Vault, Skimmer System with or without Float, and Upflow Media System FIG. 8 is a right cross-sectional view of another embodiment 70 of a single chamber vault, skimmer system (skimmer panel 10 with or without float 42, and upflow media system. FIG. 8A is an upper front right side perspective view of FIG. 8 FIG. 8B is an upper rear right side perspective view of FIG. 8.

Referring to FIGS. 8-8B, this embodiment is similar to the previous embodiments with the addition of a baffle 72 above the sloped floor 30, with the skimmer panel 10 raising upward from the top of the baffle 72, the top of the baffle 72 being a substitute for the shelf 16. A container 74 is positioned between the baffle 72 and the output wall with outflow line 8. The container 74 filled with media 75, and having a lower screen(s) 78 below the container 74 and hinged screened lids 76 on top of the container 74. Storm water can pass into the inlet 2 of the vault and can flow downward along the direction of the flow arrow and upflowing from screens 78 into the media 75 in container 74 and out of screened lids 76 and out the outflow line 8.

The media system of components 72-76 is similar to those U.S. patent application Ser. No. 15/639,685 filed Jun. 30, 2017; Ser. No. 15/658,864 filed Jul. 25, 2017; Ser. No. 15/948,011 filed Apr. 9, 2018; and Ser. No. 16/104,737 filed Aug. 17, 2018, by the same applicant as the subject application, and which are all incorporated by reference in its' entirety.

The types of media 75 that can be used include but are not limited to those described in U.S. Pat. Nos. 7,824,551; 7,955,507; 8,002,984; 8,002,985; and U.S. Pat. No. 8,153,005 to Wanielista et al., and in parent patent application Ser. No. 15/658,864 filed Jul. 25, 2017, to Happel, which are all incorporated by reference in their entirety.

Sixth Embodiment Single Chamber Vault, Skimmer System, Float and Wheels and Upflow Media System FIG. 9 is a right cross-sectional view of another embodiment 80 of a single chamber vault, skimmer system with or without float 42, with or without wheels 52 52, upflow media system 72-78, with or without hydroslide system 61. FIG. 9A is an upper front right side perspective view of FIG. 9. FIG. 9B is an upper rear right side perspective view of FIG. 9.

Referring to FIGS. 9-9B, this embodiment 80 can include components of previous embodiments and use either the seal/flange(s) 20 or wheels 52, use the skimmer panel 10 with or without float 42, and use the media system with or without the hydroslide system 61 that were all previously shown and described.

Hinged Variable Flow Skimmer and Filtration System No Floats

Referring to FIGS. 8-9B, the invention is able to provide water treatment to a very high level which can be enhanced by filtration media, without compromising the hydrology of the upstream water shed. Traditionally, high levels of stormwater treatment that use filtration media require slowing the water flow to achieve increased contact time between the water and filtration media. When rain events are heavy and the stormwater flow rate is high, filtration media can potentially create enough headloss to compromise the hydrology of the water shed.

The invention is capable of automatically adjust the hydraulics of the treatment system so that during low to medium flows filtration media is engaged with providing treatment, and during high stormwater flows the water flow will bypass the media for greater hydraulic conveyance. During these high flowing rain events the headloss initially created by the filtration media goes away, and high flows can pass without being impeded.

The hinged variable flow skimmer system can be utilized to direct water flow through an upflow filtration system such that, during low to medium flows the skimmer panel is at rest on a landing so that all the water flow is being diverted toward the underside of an upflow filter vessel or chamber. The water flow will then flow upwards through the media enabling the filtration media to provide treatment to the water flow.

The process of media filtration produces significant friction between the media surfaces and the water which slows the water flow. Slowing the water flow by means of friction is referred to as creating headloss. Too much headloss during heavy rain events can cause flooding. During low to medium rain events the potential for flooding is not a great concern. However, during large high flowing rain events the potential for flooding is an issue. To eliminate the potential for flooding, the stormwater flow must be able to bypass the media and eliminate the headloss that the media filtration caused.

As water flow increases through the treatment system and the hgl on the upstream side of the skimmer rises, eventually the hgl will be elevated adequately such that the forces acting on the hinged skimmer system produce a vertical force vector that is sufficient to cause a gap to form between the bottom of the skimmer and the skimmer landing. As this gap will opens it will enable waterflow to bypass the media filtration. The higher in elevation the hgl upstream from the skimmer, the higher the skimmer will rise. As the skimmer rises the gap increases between the bottom of the skimmer and the skimmer landing. As the gap increases the volume of water flowing through the gap also increases, and more of the water flow is able to bypass the media filtration. As the water flow rate bypassing the media filtration increases, the headloss caused by the media filtration decreases. Because the gap between the bottom of the skimmer and the skimmer landing spans close to the entire width of the treatment vault, the vertical height of the gap does not have to be very high for the cross-sectional area of the gap to exceed that of the outflow pipe of the treatment system. Once the water flow rate bypassing the media filtration is adequate, the headloss initially created by the media filter is almost completely nullified.

The hydraulics of the invention is such that of the filtration media treatment system can treat low to medium water flows to a very high level of treatment by directing water flow through filtration media. Greater detention of water flow upstream from the media filter enables longer contact time between the filtration media and the water flow resulting with greater removal efficiencies for pollutants. When larger and heavier rain events occur, the hydraulics of the treatment system will automatically adjust to reduce headloss and bypass water flow around the filtration media.

Seventh Embodiment Three Chamber Vault, Skimmer System, Float and Wheels

FIG. 10 is a right cross-sectional view of another embodiment 90 of a three chamber vault with skimmer panel 10 with or without float 42, and using seal/flange(s) 20 or wheels 52. FIG. 10A is an upper front right side perspective view of FIG. 10. FIG. 10B is an upper rear right side perspective view of FIG. 10.

Referring to FIGS. 10-10B, this embodiment 90 can be similar to previous embodiments and have three chambers that are formed from baffles 92, 94, which are attached to and rise upward from the sloped floor 30. The three chambers vault can function similarly to those shown and described in U.S. patent application Ser. No. 15/639,685 filed Jun. 30, 2017; Ser. No. 15/686,931 filed Aug. 25, 2017; Ser. No. 15/948,011 filed Apr. 9, 2018; and Ser. No. 16/104, 737 filed Aug. 17, 2018, by the same applicant as the subject application, which are all incorporated by reference in its' entirety.

Eighth Embodiment Three Chamber Vault, Dual Screen System, Skimmer Panel with or without Float, with or without Wheels and with or without the Hydroslide System FIG. 11 is a right cross-sectional view of another embodiment 100 of a three chamber vault, dual screen system 102, skimmer panel 10 with or without float 42, seal/flange(s) 20 with or without wheels 52, and with or without the hydroslide system 61. FIG. 11A is an upper front right side perspective view of FIG. 11. FIG. 11B is an upper rear right side perspective view of FIG. 11.

FIGS. 11-11B, this embodiment 100 is similar to previous embodiments with the addition of using a dual screen system 102 that is supported by legs 104 over a sloped floor 30. Such as dual screen system 102 with legs 104 is shown and described in U.S. Pat. No. 8,491,797 to Happel, which is incorporated by reference in its' entirety. Additionally, the novel dual screen systems with legs 104 is also shown and described in U.S. patent application Ser. No. 15/639,685 filed Jun. 30, 2017; Ser. No. 15/686,931 filed Aug. 25, 2017; Ser. No. 15/948,011 filed Apr. 9, 2018; and Ser. No. 16/104, 737 filed Aug. 17, 2018, by the same applicant as the subject application, which are all incorporated by reference in its' entirety. The openings in the screens can range from approximately ⅛ of an inch to approximately 2 inches in diameter, and be either uniform diameters or combinations of different diameters as needed.

Ninth Embodiment Three Chamber Vault, Flow Spreader, Dual Screen System, Skimmer with or without Float, with or without Wheels with or without Hydroslide FIG. 12 is a right cross-sectional view of another embodiment 110 of a three chamber vault, with flow spreader 112, dual screen system 102, skimmer panel 10 with or without float 42, with or without wheels 52, and with or without the hydroslide system 61. FIG. 12A is an upper front right side perspective view of FIG. 12. FIG. 12B is an upper rear right side perspective view of FIG. 12.

Referring to FIGS. 12-12B, this embodiment 110 similar to the previous embodiment with the addition of a flow spreader 112, with trash ramps 114 above screen deflectors 116. The flow spreader 112, with trash/debris ramps 114 and screen deflectors 116 are shown and described in U.S. patent application Ser. No. 16/104,737 filed Aug. 17, 2017 to the same applicant as the subject application, and which is incorporated by reference in its' entirety. Other types of flow spreaders and deflectors can be used, such as those shown and described in U.S. Pat. No. 8,142,666 to Happel, which is incorporated by reference in its' entirety.

The flow spreader 112 forms a hydro-dynamic separation of inflowing water that has passed through the inlet port of the vault into two flow paths. The flow spreader 112 can have outer walls selected from a solid surface and a screened surface. The flow spreader creats a split flow to the left and right of the inflowing water. The split flow directs debris into the dual screen filtration system. And the flow spreader assists to influence solids to settle into at least one lower settling chamber in the vault.

Tenth Embodiment Three Chamber Vault with Large Flow Spreader, Dual Screen System, Skimmer with or without Float, Seal/Flanges or Wheels with or without Hydroslide FIG. 13 is a right cross-sectional view of another embodiment 120 of a three chamber vault, with large flow spreader 102, dual screen system 102, skimmer panel 10 with or without float 42, seal/flange(s) 20 or wheels 52, with or without the hydroslide system 62. FIG. 13A is an upper front right side perspective view of FIG. 13. FIG. 13B is an upper rear right side perspective view of FIG. 13.

Referring to FIGS. 13-13B, this embodiment 120 similar to the previous embodiment with the addition of a flow spreader 122, with trash ramps 124 above screen deflectors 116. The large flow spreader 122, with trash/debris ramps 124 and screen deflectors 126 are shown and described in U.S. patent application Ser. No. 16/104,737 filed Aug. 17, 2017 to the same applicant as the subject application, and which is incorporated by reference in its' entirety. Other types of flow spreaders and deflectors can be used, such as those shown and described in U.S. Pat. No. 8,142,666 to Happel, which is incorporated by reference in its' entirety.

Multiple Baffled Chambers and Servicing Spray System:

Referring to FIGS. 11-13B, the invention can include multiple setting chambers (settling zones) upstream from the skimmer system 10, that can be formed by inlet wall, first baffle 92, second baffle 94 and outlet wall. A settling zone is the region within the stormwater treatment system located below the flowline between the inflow and outflow of the stormwater treatment vault. The settling zone of the stormwater treatment system can be divided into multiple settling chambers by placing one or more baffles in the settling zone to form multiple chambers. An advantage of dividing the settling zone into multiple chambers is that the baffles will aid with creating calm in the settling zones and prevent the re-suspension (scour) of previously captured debris. In addition, the settling zone can be enlarged to that the storage capacity of the treatment system is increased.

The invention can include a high-pressure servicing spray system 62 with multiple settling zones. This can require a spray system for each settling zone or chamber. These spray systems will enable removing captured debris from the settling chambers quickly and easily without a service technician having to enter the treatment vault to facilitate servicing.

Multiple Baffled Chambers, Floating Debris Screen System, and Spray Servicing System:

A screen system 92 can be added to the invention such that larger debris within the water flow that enters the stormwater treatment vault can be captured and retained in a screen system. This larger debris that would be contained in the screen system may consist of, but not limited to, foliage, litter, and any debris that is too large to pass through the screen system. The screen system 102 would be located such that as the water flow and debris enters the treatment vault, the water flow and debris will be directed into the one or more screen systems. Sediments and water will be able to pass through the screen systems, and debris that is larger than the openings in the screen will be captured and retained within the screen system 92.

The invention will be positioned downstream from the debris screen system or screen systems. The settling chambers and screen system upstream from the skimmer system 92 can pretreat the water flow prior to the water flow engaging the skimmer system 10.

If the stormwater flow rate were to increase beyond the flow rate that can pass through the screen system 92, an adequate bypass conveyance over top and around the screen system will be available. This bypass conveyance will be sufficiently size so that the hydrology of the water shed will not be compromised and upstream flooding will not occur.

The screen system 92 can have screened lids across the top of the screen system 92 so that if the hgl were to rise above the screen system 92, and stormwater flow were to begin bypassing the screen system 92, previously captured debris in the screen system 92 will not be able to escape the screen system 92.

The invention can include a high-pressure servicing spray system 62 with multiple settling zones. This will require a spray system 62 for each settling zone or chamber. These spray systems 62 can enable removing captured debris from the settling chambers quickly and easily, and without a service technician having to enter the treatment vault to facilitate servicing. Access either through or around the screen system 92 into the lower settling chambers will be available to a vacuum service truck.

Eleventh Embodiment Vault with Skimmer System and Parallel Support Rods

FIG. 14 is a right cross-sectional view of another embodiment 130 of a vault with skimmer panel 10 having four sets of dual parallel support rods 134. This embodiment is similar to previous embodiments, with the addition of using four sets of pivotable parallel support rods 134. Each of the sets 134 have ends that are pivotally attached to side walls 4 of the vault and to the skimmer panel 10 and function similarly to the previously described embodiments.

Twelfth Embodiment Vault with Skimmer System and Concave Curved Support Rods

FIG. 15 is a right cross-sectional view of another embodiment 140 of a vault with skimmer panel 10 having four concave support rods 144. This embodiment is similar to previous embodiments, with the use of concave support rods 144. Each of concave support rods 144 are pivotally attached to side walls 4 of the vault and to the skimmer panel 10 and function similarly to the previously described embodiments.

Thirteenth Embodiment Vault with Skimmer System and Convex Curved Support Rods

FIG. 16 is a right cross-sectional view of another embodiment 150 of a vault with skimmer panel 10 having four convex support rods 154. Each of concave support rods 154 are pivotally attached to side walls 4 of the vault and to the skimmer panel 10 and function similarly to the previously described embodiments.

Fourteenth Embodiment Vault with Skimmer System and Dual Curved Support Rods

FIG. 17 is a right cross-sectional view of another embodiment 160 of a vault with skimmer panel 10 having four sets of dual convex and concave support rods 164. This embodiment is similar to previous embodiments, with the addition of using four sets of dual convex and concave support rods 164. Each of the sets 164 have ends that are pivotally attached to side walls 4 of the vault and to the skimmer panel 10 and function similarly to the previously described embodiments.

Fifteenth Embodiment Vault with Skimmer System with Pivot Points Attached to Screen System FIG. 18 is a right cross-sectional view of another embodiment 170 of a vault with skimmer panel 10 having pivot arms 174 pivotally attached to a front end of a dual screen system 102. FIG. 18A is an upper right perspective view of FIG. 18. The embodiment 170 is similar to previous embodiments, with the difference of attaching the outer ends of pivotable support arms 174 to the front end of a dual screen system 102, and will function similarly to the previously described embodiments.

Sixteenth Embodiment Vault with Skimmer System with Pivot Points Attached to Vertical Beams FIG. 19 is a right cross-sectional view of another embodiment 180 of a vault with skimmer panel 10 being pivotally attached by support rods 184 to two vertical beams 186. FIG. 19A is an upper right perspective view of FIG. 19. The embodiment 180 is similar to previous embodiments with the difference of attaching outer ends of the pivotable support arms 184 to vertical beams 186 that rise up from the sloped floor 30 of the vault, and will function similarly to the previously described embodiments.

Seventeenth Embodiment Vault with Skimmer System with Pivot Points Attached to Horizontal Beams FIG. 20 is a right cross-sectional view of another embodiment 190 vault with vertical panel being pivotally attached by support rods 194 to two horizontal beams 196. FIG. 20A is an upper right perspective view of FIG. 20. The embodiment 190 is similar to previous embodiments with the difference of attaching outer ends of the pivotable support arms 194 to horizontal beams 196 which are each attached to side walls 4 in the vault, and will function similarly to the previously described embodiments.

Eighteenth Embodiment Vault with Skimmer System and Pivot Points Attached to Stem Walls FIG. 21 is a right cross-sectional view of another embodiment 200 of a vault with the skimmer panel 10 being pivotally attached to stem walls 206 by pivotal support rods 204. FIG. 21A is an upper right perspective view of FIG. 21. The embodiment 200 is similar to previous embodiments with the difference of attaching outer ends of the pivotable support arms 204 to stem walls 206 which are each attached to opposing side walls 4 in the vault, and will function similarly to the previously described embodiments.

Nineteenth Embodiment Vault with Skimmer System and Pivot Points Attached to Baffle FIG. 22 is a right cross-sectional view of another embodiment vault with skimmer panel 10 being pivotally attached to a baffle 216 by pivotal support rods 214. FIG. 22A is an upper right perspective view of FIG. 22. The embodiment 210 is similar to previous embodiments with the difference of attaching outer ends of the pivotable support arms 214 to a raised horizontal baffle 216 that is attached to opposing side walls 4 in the vault, and will function similarly to the previously described embodiments. The raised horizontal baffle 216 can be spaced above the sloped floor 30.

Problems Solved By The Invention

Various problems can be solved by the subject invention which will now be described.

1. Problem: The greater the detention time that stormwater flow is detained within a treatment system, the greater the removal efficiency for pollutants can be achieved. However, increasing detention time also creates headloss that can compromise the hydrology of a water shed which may result with flooding within that watershed.
    Solution: The invention will significantly increase detention time for low to medium rain events and/or stormwater flows. However, during heavy rain events that produce high stormwater flows, the hydraulics of invention will automatically adjust to reduce headloss for high stormwater flows. When reviewing the profile of a high flow rain event intensity, the magnitude of headloss that the invention created earlier when the rain event was smaller and having less flow, is reduced and can eventually be nullified when the stormwater flow increases to an adequate flow rate. Essentially, the headloss goes away during high flow rain events which completely avoids any compromise of the hydrology of a water shed. However, most rain events are not very heavy and their associated flows are not high flowing. Even a high flowing rain event will start off with low to medium flows which is the most polluted time frame of a rain event.

2. Problem: Floating debris such as litter in stormwater pollutes our waterways, lakes, and oceans. Preventing litter from entering these receiving bodies of water and collecting litter from within a treatment system where litter can be concentrated for efficient and easy removal is ideal.
    Solution: The invention is a unique design and method for skimming water flow. Skimming water flow with a skimmer system has a long standing precedent of being an excellent method for preventing floating debris from being conveyed downstream to a receiving body of water.

3. Problem: It is important of for a skimmer in a stormwater treatment environment to remain vertical for maximum effectiveness. If the skimmer becomes angled as it rises floating debris will more easily pass under the skimmer.
    Solution: The invention has a series of at least 4 support rods that are generally parallel with each other, and that hold the skimmer in position. Each end of the support rods pivotal or hinged. There are at least 2 support rods holding each end of the skimmer. The upstream end of each support rod are attached to a point that is pivotal or hinged, and the downstream end of each support rod is attached to a pivotal or hinged point on the upstream side of the skimmer. The upstream end of each support rod is higher in elevation that of the downstream end of the support rod, such that the support rods are angled. The geometric arrangement of the pivot points and support rods are arranged such that as the skimmer panel moves vertically the skimmer will remain vertical.

4. Problem: Due to the relatively close fit of the skimmer panel between the sidewalls of the stormwater treatment vault and the ends of the skimmer, the skimmer may be able to touch the sidewalls, resulting with skimmer becoming racked and jammed and unable to move.
    Solution: The invention provides for wheels to be attached to the ends of the skimmer such that the wheels extend beyond the ends of the skimmer. This ensures that a wheel will touch the side wall of the stormwater treatment vault before 5. Problem: Prevent water flow from getting past the skimmer at the ends of the skimmer. Oils are common in stormwater runoff. Because oils are lighter than water, oils are typically highly concentrated along the top surface of water flow. Forcing the all of the stormwater flow to pass under the skimmer, and not allowing flow to pass the skimmer around the ends of the skimmer, the oils can be retained and not escape the stormwater treatment system.
    Solution: A seal can be attached to the ends of the skimmer such that water flow cannot pass around the ends of the skimmer. These seals will make a seal between the side walls of the treatment vault and the ends of the skimmer. These seals will also be adequately flexible to accommodate variations due to workmanship tolerances. The seal will be attached to the front side of the skimmer panel. The hydraulic pressure on the upstream side of the skimmer is typically greater than that of the water pressure on the downstream side of the skimmer. The hydraulic pressure on the upstream side of the skimmer will adequately press seal against the side walls of the stormwater treatment vault to prevent the passage of water flow.

6. Problem: As the seal on the ends of the skimmer panel slide along the sidewalls of the stormwater treatment vault, friction can cause the seals to degrade and fail. When the seals fail stormwater flow will begin to pass the skimmer around the ends of the skimmer and oils can be conveyed to downstream receiving bodies of water.

Solution: The invention can add a slick surface to the sidewalls in the area with the skimmer seal may touch of the stormwater treatment vault. This added slick surface can be a painted material such as epoxy, or a panel of material having a slick surface can be added to the side wall. Such a panel of material can be made from but not limited to plastic, metal, or fiberglass. A slick surface on the side walls of the stormwater treatment system in the region that may come in contact with the seals will reduce the friction between the seals and the sidewalls, resulting in a seal that will last longer.

7. Problem: Depending on the flow rates passing through the stormwater treatment system and/or the effects of the hydrology downstream from the stormwater treatment system, the geometry of the hinge system supporting the skimmer panel may be inadequate to keep the skimmer from being topped by stormwater flow.

Solution: The invention can have added floats to the upstream side of the skimmer, such that the buoyancy of these floats will be influenced by the hgl on the upstream side (front side) of the skimmer. To achieve front side buoyancy the added floats will need to be attached to the front side of the skimmer by standoffs such that the floats can be encapsulated by water. The floats will need to have water against all sides and the bottom to achieve buoyancy. The amount of water displaced by the floats will determine the magnitude of buoyancy and the lift that will applied to the skimmer panel.

8. Problem: The debris that settles in the settling zone of the stormwater treatment system is commonly a high concentration of sediment. Sediment in a settling zone forms a layer that covers the bottom of the settling zone, and the sediments can pack together tightly and become hard. It can be very difficult for a service crew to remove these tightly packed sediments from the setting zone. The longer it takes for a service crew to perform the servicing of the treatment system, the more money it costs to perform the servicing and the longer servicing equipment is engaged to a single task.

Solution: The invention can use a high-pressure spray system added to the settling zone of the treatment system which will dramatically reduce the time required to service the settling zone of a stormwater treatment system. This spray system will consist of high-pressure pipe that conveys clean servicing water into the settling zone of treatment system. The conveyance of the servicing water is such that water is inserted at high-pressure from a source outside the vault of the treatment system, is conveyed to the bottom of the settling zone, where the servicing water flows into spray bars located along the perimeter of the settling zone.

These spray bars have nozzles aimed toward the center of the settling and are approximately parallel with the floor of the settling zone. When servicing using the spray system, the nozzles along the spray bars will jet servicing water at high velocity into the solids that have settled in the settling zone. These water jets will drill into the solids and liquefy the solids layer from the underside. The kinetic energy of the water jets will eventually drive the solids toward the center of the settling zone where the vacuum nozzle of the vacuum service truck can easily reach and extract the solids from the treatment system. To aid with driving the sediments toward the center of the settling zone, the floor of the settling zone can be angled such that the floor is sloped downward from the perimeter of the settling zone toward the center of the settling zone.

9. Problem: When servicing the settling zone of a stormwater treatment system it is often required for a service technician to enter the confined space of a settling zone to facilitate the removal of debris that has settled in the settling zone. Inside the setting zone is uncomfortable and potentially dangerous place for a service technician to be. For a service technician to enter the confined space of a settling zone requires safety protocols outlined by OSHA which are costly and time consuming.

Solution: The invention can use a high-pressure spray system added to the settling zone of the treatment system which can be administered by a service technician from outside the stormwater treatment system. This spray system and method of application is more thorough for removing debris from the settling zone of the treatment system than other methods, and no service technicians need to enter the stormwater treatment vault to employ the servicing spray system.

10. Problem: Servicing technicians will often not complete the removal of all the debris that has settled in the settling zone of a stormwater treatment system because servicing a settling zone can be difficult and time consuming. The result is that the amount of debris removed from the treatment system is less. Because the amount is debris removed from a stormwater treatment system is tracked and documented for the purpose of giving removal credits to the owner of the treatment system, leaving debris behind in the settling zones reduces the credits issued to the owner. For the owner of the treatment system to not receive maximum removal credits may eventually cost the owner additional funding in an attempt to meet regulatory pollution removal objectives.

Solution: The invention can use a high-pressure spray system added to the settling zone of the treatment system which makes it easy and quick for service technicians to remove all the debris that has settled in the settling zone of the stormwater treatment system. The invention's spray system is very thorough for the removal of debris in the settling zone. Because of the ease and speed of the inventions spray system the service technicians will be inspired to do a better job and remove all the debris in the settling zone for full credit by regulatory agencies.

11. Problem: Debris that has become tightly packed across the bottom of the settling zone of a stormwater treatment system can become structurally stable. Tightly packed sediments combined with leaves, branches, and twigs can create a structural framework with the debris. The high-pressure spray system is designed to drill into the debris from the perimeter of the setting zone and force the debris toward the center of the settling zone for removal by a vacuum service truck. However, the structural framework within the debris can the debris layer to be fully undermined by the water jets that are aimed parallel with the floor of the settling zone. The result is a layer of debris that is supported above the water jets by the side walls of the settling zone and the structural framework of the debris. All the debris is unable to collapse downward and be driven toward the center of the vault toward the vacuum service line.

Solution: A vertical spray bar member will be added to the horizontal spray bars midway between 2 walls on opposite sides of the settling zone. These vertical spray bar members will have a series of nozzles that will direct water jets to drill into the sediment layer, creating a vertical slice through the debris such that the slice will create a structural failure within the debris layer, which will in turn cause the layer of debris to collapse onto the water jets that are aimed parallel with the floor. Once the structure of the debris is overcome the water jets aimed parallel with the floor can fully liquefy the debris and drive it toward the center of the settling zone where the service vacuum truck can remove the debris.

12. Problem: When installing the high-pressure spray system of the invention, having the nozzles of the horizontal spray bar aimed parallel with the floor of the settling zone is important to achieve maximum effectiveness. The technician installing these spray bars need to accomplish the installation quickly and accurately. Doing the installation quickly will save money and installing accurately will ensure effectiveness. To further complicate the installation of the spray bars, the slope of the floors of the settling zones will vary between stormwater treatment vaults due to workmanship issues. In addition, the nozzles are small and difficult to judge as to the direction they are aimed.

Solution: Each of the horizontal spray bars will have an aiming lever added as a part of manufacturing the spray bars. The aiming lever will such that the aiming lever will be perpendicular to the length of the spray bars and parallel with the aim of the nozzles. The aiming lever will serve as an aiming mechanism for the installation technician. As a part of installing the spray bars of the spray system, the installation technician will position the aiming lever so that it is pressed against the floor of the settling zone of the stormwater treatment system. Since the nozzles are aimed parallel with the aiming lever, the nozzles will always be aimed parallel with the floor of the settling zone, regardless of the slope of the floors.

13. Problem: Reference U.S. Pat. No. 7,846,327 titled "Stormwater Filter System Having a Floating Skimmer Apparatus". Problem 1 with this previous invention is that the force of water pressing against the front side of the skimmer panel can become so significant that the friction between the track surfaces at each end of the skimmer panel, and the surfaces at the end of the skimmer panel that slide in the tracks become great enough to prevent the skimmer from being able to move vertically.

Solution: The articulation of this new invention is such that force of friction between two sliding surfaces has been almost completely eliminated. The skimmer panel is hinged in such a way that the skimmer is supported by a hinge, and the support rods that articulate when the skimmer rises have tremendous leverage on the supporting hinges. The force of water on the upstream side of the skimmer combined with the buoyancy of the skimmer apply a high magnitude of torque onto the support rods which in rotate the support rods about the axis of the hinge pin or pivot point.

14. Problem: Reference U.S. Pat. No. 7,846,327 titled "Stormwater Filter System Having a Floating Skimmer Apparatus". Problem 2 with this old invention is that there is minimal headloss created by the skimmer. Having minimal headloss during low to medium rain events means that detention time of the water flow upstream from the skimmer is also minimal. Less detention time results in lesser removal efficiency of pollutants. Because the horizontal area between the downstream side of the skimmer and the outflow end of the treatment vault has significant cross-sectional area when compared to the cross-sectional area of the outflow pipe, there is no constriction of water flow with this skimmer system, and stormwater flow can quickly and easily pass under the skimmer and then exit the treatment vault. The result is that the hgl upstream side of the skimmer is always relatively low for all flow rates, including the low to medium range of flow rates.

Solution: The invention makes use of a horizontal shelf adjacent to the bottom edge of the skimmer. The small gap between the skimmer panel and horizontal shelf restricts the stormwater flow which will increase the hgl upstream from the skimmer panel relative to the hgl on the downstream side of the skimmer. The result is greater detention of water on the upstream side of the skimmer which will enable greater pollution removal efficiency of the treatment system. During high flowing rain events the skimmer will rise with the rising hgl on the upstream side of the skimmer which will increase the gap between the skimmer panel and the shelf. Once the hgl on the upstream side of the skimmer and the skimmer panel are adequately elevated, the gap between the skimmer panel and the shelf will have sufficient cross-sectional area such that the invention has almost no headloss, and the hydrology of the water shed is not negatively compromised. The hydraulics of the invention is significantly different than the old invention.

15. Problem: U.S. Pat. No. 7,846,327 to Happel et al. which is incorporated by reference in its' entirety, titled "Stormwater Filter System Having a Floating Skimmer Apparatus". A problem with the '327 patent is that there is no upstream side buoyancy with this invention. The buoyancy from this invention is determined by both the hgls on the upstream side and the downstream side skimmer panel. The buoyancy of the skimmer is determined by the water that is displaced by the volume of the skimmer panel below the hgl on the downstream side of the skimmer panel. Depending on the stormwater flow velocity, it is common for the hgl on the upstream side of the skimmer to be higher in elevation than the hgl on the downstream side of the skimmer. Because of this potential difference in hgl elevations, the skimmer panel may not displace enough water to create the buoyancy necessary for the skimmer to begin rising. The result is that the water flow can top the skimmer and begin flowing water over top of the skimmer. During some stormwater flow scenarios, the skimmer may not respond quick enough resulting in pollutants flowing over top of the skimmer and being conveyed into a downstream receiving body of water.

Solution: The invention can have one or more floats added to the upstream side of the skimmer panel which will be influenced by the hgl on the upstream side of the skimmer panel, and transfer buoyancy to the skimmer panel. The arrangement of floats on the upstream side of the skimmer will avoid the possibility of the skimmer being topped by stormwater flow and be a faster reacting relative to the hgl upstream from the skimmer. To enable front side buoyancy for the hinged skimmer system, the floats added to the front upstream side of the skimmer should be mounted such that they are attached with a space between the float and the skimmer panel. The space between the float and skimmer will enable water to be present on all sides of the float, encapsulating the float with water to create buoyancy or lift. The size and number of floats attached to the upstream side of the skimmer will determine the amount of front side buoyancy for the skimmer. Positioning at least the majority of the floats along the upper edge of the skimmer will ensure that the buoyancy from the floats do not engage until the hgl on the upstream side of the skimmer is sufficiently elevated. Maximum detention and treatment will continue until the hgl engages the floats.

16. Problem: U.S. Pat. No. 8,034,236 to Happel which is incorporated by reference is titled "Storm Water Filter System Having a Floating Skimmer Apparatus". A problem, in the Happel '236 patent is the wheels that reduce the friction between the ends skimmer panel and the surface of the track system that enable the skimmer to move vertically within are costly. In addition, the track system in which the skimmer moves vertically is also costly. As water flows through the treatment system, the water flow exerts force onto the upstream side of the skimmer panel. The wheels act to reduce the friction between the skimmer panel and the track in which the skimmer moves vertically. The larger the size of the skimmer panel the more wheels are required, and the tracks in which the skimmer moves vertically becomes structurally more substantial and more expensive. The cost to manufacture the wheel system and tracks are significant.

Solution: The invention eliminates the need for a wheel and track system as required with '236. Although the hinge system, consisting of support rods and pivot points, of the new invention are not present with '236, the cost to produce for the support rods and pivot points are substantially less than that of the wheel and track systems. The reduced cost to produce of the invention is substantially less than '236 which will make the invention more price competitive in the market place.

17. Problem: U.S. Pat. No. 8,034,236 to Happel which is incorporated by reference titled "Storm Water Filter System Having a Floating Skimmer Apparatus". Another problem with the '236 patent is the wheel system, used to reduce friction between the skimmer panel and the track system in which the skimmer moves vertically, can become obstructed with debris, resulting with the skimmer becoming jammed and unable to mover vertically. Small debris that is adequately sized, such as twigs, can become wedged between the wheels and the tracks. The shape of the track system can shelter debris within the tracks from most of the stormwater flow, preventing the track system from being adequately flushed out, resulting with debris collecting in the tracks. When the wheels become wedged the skimmer panel can become unable to move vertically. The result of jamming the wheels of the skimmer panel can be that the skimmer may not be able to rise with a rising upstream hgl, and eventually be topped by stormwater flow and loose pollutants downstream from the stormwater treatment system. In addition, if the wheels become jammed while the skimmer panel at an elevated position during a high flowing rain event, the skimmer panel may not be able to lower back down. If the skimmer is unable to move downward as the hgl goes down, pollutants will be able to pass under the skimmer and escape the stormwater treatment system.

Solution: The invention does not require wheels rolling within a track system to function. Rather than having a supporting track system to hold the skimmer panel in place, the invention holds the skimmer in place using a hinge system attached to the upstream side of the skimmer panel. The hinge system of articulating the skimmer panel rather than rolling the skimmer panel, as done with '236, is much more dependable.

18. Problem: U.S. Pat. No. 8,034,236 to Happel which is incorporated by reference titled "Storm Water Filter System Having a Floating Skimmer Apparatus". Another problem with the '236 patent is that floats are required to be added to the front side of the skimmer panel to create adequate buoyancy to prevent the skimmer form being topped by stormwater flow. These floats have a significant expense that increases the cost to skimmer system's cost to produce. In addition, the required floats add labor expense to the assembly of the skimmer system.

Solution: The invention does not require that floats be added to the upstream side of the skimmer panel. Between the buoyancy of the of the skimmer panel and the force of flowing water, the skimmer panel will automatically adjust to the upstream hgl. This will enable the hydraulics of a stormwater treatment system to also automatically adjust as needed. The expenses associated with adding floats to the skimmer panel can be avoided. This will enable the stormwater treatment system that incorporates the invention to be more price competitive in the marketplace.

19. Problem: U.S. Pat. No. 9,534,368 to Happel, which is incorporated by reference in its' entirety, titled "Variable Flow Skimmer and Shelf System". A problem with the '368 patent is the wheels that reduce the friction between the ends skimmer panel and the surface of the track system that enable the skimmer to move vertically within are costly. In addition, the track system in which the skimmer moves vertically is also costly. As water flows through the treatment system, the water flow exerts force onto the upstream side of the skimmer panel. The wheels act to reduce the friction between the skimmer panel and the track in which the skimmer moves vertically. The larger the size of the skimmer panel the more wheels are required, and the tracks in which the skimmer moves vertically becomes structurally more substantial and more expensive. The cost to manufacture the wheel system and tracks are significant.

Solution: The invention eliminates the need for a wheel and track system as required with 368'. Although the hinge system, consisting of support rods and pivot points, of the new invention are not present with '368, the cost to produce for the support rods and pivot points are substantially less than that of the wheel and track systems. The reduced cost to produce of the invention is substantially less than '368 which will make the invention more price competitive in the market place.

20. Problem: U.S. Pat. No. 9,534,368 to Happel, which is incorporated by reference in its' entirety, titled "Variable Flow Skimmer and Shelf System". Another problem with the '368 patent is that the wheel system, used to reduce friction between the skimmer panel and the track system in which the skimmer moves vertically, can become obstructed with debris, resulting with the skimmer becoming jammed and unable to mover vertically. Small debris that is adequately sized, such as twigs, can become wedged between the wheels and the tracks. The shape of the track system can shelter debris within the tracks from most of the stormwater flow, preventing the track system from being adequately flushed out, resulting with debris collecting in the tracks. When the wheels become wedged the skimmer panel can become unable to move vertically. The result of jamming the wheels of the skimmer panel can be that the skimmer may not be able to rise with a rising upstream hgl, and eventually be topped by stormwater flow and loose pollutants downstream from the stormwater treatment system. In addition, if the wheels become jammed while the skimmer panel at an elevated position during a high flowing rain event, the skimmer panel may not be able to lower back down. If the skimmer is unable to move downward as the hgl goes down, pollutants will be able to pass under the skimmer and escape the stormwater treatment system.
    Solution: The invention does not require wheels rolling within a track system to function. Rather than having a supporting track system to hold the skimmer panel in place, the invention holds the skimmer in place using a hinge system attached to the upstream side of the skimmer panel. The hinge system of articulating the skimmer panel rather than rolling the skimmer panel, as done with '368, is much more dependable.

21. Problem: U.S. Pat. No. 9,534,368 to Happel, which is incorporated by reference in its' entirety, titled "Variable Flow Skimmer and Shelf System". Another problem with the '368 patent is the wheels that reduce the friction between the ends skimmer panel and the surface of the track system that enable the skimmer to move vertically within are costly. In addition, the track system in which the skimmer moves vertically is also costly. As water flows through the treatment system, the water flow exerts force onto the upstream side of the skimmer panel. The wheels act to reduce the friction between the skimmer panel and the track in which the skimmer moves vertically. The larger the size of the skimmer panel the more wheels are required, and the tracks in which the skimmer moves vertically becomes structurally more substantial and more expensive. The cost to manufacture the wheel system and tracks are significant.
    Solution: The invention eliminates the need for a wheel and track system as required with 368'. Although the hinge system, consisting of support rods and pivot points, of the new invention are not present with '368, the cost to produce for the support rods and pivot points are substantially less than that of the wheel and track systems. The reduced cost to produce of the invention is substantially less than '368 which will make the invention more price competitive in the market place.

22. Problem: U.S. Pat. No. 9,534,368 to Happel, which is incorporated by reference in its' entirety, titled "Variable Flow Skimmer and Shelf System". Another problem with the '368 patent is that floats are required to be added to the front side of the skimmer panel to create adequate buoyancy to prevent the skimmer form being topped by stormwater flow. These floats have a significant expense that increases the cost to skimmer system's cost to produce. In addition, the required floats add labor expense to the assembly of the skimmer system.
    Solution: The invention does not require that floats be added to the upstream side of the skimmer panel. Between the buoyancy of the of the skimmer panel and the force of flowing water, the skimmer panel will automatically adjust to the upstream hgl. This will enable the hydraulics of a stormwater treatment system to also automatically adjust as needed. The expenses associated with adding floats to the skimmer panel can be avoided. This will enable the stormwater treatment system that incorporates the invention to be more price competitive in the marketplace.

23. Problem: U.S. Pat. No. 9,534,368 to Happel, which is incorporated by reference in its' entirety, titled "Variable Flow Skimmer and Shelf System". Another problem with the '368 patent is that the position of the floats along the front side of the skimmer panel have an adequately large shape profile such that the floats physically inhibit the access of a vacuum truck to the lower settling zone of the treatment system. For example, when a screen system is present upstream from the skimmer panel, the downstream end of the screen system and the upstream side of the floats can restrict the articulation of a vacuum service line.
    Solution: Because the invention does not require floats to be added to the upstream side of the skimmer panel, the space between the downstream end of the screen system and the skimmer is greater. Having greater and easier access to the lower settling zone by the vacuum service line will save time and money. This advantage is especially helpful for small to medium size treatment systems.

24. Problem: U.S. Pat. No. 8,034,234 to Happel, which is incorporated by reference in its' entirety, titled "Floating Skimmer Apparatus With Up-Flow Filter". A problem with the '234 patent is that the wheels that reduce the friction between the ends skimmer panel and the surface of the track system that enable the skimmer to move vertically within are costly. In addition, the track system in which the skimmer moves vertically is also costly. As water flows through the treatment system, the water flow exerts force onto the upstream side of the skimmer panel. The wheels act to reduce the friction between the skimmer panel and the track in which the skimmer moves vertically. The larger the size of the skimmer panel the more wheels are required, and the tracks in which the skimmer moves vertically becomes structurally more substantial and more expensive. The cost to manufacture the wheel system and tracks are significant. Solution: The invention eliminates the need for a wheel and track system as required with '234. Although the hinge system, consisting of support rods and pivot points, of the new invention are not present with '234, the cost to produce for the support rods and pivot points are substantially less than that of the wheel and track systems. The reduced cost to produce of the invention is substantially less than '234 which will make the invention more price competitive in the market place.

25. Problem: U.S. Pat. No. 8,034,234 to Happel, which is incorporated by reference in its'entirety, titled "Floating Skimmer Apparatus With Up-Flow Filter". A problem with the '234 patent is that the wheel system, used to reduce friction between the skimmer panel and the track system in which the skimmer moves vertically, can become obstructed with debris, resulting with the skimmer becoming jammed and unable to mover vertically. Small debris that is adequately sized, such as twigs, can become wedged between the wheels and the tracks. The shape of the track system can shelter debris within the tracks from most of the stormwater flow, preventing the track system from being adequately flushed out, resulting with debris collecting in the tracks. When the wheels become wedged the skimmer panel can become unable to move vertically. The result of jamming the wheels of the skimmer panel can be that the skimmer may not be able to rise with a rising upstream hgl, and eventually be topped by stormwater flow and loose pollutants downstream from the stormwater treatment system. In addition, if the wheels become jammed while the skimmer panel at an elevated position during a high flowing rain event, the skimmer panel may not be able to lower back down. If the skimmer is unable to move downward as the hgl goes down, pollutants will be able to pass under the skimmer and escape the stormwater treatment system.

Solution: The invention does not require wheels rolling within a track system to function. Rather than having a supporting track system to hold the skimmer panel in place, the invention holds the skimmer in place using a hinge system attached to the upstream side of the skimmer panel. The hinge system of articulating the skimmer panel rather than rolling the skimmer panel, as done with '234, is much more dependable.

26. Problem: U.S. Pat. No. 8,034,234 to Happel, which is incorporated by reference in its' entirety, titled "Floating Skimmer Apparatus With Up-Flow Filter". Another problem with the '234 patent is that floats are required to be added to the front side of the skimmer panel to create adequate buoyancy to prevent the skimmer form being topped by stormwater flow. These floats have a significant expense that increases the cost to skimmer system's cost to produce. In addition, the required floats add labor expense to the assembly of the skimmer system.

Solution: The invention does not require that floats be added to the upstream side of the skimmer panel. Between the buoyancy of the of the skimmer panel and the force of flowing water, the skimmer panel will automatically adjust to the upstream hgl. This will enable the hydraulics of a stormwater treatment system to also automatically adjust as needed. The expenses associated with adding floats to the skimmer panel can be avoided. This will enable the stormwater treatment system that incorporates the invention to be more price competitive in the marketplace.

27. Problem: The debris that settles in the settling zone of the stormwater treatment system is commonly a high concentration of sediment. Sediment in a settling zone forms a layer that covers the bottom of the settling zone, and the sediments can pack together tight and hard. It can be very difficult for a service crew to remove these tightly packed sediments from the setting zone. The longer it takes for a service crew to perform the servicing of the treatment system, the more money it costs to perform the servicing and the longer servicing equipment is engaged to a single task.

Solution: The invention can use a high-pressure spray system added to the settling zone of the treatment system which will dramatically reduce the time required to service the settling zone of a stormwater treatment system. This spray system will consist of high-pressure pipe that conveys clean servicing water into the settling zone of treatment system. The conveyance of the servicing water is such that water is inserted at high-pressure from a source outside the vault of the treatment system, is conveyed to the bottom of the settling zone, where the servicing water flows into spray bars located along the perimeter of the settling zone. These spray bars have nozzles aimed toward the center of the settling and are approximately parallel with the floor of the settling zone. When servicing using the spray system, the nozzles along the spray bars will jet servicing water at high velocity into the solids that have settled in the settling zone. These water jets will drill into the solids and liquefy the solids layer from the underside. The kinetic energy of the water jets will eventually drive the solids toward the center of the settling zone where the vacuum nozzle of the vacuum service truck can easily reach and extract the solids from the treatment system. To aid with driving the sediments toward the center of the settling zone, the floor of the settling zone can be angled such that the floor is sloped downward from the perimeter of the settling zone toward the center of the settling zone.

28. Problem: When servicing the settling zone of a stormwater treatment system it is often required for a service technician to enter the confined space of a settling zone to facilitate the removal of debris that has settled in the settling zone. Inside the setting zone is uncomfortable and potentially dangerous place for a service technician to be. For a service technician to enter the confined space of a settling zone requires safety protocols outlined by OSHA which are costly and time consuming.

Solution: The invention can use a high-pressure spray system added to the settling zone of the treatment system which can be administered by a service technician from outside the stormwater treatment system. This spray system and method of application is more thorough for removing debris from the settling zone of the treatment system than other methods, and no service technicians need to enter the stormwater treatment vault to employ the servicing spray system.

29. Problem: Servicing technicians will often not complete the removal of all the debris that has settled in the settling zone of a stormwater treatment system because servicing a settling zone can be difficult and time consuming. The result is that the amount of debris removed from the treatment system is less. Because the amount is debris removed from a stormwater treatment system is tracked and documented for the purpose of giving removal credits to the owner of the treatment system, leaving debris behind in the settling zones reduces the credits issued to the owner. For the owner of the treatment system to not receive maximum removal credits may eventually cost the owner additional funding in an attempt to meet regulatory pollution removal objectives.

Solution: The invention can use a high-pressure spray system added to the settling zone of the treatment system which makes it easy and quick for service technicians to remove all the debris that has settled in the settling zone of the stormwater treatment system. The invention's spray system is very thorough for the removal of debris in the settling zone. Because of the ease and speed of the inventions spray system the service technicians will be inspired to do a better job and remove all the debris in the settling zone for full credit by regulatory agencies.

30. Problem: Debris that has become tightly packed across the bottom of the settling zone of a stormwater treatment system can become structurally stable. Tightly packed sediments combined with leaves, branches, and twigs can create a structural framework with the debris. The high-pressure spray system is designed to drill into the debris from the perimeter of the setting zone and force the debris toward the center of the settling zone for removal by a vacuum service truck. However, the structural framework within the debris can the debris layer to be fully undermined by the water jets that are aimed parallel with the floor of the settling zone. The result is a layer of debris that is supported above the water jets by the side walls of the settling zone and the structural framework of the debris. All the debris is unable to collapse downward and be driven toward the center of the vault toward the vacuum service line.

Solution: A vertical spray bar member will be added to the horizontal spray bars midway between 2 walls on opposite sides of the settling zone. These vertical spray bar members will have a series of nozzles that will direct water jets to drill into the sediment layer, creating a vertical slice through the debris such that the slice will create a structural failure within the debris layer, which will in turn cause the layer of debris to collapse onto the water jets that are aimed parallel with the floor. Once the structure of the debris is overcome the water jets aimed parallel with the floor can fully liquefy the debris and drive it toward the center of the settling zone where the service vacuum truck can remove the debris.

31. Problem: When installing the high-pressure spray system of the invention, having the nozzles of the horizontal spray bar aimed parallel with the floor of the settling zone is important to achieve maximum effectiveness. The technician installing these spray bars need to accomplish the installation quickly and accurately. Doing the installation quickly will save money and installing accurately will ensure effectiveness. To further complicate the installation of the spray bars, the slope of the floors of the settling zones will vary between stormwater treatment vaults due to workmanship issues. In addition, the nozzles are small and difficult to judge as to the direction they are aimed.

Solution: Each of the horizontal spray bars will have an aiming lever added as a part of manufacturing the spray bars. The aiming lever will such that the aiming lever will be perpendicular to the length of the spray bars and parallel with the aim of the nozzles. The aiming lever will serve as an aiming mechanism for the installation technician. As a part of installing the spray bars of the spray system, the installation technician will position the aiming lever so that it is pressed against the floor of the settling zone of the stormwater treatment system. Since the nozzles are aimed parallel with the aiming lever, the nozzles will always be aimed parallel with the floor of the settling zone, regardless of the slope of the floors.

Although the embodiments show different arrangements of components in each embodiment, the invention can be practiced with any combination of the components shown in the different embodiments, and not only those component combinations shown in the embodiments.

While some of the embodiments show four pivotal support rods, the invention can be practiced with a plurality of pivotal support rods from two, three, four, or more pivotal support rods.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A single treatment system for a stormwater vault having an inlet wall with an inlet port and an outlet wall with an outlet port, closed sidewalls, a floor and a top, comprising:

a rigid skimmer panel having a width which is between the closed sidewalls of the vault and the inlet port and outlet port;

a raised surface portion including a horizontal shelf attached to the outlet wall below the outlet port, having a width spans between the closed sidewalls of the vault, which is adjacent to a bottom of the skimmer panel, when the skimmer panel is in a downward position; and a hinge system having support arms with hinged ends attached to the skimmer panel and opposite ends hingedly attached to the vault, which allows the skimmer panel to move upward and downward in a vertical orientation with a rising and lowering hydraulic grade line as stormwater passes through the inlet port into the vault and out of the outlet port of the vault, wherein the system is used to reduce debris from the stormwater passing out of the outlet port of the vault.

2. The single treatment system of claim 1, wherein each of the support rods includes:

wall pivot portion for attaching an outer end of each support rod to one of the closed sidewalls, and a panel pivot portion for attaching an inner end of each support rod to the skimmer panel.

3. The single treatment system of claim 1, wherein the support rods includes: up to four support rods.

4. The single treatment system of claim 1, further comprising:

flexible seal flanges attached to side ends of the skimmer panel; and a sliding surface portion on the closed sidewalls, wherein the flexible seal flanges allow for the skimmer panel to be substantially sealed against the closed sidewalls as the skimmer panel moves up and down in a vertical orientation inside of the vault.

5. The single treatment system of claim 1, further comprising:

wheels along ends of the skimmer panel that roll between the side walls of the vault and the ends of the skimmer panel for allowing the skimmer panel to move up and down in a vertical orientation inside of the vault.

6. The single treatment system of claim 1, wherein the raised surface portion further includes:

a horizontal baffle having a width which is between the closed sidewalls of the vault underneath the rigid skimmer, the baffle having a bottom edge raised and spaced above the floor of the vault.

7. The single treatment system of claim 1, further comprising:

a container of media adjacent to the outlet wall, the container having a top adjacent to the outlet port of the outlet wall, and having a bottom separated from and raised above the floor.

8. The single treatment system of claim 7, wherein the container includes:

at least one top screen in the top of the container; and at least one bottom screen in the bottom of the container.

9. The single treatment system of claim 1, wherein the skimmer includes:

a float along a top portion of the skimmer.

10. The single treatment system of claim 1, wherein the floor includes:

a sloped floor.

11. The single treatment system of claim 10, further comprising:

a high pressure water source; and spray nozzles along a perimeter portion of the sloped floor, the high pressure water source for supplying pressurized water to the spray nozzles for servicing of the vault and for removal of the debris from the vault.

12. The single treatment system of claim 1, further comprising:

a plurality of baffles attached to and rising upward from the floor.

13. The single treatment system of claim 1, further comprising:

a dual screen filtration systems in the vault spaced between the skimmer panel and the inlet port of the vault.

14. The single treatment system of claim 13, further comprising:

a flow spreader forming a hydro-dynamic separation of inflowing water passing through the inlet port of the vault into two flow paths, the flow spreader having outer walls selected from a solid surface and a screened surface, the flow spreader creating a split flow to the left and right of the inflowing water, wherein the split flow directs the debris into the dual screen filtration system, and the flow spreader assists to influence solids to settle into at least one lower settling chamber in the vault.

15. The single treatment system of claim 14, further comprising:

a debris ramp having a left portion to a left side of the flow spreader and a right side portion to a right side of the flow spreader, the debris ramp for allowing debris to pass upward to flow into the dual screen filtration systems.

16. The single treatment system of claim 15, further comprising:

a screened deflector below the debris ramp, the screened deflector for preventing debris from passing underneath the dual screen filtration systems.

17. The single treatment system of claim 1, further comprises:

a screen filtration system in the vault spaced between the skimmer panel and the inlet port of the vault.

18. A single treatment system for a stormwater vault having an inlet wall with an inlet port and an outlet wall with an outlet port, closed sidewalls, a floor and a top, comprising:

a rigid moveable skimmer panel having a width which is between the closed sidewalls and the outlet wall of the vault, the rigid moveable skimmer panel being positioned to move from below to in front of the outlet port of the vault;

a raised surface portion including a horizontal shelf attached adjacent to the outlet wall below the outlet port, having a width which is between the closed sidewalls of the vault, which is adjacent to a bottom of the skimmer panel, when the skimmer panel is in a downward position, the raised surface portion being selected from one of a shelf and a baffle; and a hinge system having support arms with hinged ends attached to the skimmer panel and opposite ends hingedly attached to another portion of the vault, which allows the skimmer panel to move upward and downward in vertical orientation with a rising and lowering hydraulic grade line as stormwater passes through the inlet port into the vault and out of the outlet port of the vault, wherein the system is used to provide treatment for the stormwater from passing out of the outlet port of the vault.

19. A method of treating stormwater in a vault, comprising the steps of:

providing the vault with an inlet wall having an inlet port, an outlet wall having an outlet port, closed sidewalls, a floor and a top;

providing a raised surface portion with a horizontal shelf attached to the outlet wall of the vault below the outlet port;

providing a rigid moveable skimmer panel having a width which is between the closed sidewalls of the vault;

pivotally attaching the rigid moveable skimmer panel to a portion inside of the vault with a hinge system comprising a plurality of pivotable support rods, the support rods having hinged ends attached to the skimmer panel and opposite ends hingedly attached to the sidewalls, so that skimmer panel is moveable from a lowered position to a raised position in front of the outlet port to the vault; and treating the stormwater passing into the inlet port into the vault with the rigid moveable skimmer panel before the treated stormwater passes out the outlet port of the vault.

\* \* \* \* \*